(12) United States Patent
Lockard et al.

(10) Patent No.: US 7,498,714 B2
(45) Date of Patent: Mar. 3, 2009

(54) MULTI-LAYER THREE-DIMENSIONAL STRUCTURES HAVING FEATURES SMALLER THAN A MINIMUM FEATURE SIZE ASSOCIATED WITH THE FORMATION OF INDIVIDUAL LAYERS

(75) Inventors: Michael S. Lockard, Lake Elizabeth, CA (US); Adam L. Cohen, Los Angeles, CA (US); Vacit Arat, La Canada Flintridge, CA (US); Dennis R. Smalley, Newhall, CA (US)

(73) Assignee: Microfabrica Inc., Van Nuys, CA (US)

( * ) Notice: Subject to any disclaimer, the term of this patent is extended or adjusted under 35 U.S.C. 154(b) by 355 days.

(21) Appl. No.: 10/949,744

(22) Filed: Sep. 24, 2004

(65) Prior Publication Data
US 2005/0126916 A1 Jun. 16, 2005

Related U.S. Application Data

(60) Provisional application No. 60/506,016, filed on Sep. 24, 2003.

(51) Int. Cl.
*H02N 1/00* (2006.01)
*F16K 31/02* (2006.01)
(52) U.S. Cl. .............. 310/309; 251/129.06; 137/625.33
(58) Field of Classification Search ................. 310/309; 251/129.01, 129.06; 137/625.33, 625.28; 257/415; 417/410.1
See application file for complete search history.

(56) References Cited

U.S. PATENT DOCUMENTS

| | | | | |
|---|---|---|---|---|
| 4,797,211 A | * | 1/1989 | Ehrfeld et al. | 210/321.84 |
| 5,054,522 A | * | 10/1991 | Kowanz et al. | 137/625.33 |
| 5,190,637 A | | 3/1993 | Guckel | 205/118 |
| 5,400,824 A | * | 3/1995 | Gschwendtner et al. | 137/625.28 |
| 5,718,618 A | | 2/1998 | Guckel et al. | 451/41 |
| 6,027,630 A | | 2/2000 | Cohen | 205/135 |
| 6,123,316 A | * | 9/2000 | Biegelsen et al. | 251/129.01 |
| 6,431,212 B1 | * | 8/2002 | Hayenga et al. | 137/855 |

(Continued)

OTHER PUBLICATIONS

Cohen, et al., "EFAB: Batch Production of Functional, Fully-Dense Metal Parts with Micron-Scale Features", Proc. 9th Solid Freeform Fabrication, The University of Texas at Austin, Aug. 1998, pp. 161.

(Continued)

*Primary Examiner*—Karl I Tamai
(74) *Attorney, Agent, or Firm*—Dennis R. Smalley

(57) ABSTRACT

Embodiments of multi-layer three-dimensional structures and formation methods provide structures with effective feature (e.g. opening) sizes (e.g. virtual gaps) that are smaller than a minimum feature size (MFS) that exists on each layer as a result of the formation method used in forming the structures. In some embodiments, multi-layer structures include a first element (e.g. first patterned layer with a gap) and a second element (e.g. second patterned layer with a gap) positioned adjacent the first element to define a third element (e.g. a net gap or opening resulting from the combined gaps of the first and second elements) where the first and second elements have features that are sized at least as large as the minimum feature size and the third element, at least in part, has dimensions or defines dimensions smaller than the minimum feature size.

11 Claims, 23 Drawing Sheets

U.S. PATENT DOCUMENTS

| | | | |
|---|---|---|---|
| 6,877,964 B2* | 4/2005 | Burns et al. | 417/410.1 |
| 6,887,615 B1* | 5/2005 | Sherman et al. | 429/61 |
| 6,962,170 B1* | 11/2005 | Sherman et al. | 137/625.33 |
| 7,066,205 B2* | 6/2006 | Sherman et al. | 137/625.33 |
| 2004/0007470 A1 | 1/2004 | Smalley | 205/118 |
| 2005/0023144 A1 | 2/2005 | Cohen et al. | 205/118 |
| 2005/0023145 A1 | 2/2005 | Cohen et al. | 205/118 |
| 2005/0029109 A1 | 2/2005 | Zhang et al. | 205/118 |
| 2005/0032375 A1 | 2/2005 | Lockard et al. | 216/41 |
| 2005/0045585 A1 | 3/2005 | Zhang et al. | 216/58 |
| 2005/0053849 A1 | 3/2005 | Cohen et al. | 428/600 |
| 2005/0104609 A1 | 5/2005 | Arat et al. | 324/754 |
| 2005/0126916 A1* | 6/2005 | Lockard et al. | 205/50 |

OTHER PUBLICATIONS

Adam L. Cohen, et al., "EFAB: Rapid, Low-Cost Desktop Micromachining of High Aspect Ratio True 3-D MEMS", Proc. 12th IEEE Micron Electro Mechanical Systems Workshop, IEEE, Jan. 17-21, 1999, pp. 244-251.

"Microfabrication—Rapid Prototyping's Killer Application", Rapid Prototyping Report, CAD/CAM Publishing, Inc., Jun. 1999, pp. 1-5.

Adam L. Cohen, "3-D Micromachining by Electrochemical Fabrication", Micromachine Devices, Mar. 1999, pp. 6-7.

Gang Zhang, et al., "EFAB: Rapid Desktop Manufacturing of True 3-D Microstructures", Proc. 2nd International Conference on Integrated MicroNanotechnology for Space Applications, The Aerospace Co., Apr. 1999.

F. Tseng, et al., "EFAB: High Aspect Ratio, Arbitrary 3-D Metal Microstructures Using a Low-Cost Automated Batch Process", 3rd International Workshop on High Aspect Ratio Microstructure Technology (HARMST'99), Jun. 1999.

Adam L. Cohen, et al., "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, Sep. 1999.

F. Tseng, et al., "EFAB: High Aspect Ratio, Arbitrary 3-D Metal Microstructures Using a Low-Cost Automated Batch Process", MEMS Symposium, ASME 1999 International Mechanical Engineering Congress and Exposition, Nov. 1999.

Adam L. Cohen, "Electrochemical Fabrication (EFABTM)", Chapter 19 of the MEMS Handbook, edited by Mohamed Gad-El-Hak, CRC Press, 2002, pp. 19/1-19/23, no month given.

* cited by examiner

MULTI-LAYER THREE-DIMENSIONAL STRUCTURES HAVING FEATURES SMALLER THAN A MINIMUM FEATURE SIZE ASSOCIATED WITH THE FORMATION OF INDIVIDUAL LAYERS

RELATED APPLICATIONS

This claims benefit of U.S. Provisional Patent Application No. 60/506,016, filed Sep. 24, 2003, which is incorporated herein by reference as if set forth in full herein.

FIELD OF THE INVENTION

Some embodiments of the invention relate to micro-scale or meso-scale devices with effective feature sizes that are smaller than a minimum feature size associated with forming individual layers while other embodiments are directed to methods for fabricating such devices and more particularly to electrochemical fabrication methods.

BACKGROUND OF THE INVENTION

A technique for forming three-dimensional structures (e.g. parts, components, devices, and the like) from a plurality of adhered layers was invented by Adam L. Cohen and is known as Electrochemical Fabrication. It is being commercially pursued by Microfabrica®™ Inc. (formerly MEMGen Corporation) of Van Nuys, Calif. under the name EFAB®™. This technique was described in U.S. Pat. No. 6,027,630, issued on Feb. 22, 2000. This electrochemical deposition technique allows the selective deposition of a material using a unique masking technique that involves the use of a mask that includes patterned conformable material on a support structure that is independent of the substrate onto which plating will occur. When desiring to perform an electrodeposition using the mask, the conformable portion of the mask is brought into contact with a substrate while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica ®™ Inc. (formerly MEMGen Corporation) of Van Nuys, Calif. such masks have come to be known as INSTANT MASKS™ and the process known as INSTANT MASKING™ or INSTANT MASK™ plating. Selective depositions using conformable contact mask plating may be used to form single layers of material or may be used to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p161, August. 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April. 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFABTM)", Chapter 19 of The MEMS Handbook, edited by Mohamed Gad-EI-Hak, CRC Press, 2002.

(9) Microfabrication—Rapid Prototyping's Killer Application", pages 1 -5 of the Rapid Prototyping Report, CAD/CAM Publishing, Inc., June 1999.

The disclosures of these nine publications are hereby incorporated herein by reference as if set forth in full herein.

The electrochemical deposition process may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate.
2. Then, blanket depositing at least one additional material by electrodeposition so that the additional deposit covers both the regions that were previously selectively deposited onto, and the regions of the substrate that did not receive any previously applied selective depositions.
3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to the immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated. At least one CC mask is needed for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first operation, the conformable portion of the CC mask is placed in registration with and pressed against a selected portion of the substrate (or onto a previously formed layer or onto a previously deposited portion of a layer) on which deposition is to occur. The pressing together of the CC mask and substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A-1C. FIG. 1A shows a side view of a CC mask 8 consisting of a conformable or deformable (e.g. elastomeric) insulator 10 patterned on an anode 12. The anode has two functions. FIG. 1A also depicts a substrate 6 separated from mask 8. One is as a supporting material for the patterned insulator 10 to maintain its integrity and alignment since the pattern may be topologically complex (e.g., involving isolated "islands" of insulator material). The other function is as an anode for the electroplating operation. CC mask plating selectively deposits material 22 onto a substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 1C. The CC mask plating process is distinct from a "through-mask" plating process in that in a through-mask plating process the separation of the masking material from the substrate would occur destructively. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D-1F. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the fabrication of the substrate on which plating is to occur (e.g. separate from a three-dimensional (3D) structure that is being formed). CC masks may be formed in a variety of ways, for example, a photolithographic process may be used. All masks can be generated simultaneously, prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A-2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A, illustrates that the passing of current causes material 2 within the plating solution and material 2 from the anode 12 to be selectively transferred to and plated on the cathode 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e. sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A-3C.

The system 32 consists of several subsystems 34, 36, 38, and 40. The substrate holding subsystem 34 is depicted in the upper portions of each of FIGS. 3A to 3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which the feet 68 of subsystem 34 may sit. Subsystem 38 also includes appropriate electrical connections (not shown) for connecting the anode to an appropriate power supply for driving the blanket deposition process.

The planarization subsystem 40 is shown in the lower portion of FIG. 3C and includes a lapping plate 52 and associated motion and control systems (not shown) for planarizing the depositions.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing mask exposures. A first layer of a primary metal is electroplated onto an exposed plating base to fill a void in a photoresist, the photoresist is then removed and a secondary metal is electroplated over the first layer and over the plating base. The exposed surface of the secondary metal is then machined down to a height which exposes the first metal to produce a flat uniform surface extending across the both the primary and secondary metals. Formation of a second layer may then begin by applying a photoresist layer over the first layer and then repeating the process used to produce the first layer. The process is then repeated until the entire structure is formed and the secondary metal is removed by etching. The photoresist is formed over the plating base or previous layer by casting and the voids in the photoresist are formed by exposure of the photoresist through a patterned mask via X-rays or UV radiation.

Even though electrochemical fabrication as taught and practiced to date, has greatly enhanced the capabilities of microfabrication, and in particular added greatly to the number of layers that can be incorporated into a structure and to the speed and simplicity in which such structures can be made, room for enhancing the state of electrochemical fabrication exists. In particular, a need exists for devices with improved feature resolution, methods for reliably forming such devices, and/or methods for providing enhanced feature resolution.

SUMMARY OF THE DISCLOSURE

It is an object of some embodiments of the invention to provide micro-scale or meso-scale devices having effective features sizes which are smaller than generally believed formable.

It is an object of some embodiments of the invention to provide improved electrochemical fabrication methods that allow effective features sizes of structures to be smaller than a minimum feature sizes.

It is an object of some embodiments of the invention to provide more reliable electrochemical fabrication methods for forming structures with effective features sizes that are less than a minimum feature size.

Other objects and advantages of various embodiments of the invention will be apparent to those of skill in the art upon review of the teachings herein. The various aspects of the invention, set forth explicitly herein or otherwise ascertained from the teachings herein, may address one or more of the above objects alone or in combination, or alternatively may address some other object of an embodiment of the invention ascertained from the teachings herein. It is not necessarily intended that all objects be addressed by any single aspect of the invention even though that may be the case with regard to some aspects.

In a first aspect of the invention a layered three-dimensional structure having a minimum feature size, the layered three-dimensional structure includes: a first element; and a second element positioned adjacent to the first element to define a third element positioned between the first element and the second element, wherein the third element is sized less than the minimum feature size.

In a second aspect of the invention a layered three-dimensional structure having a minimum feature size, the layered three-dimensional structure includes: a first layer defining a first opening, wherein the first opening is at least as large as the minimum feature size; and a second layer positioned adjacent to the first layer, wherein the second layer defines a second opening at least as large as the minimum feature size, wherein the second opening is positioned adjacent the first opening to define a third opening between the first opening and the second opening, and wherein the third opening is capable of being sized less than the minimum feature size.

In a third aspect of the invention a layered three-dimensional structure having a minimum feature size, the layered three-dimensional structure includes: a first layer having a frame structure defining an array of first openings, wherein each first opening is at least as large as the minimum feature size; and a second layer having a frame structure defining an array of second openings, wherein each second opening is at least as large as the minimum feature size, wherein the second layer is positioned at least adjacent to the first layer, wherein the array of second openings is positioned adjacent the array of first openings to define an array of third openings between the array of first openings and the array of second openings, and wherein each third opening is capable of being sized less than the minimum feature size.

Further aspects of the invention will be understood by those of skill in the art upon reviewing the teachings herein. Other aspects of the invention may, for example, involve various combinations of the above noted aspects of the invention or combinations of one or more of the above noted aspects with one or more features found in one or more embodiments set forth herein. Other aspects of the invention may involve apparatus that can be used in implementing one or more of the above method aspects of the invention. Other aspects of the invention may provide other configurations, structures, functional relationships, and processes that have not been specifically set forth above but which are explicitly set forth herein below or are inherent or readily ascertainable by those of skill in the art upon review of the teachings set forth herein.

Embodiments of the invention includes embodiments of devices (or structures) and fabrication methods for producing them where the three-dimensional device or structure includes elements (e.g. solid regions) which have dimensions smaller than a first minimum feature size and/or have spacings, voids, openings, gaps (e.g. hollow or empty regions) located between elements, where the spacings are smaller than a second minimum feature size where the first and second minimum feature sizes may be the same or different and where the minimum feature sizes represent lower limits at which formation of elements and/or spacings, respectively, can be formed. Reliable formation refers to the ability to accurately form or produce a given geometry of an element, or of the spacing between elements, using a given formation process, with a minimum acceptable yield. The minimum acceptable yield may depend on a number of factors including: (1) number of features present per layer, (2) numbers of layers, (3) the criticality of the successful formation of each feature, (4) the number and severity of other factors effecting overall yield, and (5) the desired or required overall yield for the structures or devices themselves. In some circumstances, the minimum size may be determined by a yield requirement per feature which is as low as 70%, 60%, or even 50%. While in other circumstances the yield requirement per feature may be as high as 90%, 95%, 99%, or even higher. In some circumstances (e.g. in producing a filter element) the failure to produce a certain number of desired features (e.g. 20-40% failure may be acceptable while in an electrostatic actuator the failure to produce a single small space between two relatively moveable electrodes may result in failure of the entire device.

In some embodiments, the determining factor for minimum feature size is being able to successfully pattern a masking material (e.g. photoresist) such that small elements are not inadvertently removed or delaminated from a substrate. In this regard, an element of masking material may be considered to be larger than a minimum feature size if it is can be divided into rectangular elements each having a width and length larger than the minimum feature size. Though any exposed corners of such feature will have dimensions (e.g. radius of curvature) smaller than the minimum feature size, the elements as a whole are larger than the minimum feature size. In fact, in some circumstances elements have features with angles of solid greater than 60 degrees and even 45 degrees which are connected to masses larger than the minimum feature size may be considered as being larger than the minimum feature size.

Device and structures and methods for forming devices or structures of some embodiments of the invention will result in spacings or elements having dimensions at or larger than a minimum feature size while the spacings as measured between two or more consecutive layers will be less than the minimum feature size.

In some embodiments the elements may have some structural features (corners of rectangular elements, corners having extended regions forming angles greater than 60 degrees or even 45 degrees) smaller than the minimum feature size or some openings (corners of rectangular indentations into elements, corners of indentations having extended regions forming angles greater than 60 degrees or even 45 degrees) smaller than the minimum feature size within a given layer.

In some embodiments of the invention, the apparatus or devices formed embody a layered three-dimensional structure which has a minimum feature size for each layer. The device includes a first element and a second element, where the second element is positioned adjacent the first element to define a third element there between. Unlike the first and second elements, the third element is capable of being sized less than the minimum feature size.

With the third element sized less than the minimum feature size, depending on the embodiment, the spacing between the first and second elements can be less than the minimum feature size. This allows the performance and efficiency of the device to be significantly increased. In embodiments where electrical differentials are applied between the first and second elements (e.g. actuators), to generate forces there between, the closer the positioning, the greater the force produced or less voltage that is needed. Increasing the force applied to an element of the device can result in a greater operational capacity with devices such as actuators. Decreasing the voltage needed, provides a reduction in the potential for adverse effects, such as shorting, arcing, charge accumulation and/or structural damage from melting or burning out structure. In embodiments where a flow is controlled (restricted) between the first and second elements (e.g. filters), the performance of the device is increased by allowing restriction of particles sized less than the minimum feature size.

In some embodiments, the device is an actuator (e.g. a vertical or horizontal comb actuator) or a micro-filter. With an actuator the first and second elements can be openings defined in adjacent layers or structures such as electrodes. Such structures can be fixed and/movable to provide an actuation function. The third element of the actuator is typically an opening or gap separating the structures such that they can move relative to each other without contact. To provide such movement, the first and second elements can be electrically conductive, such that the actuator is capable of applying an electrical differential between the first and second elements to create an electrostatic force.

With a micro-filter, the first and second elements can be either openings (pores, gaps, etc.) defined in adjacent layers or the structures defining openings. The third element of a micro-filter may be an opening, such as a pore for allow the passage of a substance such as a gas, liquid or particles.

Structural embodiments of the first and second elements can made of a variety of materials, such as for example gold, silver, nickel and/or copper. In certain embodiments the structures are made of nickel. The layers of the layered structures can vary in thickness, typically ranging between 1 μm and 50 μm, and in some cases, may be thinner or thicker.

In other embodiments, the three-dimensional structure has a first element abutting a first void, and a second element abutting a second void. The first element and the first void are positioned along a first plane and the second element and the second void are positioned along a second plane. The first and second planes are parallel and adjacent. The second void is positioned to abut (e.g. in communication with) the first void. The second element is spaced from the first element a distance that is less than the minimum feature size of either element. These embodiments can also be employed in devices such as actuators and micro-filters. With applications such as actuators, the elements may be movable, such that the first and/or the second elements may move into the second and/or first voids, respectfully.

Other embodiments of the invention include a layered three-dimensional structure having a minimum feature size, the device including a first layer defining a first opening and a second layer defining a second opening. The second layer is positioned adjacent or in contact (upon) the first layer and the second opening is adjacent or abutting the first opening. Since the first and second openings are positioned within layers, they each are sized at least as large as the minimum feature size. Between the second opening and the first opening is defined a third opening, which because it is located between the layers, is capable of being sized less than the minimum feature size. A typical application of these embodiments is as a micro-filter as the openings can function as pores in the filter.

Embodiments of the invention also includes methods of fabricating a layered three-dimensional structure (e.g. substrate). In at least one embodiment, a method for fabricating a three-dimensional structure having a minimum feature size includes the processes of providing a deposition structure, depositing at least a portion of a first layer having a first gap in at least a first material onto the deposition structure, depositing at least a portion of a second layer having a second gap in a second material onto the first layer to form a layered structure and releasing the layered structure from a third material. The second layer has a second gap that is positioned to overlap the first gap to define a third gap between the first and second layers. Since the third gap is positioned at the overlap of the first and second gaps, it is capable of being sized less than the minimum feature size. In contrast, with the first and second gaps being positioned within their respective layers, are sized at least as large as the minimum feature size.

The deposition structure provided by the method can be a substrate or a layered structural, made of materials such as silicon, metal, glass or plastic. The deposition structure can include a sacrificial material, so that after release, a space can be created adjacent (under) the device. This space can be used for structure movement (for actuators), and/or allowing a fluid flow (for filters). The layer deposition processes can include the operations of applying a patterned mask defining deposition regions at least adjacent to the deposition structure, depositing the layer material, and removing the patterned mask. The application of the patterned mask can be by a variety of processes.

In other embodiments of the fabrication method the processes include providing a deposition structure, depositing a first set of layer comprising at least one layer having a first structural region having at least first and second opposing ends that abut a first sacrificial region, depositing a second set of layers comprising at least one layer having a second structural region forming a layered structure, and releasing the layered structure from any material occupying the sacrificial region. The second structural region is deposited over the first opposing end and extends from the first opposing end over part of the first sacrificial region wherein an end portion of the second structural region over the sacrificial region is spaced from the second opposing end by a distance less than the minimum feature size. The second set of layers can also include a second sacrificial region which is positioned to abut the second structural region.

DETAILED DESCRIPTION

FIGS. 1A-1G, 2A-2F, and 3A-3C illustrate various features of one form of electrochemical fabrication that are known. Other electrochemical fabrication techniques are set forth in the '630 patent referenced above, in the various previously incorporated publications, in various other patents and patent applications incorporated herein by reference, still others may be derived from combinations of various approaches described in these publications, patents, and applications, or are otherwise known or ascertainable by those of skill in the art from the teachings set forth herein. All of these techniques may be combined with those of the various embodiments of various aspects of the invention to yield enhanced embodiments. Still other embodiments may be derived from combinations of the various embodiments explicitly set forth herein.

Figure 4A:
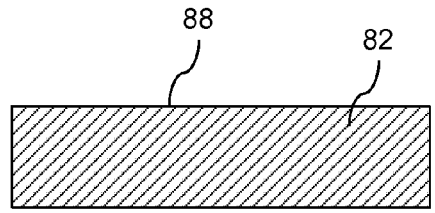
FIGS. 4A-4I schematically depict the formation of a first layer of a structure using adhered mask plating where the blanket deposition of a second material overlays both the openings between deposition locations of a first material and the first material itself.
Figure 4B:
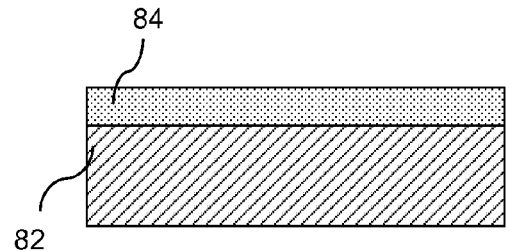
Figure 4C:
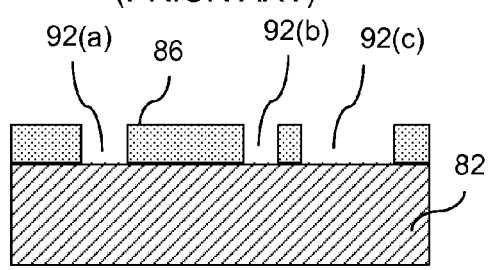
Figure 4D:
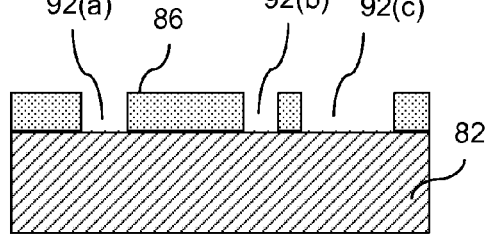
Figure 4E:
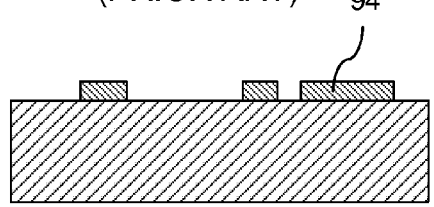
Figure 4F:
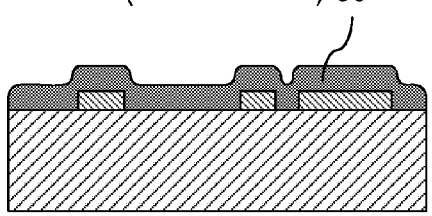
Figure 4G:
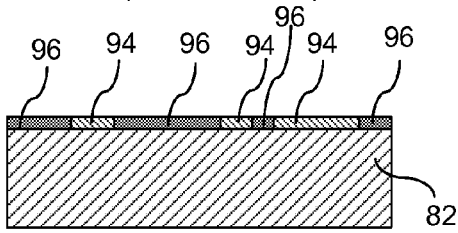
Figure 4H:
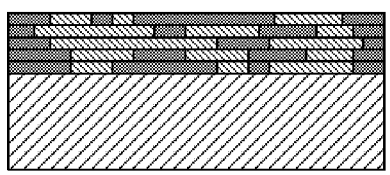
Figure 4I:
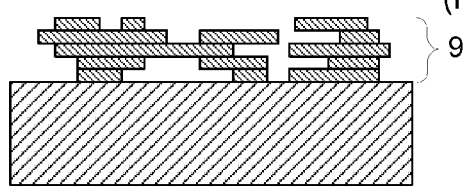

FIGS. 4A-4I illustrate various stages in the formation of a single layer of a multi-layer fabrication process where a second metal is deposited on a first metal as well as in openings in the first metal where its deposition forms part of the layer. In FIG. 4A, a side view of a substrate 82 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(*a*)-92(*c*) extending from a surface 86 of the photoresist through the thickness of the photoresist to surface 88 of the substrate 82. In FIG. 4D, a metal 94 (e.g. nickel) is shown as having been electroplated into the openings 92(*a*)-92(*c*). In FIG. 4E, the photoresist has been removed (i.e. chemically stripped) from the substrate to expose regions of the substrate 82 which are not covered with the first metal 94. In FIG. 4F, a second metal 96 (e.g., silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B-4G several times to form a multi-layer structure are shown where each layer consists of two materials. For most applications, one of these materials is removed as shown in FIG. 4I to yield a desired 3-D structure 98 (e.g. component or device).

Various embodiments of various aspects of the invention are directed to formation of three-dimensional structures from materials some of which are to be electrodeposited. Some of these structures may be formed form a single layer of one or more deposited materials while others are formed from a plurality of layers of deposited materials (e.g. 2 or more layers, more preferably five or more layers, and most preferably ten or more layers). In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable.

Various embodiments of the invention may perform selective patterning operations using conformable contact masks and masking operations, proximity masks and masking operations (i.e. operations that use masks that at least partially selectively shield a substrate by their proximity to the substrate even if contact is not made), non-conformable masks and masking operations (i.e. masks and operations based on masks whose contact surfaces are not significantly conformable), and/or adhered masks and masking operations (masks and operations that use masks that are adhered to a substrate onto which selective deposition or etching is to occur as opposed to only being contacted to it). Adhered mask may be formed in a number of ways including (1) by application of a photoresist, selective exposure of the photoresist, and then development of the photoresist, (2) selective transfer of pre-patterned masking material, and/or (3) direct formation of masks from computer controlled depositions of material.

In this application, minimum feature size (MFS) associated with a multi-layer micro-scale or meso-scale device or fabrication process represents a physical limit of how small features of the device are that can be reliably formed or defined by the process. In other words, the MFS represents the minimum reliably formed spacing between solid features of a structure on a given layer or the minimum reliably formed width of such solid features of a structure on a given layer. The MFS for minimum spacing between solid features may be termed the minimum gap size (MGS) while the MFS for the minimum width solid features may be termed the minimum solid size (MSS). In some processes the MFS results from a limited size of masking material features that may be reliably formed (i.e. minimum feature sizes of openings in the masking material or minimum feature sizes of solid portions of the masking material. In some embodiments, the minimum feature size may be a function of the thickness of the mask or the layers of material that will be deposited into the mask. Depending on whether a mask is used to deposit sacrificial material or structural material, minimum features associated with a mask may correspond to minimum features sizes of a layer of a structure that will be formed with the mask or they may represent reversed features relative to the mask. Any structure formed using a mask, will have elements or features which are at least as large as the minimum size of the features of the mask. Therefore, the MFS of the mask places a specific limit on how small a structural element (i.e. solid portion) can be and/or how close structural portions (i.e. solid portions) can be spaced to one another (i.e. how big gaps between structural portions must be).

One example class of structures or devices (i.e. one application) may involve an electrostatic actuator where a desired feature to minimize may be a separation between the a fixed element and the movable element (e.g. teeth of a comb drive or other electrostatic actuator. Another example class of structures or devices may involve a screen or filter where the feature to be minimized is the openings or passages (e.g. pores) in the structure. An additional example may be the width of elements that are intended to provide desired compliance or resilience when deflected in a given direction.

Decreasing the size of obtainable features on a device may allow an increase in the obtainable performance. Decreasing the feature size in an actuator allows the separation between structures to be reduced and may result in higher driving forces for a given supply voltage. Likewise, with a filter, a decrease in the size of the openings or in the size of the solid elements between openings in the structure allows smaller particles to be filtered and/or more filter openings to be formed in a given area or volume.

Figure 5A:
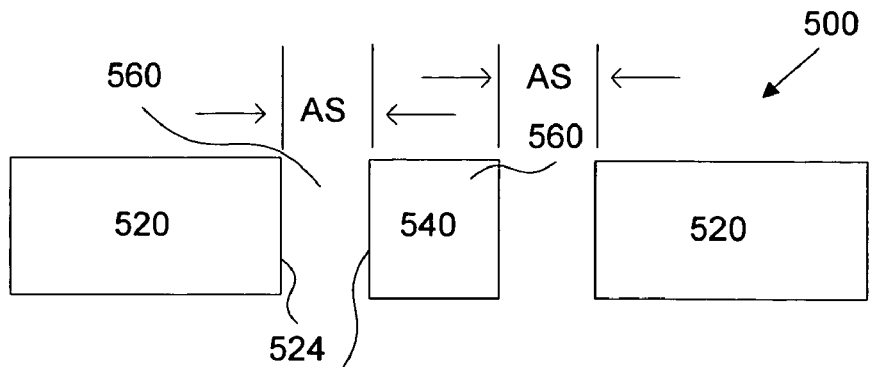
FIG. 5A schematically depicts a top view of a layered actuator and FIG. 5B schematically depicts a side view of the layered actuator.
Figure 5B:
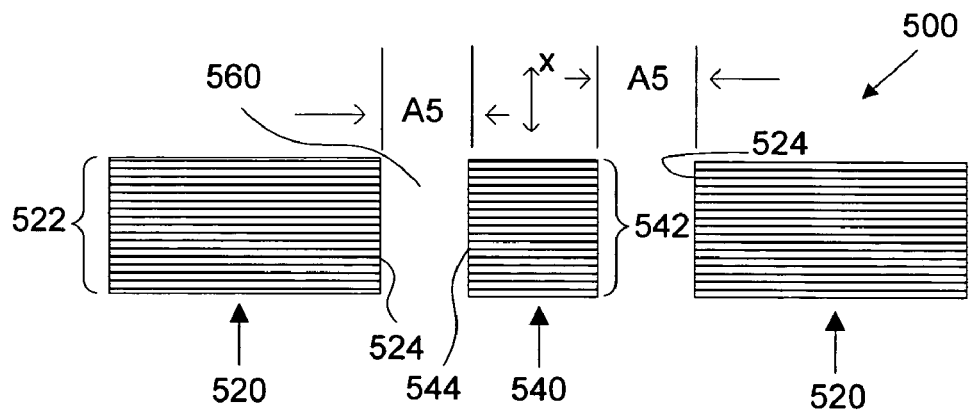

One example of an actuator is shown in FIGS. 5A and 5B. The actuator 500 includes a pair first elements (e.g. fixed elements) 520 on either side of a center slider or second element 540. Both the first element 520 and second element 540 are made from a plurality of stacked layers (e.g. horizontal layers 522 as shown in FIG. 5B). A series of layers 522 of the first element 520 include vertically aligned ends 524. The second element 540 has a series of layers 542 with vertically aligned ends 544 positioned opposite the ends 524. Separating the first and second elements are gaps 560. The gaps have a width or separation distance A5. The slider 540 is configured to allow movement in an X-direction (which is vertical as shown in the side view of FIG. 5B) upon the application of a force between the set of first elements 520 and is configured to restrict movement in the two perpendicular directions. The movement in the X-direction may be constrained by spring elements (not shown) having a desired compliance in the X-direction and such spring elements may offer limited or essentially no compliance in one or both of the two other perpendicular directions as well as in rotational directions. Examples of actuators and other elements that may benefit from the teachings found herein are described in U.S. patent application Ser. No. 10/313,795, filed Dec. 6, 2002 by Bang et al. which is incorporated herein by reference as if set forth in full herein.

The actuation force can be an electrostatic force created by an electric potential applied between the elements 520 and 540. The amount of force created for a given voltage, or the amount of voltage needed to produce a given force, is directly dependent on the distance separating the elements. The closer the elements are placed, the less voltage needed for a given displacement and/or the greater force which is produced. As a result the efficiency of the actuator can be improved my minimizing the distance of separation.

However, as noted, the minimum separation A5 between the first element 520 and the second element 540 on a given layer is limited by the MFS of the build process (i.e. the MGS) which sets a minimum gap between structural elements. As a result, the maximum performance of the actuator 500 is limited as a function of the MGS.

Figure 6:
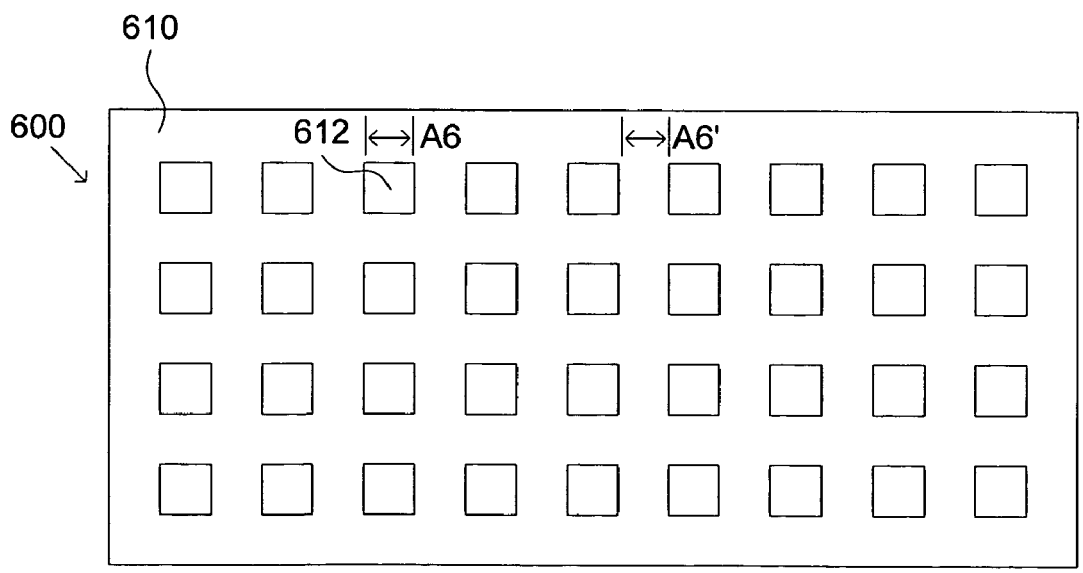
FIG. 6 schematically depicts a top view of a filter structure having a series of openings.

An example of a filter is illustrated with the aid of FIG. 6, wherein the filter 600 includes a structure 610 that defines a series of openings 612 spaced across the structure 610. The dimension of the square openings 612 is a width A6. This dimension is limited by the MGS of the process. That is, the MGS determines the how fine a filter can be. Furthermore, the minimum width of structure between openings 612 is set by the MSS which may be equal to the MGS or different from it. The smaller the MSS, the more openings that can be inserted into a given area or volume and the more efficient the filter can be.

A need exists for improved devices, and methods for fabricating such devices, which is capable of providing increased performance by reducing the width of structural elements and/or the size of openings between structural elements, to lengths less than the MSS and MGS respectively.

Some embodiments of the invention include structures (e.g. devices, components, apparatus, and the like) and methods of fabrication thereof, having features and elements sized and/or spaced at lengths which are less than the minimum feature size (MFS) or the minimum structure size (MSS) and/or minimum gap size (MGS) if they are not equal. The ability to construct and shape at less than the MFS allows for the fabrication of structures with performance and capabilities not achievable in hereto before. As set forth in greater detail herein, examples of such devices include comb-drive actuators and micro-filters.

Obtaining elements sized and spaced less than the MGS can be achieved with a variety of structures in different ways. One such manner is to utilize selective positioning and configuring of different layers (which themselves each remain limited by the MGS) of a device, to form a layered structure which has elements sized and/or spaced at distances less than the MGS. The positioning and configuring of layers can involve the shifting or staggering of openings or spaces defined in separate layers such that a resulting gap is formed between elements and has a width which is less than the MGS. Also, the layers can be arranged so that the openings or spaces in adjacent layers are connected (e.g. overlapped) to define passages in the structure that have regions sized less than the MFS.

In some embodiments where the MGS may upon initial consideration be smaller than the MSS, may be possible to reverse the these results by reversing the deposition order of a sacrificial material and the structural material. This is most particularly the case when the source of the MGS and MSS is related to minimum mask features. As such, the MSS may be made to be smaller than the MGS and negative effects associated with an excessively large MGS may be addressed using various layer-by-layer offsetting techniques described herein and as such minimum overall feature and gap size may be obtained.

An advantage provided by certain embodiments of the invention is that by reducing element size and spacing to less than the MFS, the performance and efficiency of the device can be significantly increased. As noted above, in embodiments where electrical differentials are applied between elements, to generate forces to actuate structures, the closer the positioning, the greater the force produced or less voltage that is needed. That is, by reducing the spacing, a greater force can be generated for a given voltage and/or less voltage differential is needed to achieve a desired force. Increasing the force applied to an element of the device can result in a greater operational capacity with devices such as actuators. Decreasing the voltage needed, provides a reduction in the potential for adverse effects, such as shorting, arcing, charge accumulation and/or structural damage from melting or burning out structure.

Likewise, in some embodiments of the invention, reducing the size of features to less than the MFS, can provide improve performance. Examples include filter structures which can be made finer by reducing the size of the openings (e.g. pores) across the filter. The increased filtration results from the capability to prevent passage of particles smaller than those restricted by the prior devices. That is, some embodiments of the invention allow the separation of a greater range of particle sizes from the subject solution (e.g. gases, fluids) than previously obtainable.

The methods of the invention include the fabrication of devices having at least some features (i.e. gaps or elements) sized less than the MFS (i.e. MGS and MSS). These methods can include electro-deposition processes or electroless deposition processes (e.g. electrochemical fabrication process) to build up structures through the deposition of a series of layers. The layers deposited having features arranged (e.g. by sizing and positioning) to allow the construction of intra-layer layer features less than that dictated by the MGS. For example, to fabricate a device (e.g. an actuator) having structures separated by a gap sized less than the MGS, the method can include depositing a series of layers with alternating positions of openings or spaces in each layer. Since the features on any given layer cannot be sized less than the MFS, the openings are at least the size of the MFS on each layer. However, the intra-layer staggering of the openings allows portions (e.g. alternate layer ends) of the structures to be positioned less than the MFS apart. Similar fabrication methods can be used to position openings of MGS size or larger, to connect (e.g. overlap) between layers to form passages that have a dimension smaller than the MGS. These methods are further detailed herein.

Apparatus Embodiments

The apparatus of the invention can be a layered three-dimensional structure with elements which are sized less than the minimum feature size of the layers. The three-dimensional structure includes a first element and a second element, where the second element is positioned adjacent the first element to define a third element there between. Since the first and second elements are defined by layers of the device, they must be at least as large as the minimum feature size. In contrast, the third element, being defined by the first and second elements, is capable of being sized less than the minimum feature size. The first and second elements be a variety of structures, such as single material layers or layered structural components, also they can be defined features such as openings, gaps and voids. Likewise, the third element can be a multitude of different features including an opening, gap or void.

Figure 7A:
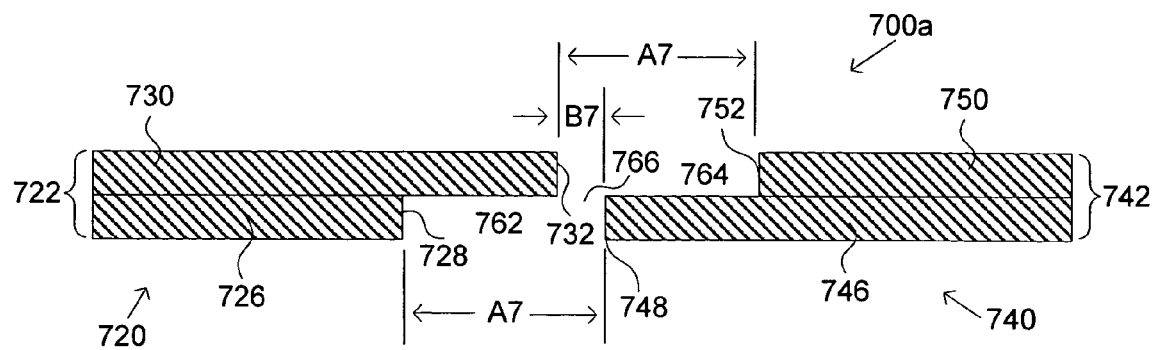
FIGS. 7A-7F schematically depict side views of various stages of fabrication of a layered structure in accordance with at least one embodiment of the invention.

An embodiment of the apparatus of the invention having two layers with overlapping gaps is shown in FIG. 7A. By offsetting the gaps in adjacent layers, a smaller overlap or defined gap can be created at the intersection of the layers and the overlap of the layer gaps. As a result, the size of this defined gap is based only on the amount of offset and is not limited by the MFS of either layer, allowing the defined gap to potentially be sized smaller than the MFS. As further detailed herein, this arrangement of the layers and gaps can be employed in a variety of structures, including actuators and filters.

FIG. 7A shows the device 700a which includes a first structure 720, a second structure 740 and a gap 760 separating them. The first structure 720 includes a set of layers 722 with a first or base layer 726 and a second or top layer 730. The base layer 726 has an end 728 and the top layer has an end 732. The second structure 740 includes a series of layers 742, with a first or base layer 746 and a second or top layer 750. The base layer 746 has an end 748 and the top layer has an end 752.

The first layers 726 and 746 are commonly aligned with a gap separating them. Depending on the specific fabrication method (further detailed herein), the first layers can be constructed in a common layer of material with the gap defined therein. Likewise, the second layers 730 and 750 are commonly aligned and are capable of having been formed from the same layer of material.

The layers 722 and 742 can be of any of a variety of suitable material, some examples including gold, silver, nickel, copper, and the like. In some embodiments the material used for the layers is a nickel. The layers 722 and 742 can vary in a range of possible thickness, for example in some embodiments, layers 722 and 742 have a thickness in the range of 1 μm to 20 μm. In particular embodiments the thickness of the layers is about 6 μm. The listed materials and layer thickness can be applied to other embodiments of the invention set forth herein.

The gap 760 includes a sub-gap 762, set between the ends 728 and 748, and a sub-gap 764, between the ends 732 and 752. The sub-gaps 762 and 764 can vary in size, depending on the embodiment, as shown they each have a width of the distance A7. While the width A7 can be greater than the MFS, the minimum obtainable size of the width A7 is the MFS. The sub-gaps 762 and 764 are positioned to overlap, forming an overlap, defined or third gap 766. The overlap gap A7 has a width of the distance B7, which is capable of being sized less than the MFS.

The value of the MFS will vary depending on the particular fabrication methods employed (as described further herein). For example, with an INSTANT MASK™ (detailed herein), the MFS is related to the minimum size of features in the mask itself. In some embodiments, the MFS for the INSTANT MASK™ process is 20 μm to 40 μm.

The device 700a can be used in a variety of applications, including actuator or filter structures. For example, with the first structure 720 and the second structure 740 separated from each other (no connecting structure shown in FIG. 7A), and with either or both the structures 720 and 740 configured to be movable, the device 700a can function, upon the application of a electrical differential between the structures, as an actuator. With the first and/or second structure moving vertically towards each other (e.g. a vertical comb actuator), the ends 732 and 748 will move to be separate by only the distance B7, as the ends 732 and 748 align with each other. This allows the performance of such an actuator to be increased as the separation between the structures 720 and 740 is reduced from the MFS limited distance A7 to the shorter distance B7. As described herein, by increasing the number of layers, as the actuator moves, the number layers which can be positioned within a distance less than the MFS can also be increased, for an associated increase in performance. Also as described herein, such actuators can be configured to move in horizontal and depth-wise directions.

A filter is another example of an application of the device 700. This can be achieved by flowing a substance (such as a gas, liquid, a series of particles, etc.), through the device such that the gap 760 becomes a flow passage. Since the overlap gap 766 has the minimum dimension of the passage (e.g. width B7), it will determine the degree of filtration of the device 700. Since embodiments of the invention allow the forming of openings sized less than the MFS, the performance of such a filter can be increased by allowing it to prevent passage of a greater range of particle sizes. That is, the amount of filtration can be increased by restriction passage of even smaller particles.

Fabrication Method Embodiments

Devices such as the device 700a can be fabricated by a variety of different embodiments of the method of the invention. In general, these methods include depositing a first layer with a first gap and then over the first layer depositing a second layer with a second gap. The second gap is positioned to overlap the first gap such that a third gap is defined between (at the intersection of) the first layer and the second layer. This provides the advantage that, unlike the first and second gaps which must be sized at least as large as the MFS, the third gap is only dependent on the amount of overlap of the other two openings.

Figure 8:
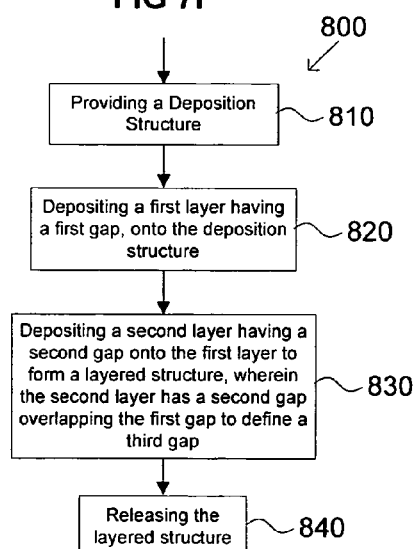
FIG. 8 is a flowchart of a method of least one embodiment of the invention.

As shown in FIG. 8, in at least one embodiment the method is a method for fabricating a thin film (e.g. MEMS) device having a minimum feature size 800, which includes the processes of providing a deposition structure 810, depositing a first layer having a first gap, onto the deposition structure 820, depositing a second layer having a second gap onto the first layer to form a layered structure, wherein the second layer has a second gap overlapping the first gap to define a third gap 830, and releasing the layered structure 840. As will be detailed herein, structures obtainable by operation of the method 800 can be of a variety of different embodiments, examples of which are shown herein.

During the process providing a deposition structure 810, a structure with a suitable surface for the later deposition of the first layer is obtained. The deposition structure can be any of several different types of structures including, a substrate and a layered or formed structural or sacrificial structure. With the deposition structure being a substrate any of a variety of suitable materials, formable to have a surface smooth enough to allow for the deposition of the sacrificial material, can be used. Such suitable materials can include silicon, a metal (e.g. nickel, copper, silver, gold, etc.), glass or plastic.

In certain embodiments where the final device needs to be capable of being released from the substrate, where elements or structures of the device need space below the first layer to operate (e.g. actuators), or where a fluid or gas is to flow through the an opening in the device (e.g. filters), at least a portion of deposition structure can be of a sacrificial material to space the device from a substrate or other structure. In such embodiments, the deposition surface is positioned upon the sacrificial layers. By later removing the sacrificial layers, an open space will be created to release the device, allow movement of device, or create a pathway for a flow of a fluid or gas.

In such embodiments, the process 810 can include the steps of providing a substrate, depositing sacrificial material upon the substrate, and forming a deposition surface on the sacrificial material. The sacrificial material can be one or more layers. Layers of sacrificial material can vary in thickness, in some embodiments the layers are between 4 μm and 20 μm thick. The sacrificial material can be any of a variety of suitable materials (e.g. gold, silver, nickel, copper, and the like), with some embodiments having sacrificial material as a silver. Deposition of the sacrificial material can be any of a variety of methods. Likewise, the deposition surface provided can be formed through any of a variety of methods well known in the art including etching (wet or dry), milling, lapping, molding, extrusion and the like.

In some embodiments, the process 810 can also include applying a seed layer on the structure in order to facilitate later layer deposition. For instance, if the material of the structure used is not sufficiently conductive (e.g. plastic or glass) to allow electrodeposition techniques to be employed for layer deposition, then a seed layer of conductive material can be used.

Figure 7B:
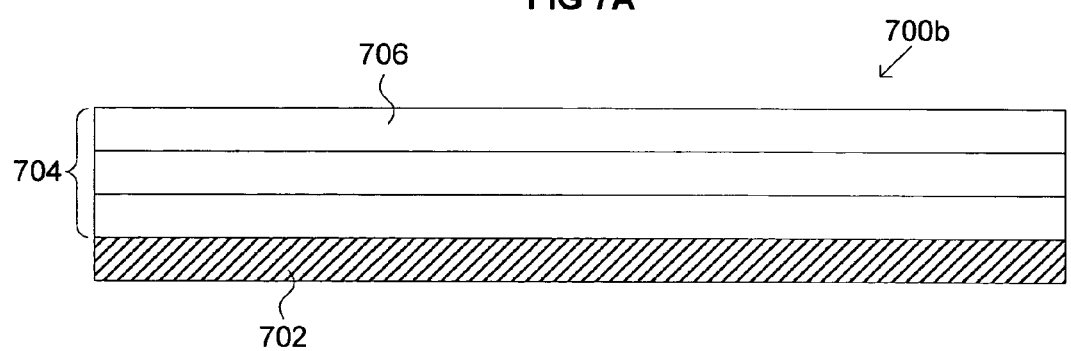

Operation of the process of providing a deposition surface 810 on a sacrificial layer can result in the embodiment of a device 700b shown in FIG. 7B. A device 700b includes a substrate 702, a layering of sacrificial material 704 and a deposition surface 706.

Figure 9:
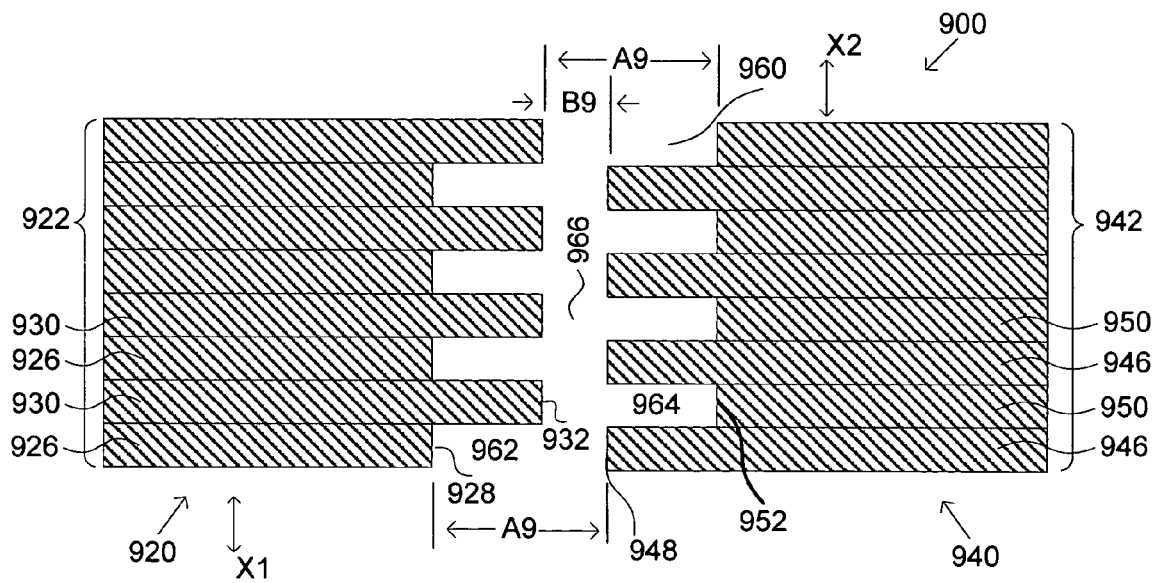
FIG. 9 schematically depicts a side view of a layered structure in accordance with at least one embodiment of the invention.

Another process of the method 800 is depositing a first layer having a first gap onto the deposition structure 820, as shown in FIG. 9. This process 820 can further include the steps of depositing a first layer of material with a gap defined therein, depositing a sacrificial material to provide a continuous layer, and forming a deposition surface.

Figure 7C:
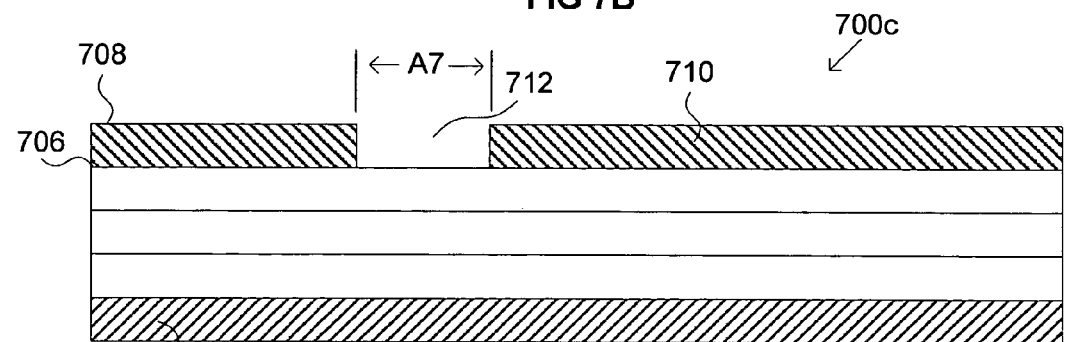

FIG. 7C sets forth an embodiment of a structure formable by the operations of the process 1720. The step of depositing a first layer can provide the layer 708 deposited over the deposition surface 706. The first layer 708 has the structure 710 with a gap 712. The gap 712 has a width of A7.

The material of the first layer 708 can be deposited to a thickness greater that the desired thickness of the first layer 708 as any additional material can be removed during the step of forming a deposition surface. In this embodiment the first layer 708 is a structural material. The specific material used for the structural material can vary (including gold, silver, nickel, copper, and the like), in some embodiments the material is a nickel.

A variety of processes can be used to carry out the deposition of the material of the first layer 708. In some embodiments, the deposition process generally includes, providing a pattern mask defining the deposition regions, depositing the first material, and removing the mask.

The step of providing a mask can include the use of a variety of different processes using different type of masks and applications. Some suitable masking techniques include use of a preformed mask (e.g. a CC mask) and some of a mask formed during the process on the deposition surface (e.g. an adhered mask).

One type of suitable preformed mask is an INSTANT MASK™ (detailed above), which can include a mask-on-anode (MOA) process and/or an anodeless instant mask process. In turn, the mask-on-anode process can employ a variety of masking approaches, such as, conformable contact masking, contact masking and proximity masking. A detailed description of these processes and associated structures are detailed above.

Figure 1A:
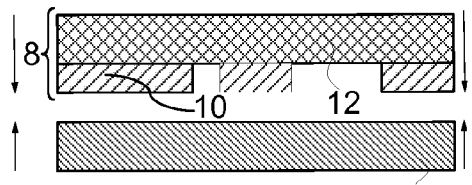
FIGS. 1A-1C schematically depict side views of various stages of a CC mask plating process, while FIGS. 1D-G schematically depict a side views of various stages of a CC mask plating process using a different type of CC mask.

While specific applications of mask-on-anode processes can vary, typically such a process involves positioning a patterned non-conductive (insulating) mask on or over an anode. In most cases, the mask and anode are abutting substantially planar structures which allow them to be positioned at least adjacent to the planar surface on which layer deposition will occur. An example of such a configuration is shown in FIG. 1A, where the mask (insulator) 10 is attached to anode 12 and positioned near the substrate 6.

Figure 1B:
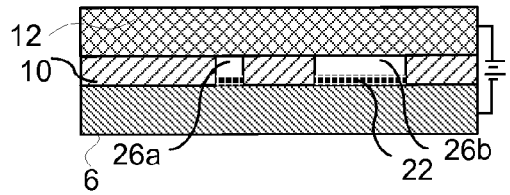
Figure 1C:
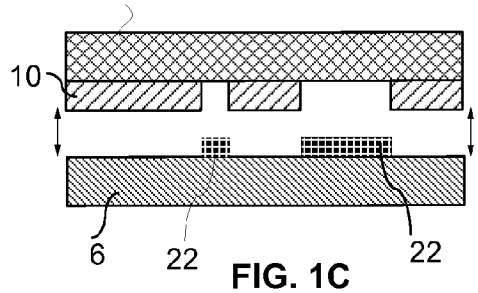
Figure 1D:
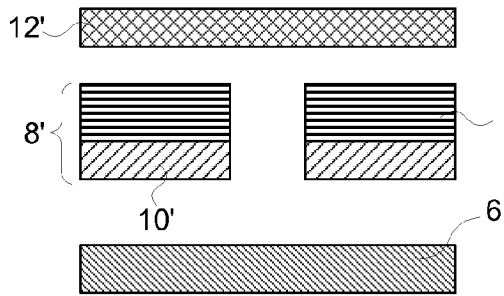
Figure 1E:
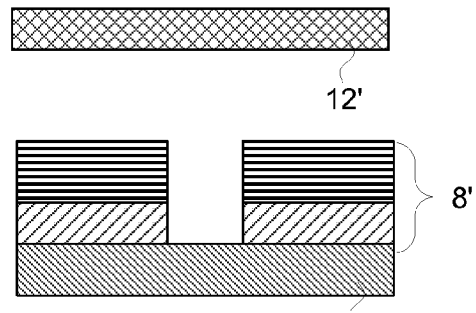
Figure 1F:
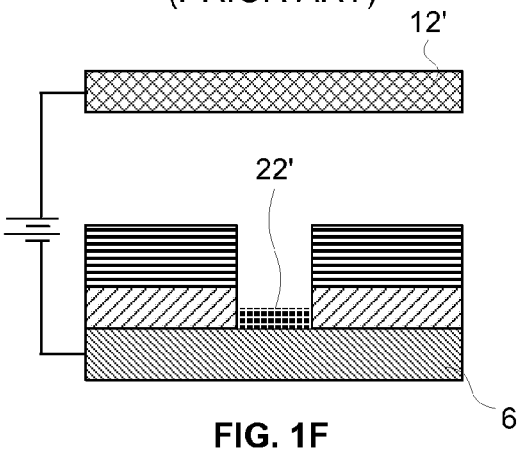
Figure 1G:
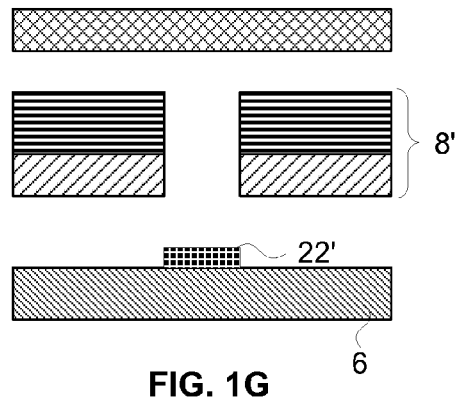
Figure 2A:
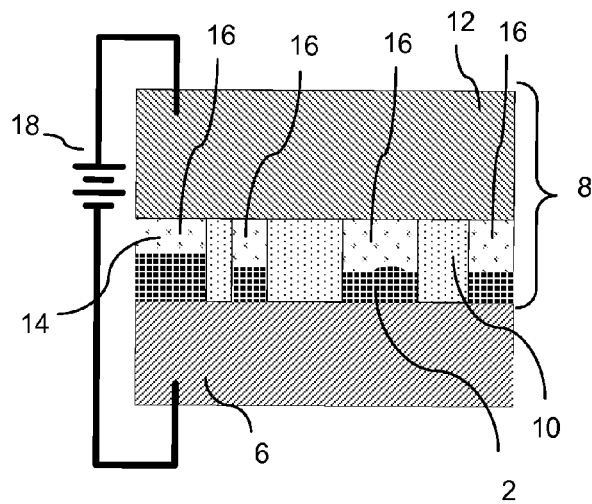
FIGS. 2A-2F schematically depict side views of various stages of an electrochemical fabrication process as applied to the formation of a particular structure where a sacrificial material is selectively deposited while a structural material is blanket deposited.
Figure 2B:
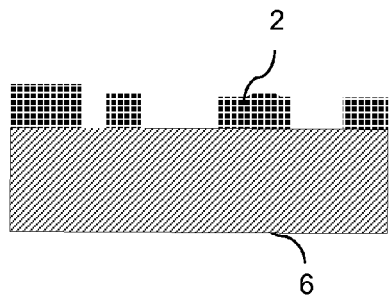
Figure 2C:
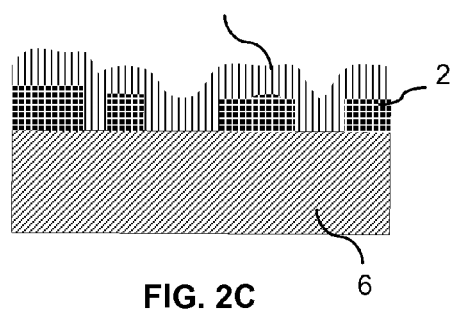
Figure 2D:
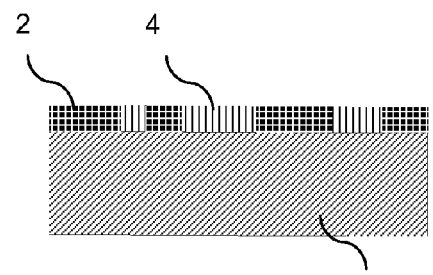
Figure 2E:
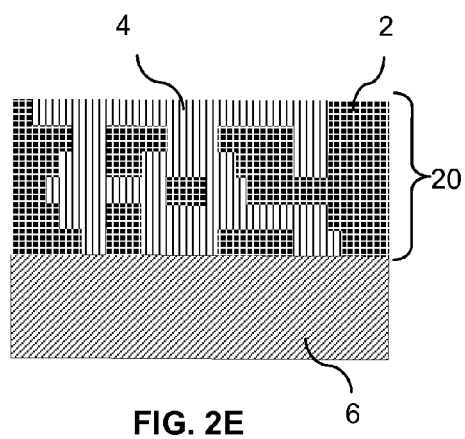
Figure 2F:
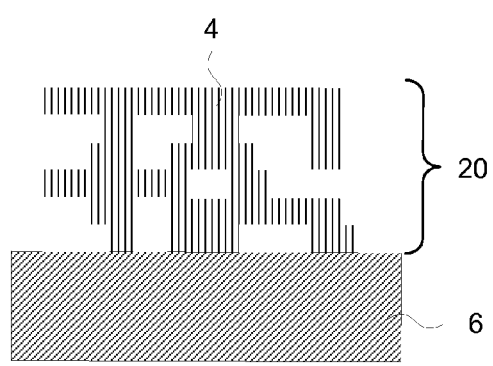
Figure 3A:
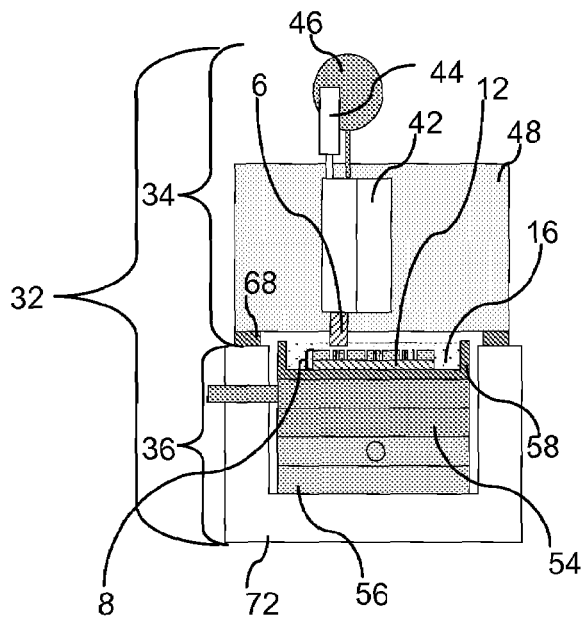
FIGS. 3A-3C schematically depict side views of various example apparatus subassemblies that may be used in manually implementing the electrochemical fabrication method depicted in FIGS. 2A-2F.
Figure 3B:
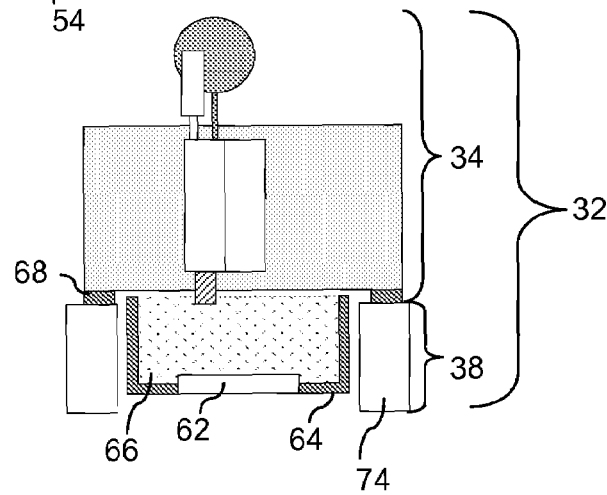
Figure 3C:
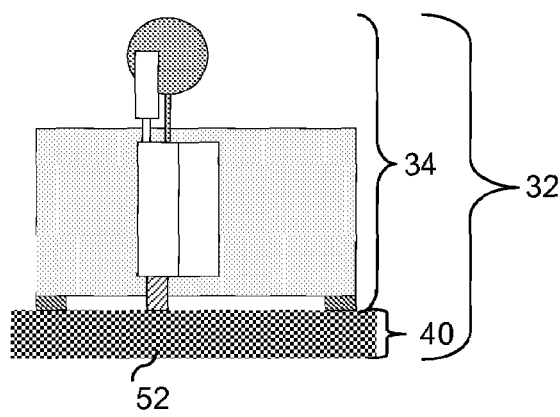

The anode is of an electrically conductive material which during the electro-deposition process (e.g. electrochemical fabrication) is a source for the deposition material. Also, the anode can function to provide structural support for the mask. The mask is patterned to define the locations at which the deposition will, and will not, occur. That is, since the mask is non-conductive (e.g. a dielectric material), and the deposition process is performed in a conductive medium (e.g. an electrolyte solution), the areas of the deposition surface left exposed by the mask will receive deposited material. An example of such deposition is shown in FIG. 1B, where material 22 is selectively deposited the substrate 6 by electrodepositing material through apertures 26a and 26b in the insulator 10.

A conformable contact mask can be used in the mask-on-anode process. The conformable contact mask (CC mask) is deformable so that when pressed into contact with a non-uniform deposition surface, the mask can deform so as to contact all portions (high and low points) of the surface. This prevents gaps from forming between the mask and surface, which may otherwise occur with a non-deformable mask. Such gaps are to be avoided as they can allow material to be deposited at undesired locations. Material being deposited at these gaps or other such undesired locations is typically referred to as flashing. The CC mask can be a silicone (or similar polymer) to provide deformation and non-conductive properties. The CC mask can be mounted to a substantially rigid or flexible anode, or other support structure, as set forth in detail herein. A detailed discussion of the use and configuration of conformable contact masks is provided above and as shown in FIGS. 1A-1G, 2A-2E and 3A-3C.

Other masks include contact masks and proximity masks. While a contact mask is configured to directly contact the deposition surface during deposition, unlike a CC mask, a contact mask can be substantially rigid. A contact mask can be employed in situations where there is limited, or no, potential for gaps or voids to exist between the mask and the deposition surface. That is, when the mask and the deposition surface fit together close enough to sufficiently prevent flashing or other undesired material deposition, then a contact mask can be used. In some cases contact masks are mounted on flexible anodes, or other supporting structures, to allow the mask/anode element to conform to variations in the deposition surface.

With proximity masking the mask is kept from direct contact with the deposition surface. Depending on the embodiment, the distance between the mask and the deposition surface can be minimized to limit any deposition in undesired areas (e.g. flashing). Because a proximity mask is not in direct contact with the deposition surface, removing it away from the deposition surface is facilitated. A proximity mask provides the benefit of reducing the potential for damage from removal of the mask from the deposition surface, increasing the usable life of the mask.

As with CC masks, contact and proximity masks typically are made of non-conducting material patterned to allow selective deposition on the deposition surface.

In other applications, the mask can be positioned so that it is not mounted directly to the anode. Instead, the mask can be mounted on a supporting structure remote from the anode. Examples of this type of mask include an Anodeless INSTANT MASK™ (AIM) and an anodeless conformable contact (ACC) mask. A description of such embodiments is set forth in detail above and in FIGS. 1D-1F. Wherein the mask 8' is positioned on a structure 20' and is separated a distance from the anode 12'.

A benefit from employing a remote anode is that the degradation of the anode caused during the electrodepositing from providing the deposition material, does not affect the structural integrity of mask/support element. With the mask mounted directly to the anode, as electrodeposition occurs, material is lost from the anode at points under the mask. This under-cutting reduces the structural support for the mask, increasing the potential for gaps to form between the mask and the deposition surface, allowing for flashing to form, and reduces the life of the mask in the process.

Another type of mask available is an adhered mask. Unlike mask-on-anode and anodeless instant mask techniques (e.g. INSTANT MASK™, AIM, ACC processes), with adhered masking the mask is formed during the fabrication process, adhered directly to the deposition surface and is not reusable after the layer deposition is completed. However, adhered masks are similar to Instant Masks in that they are patterned to define structures to be deposited. An adhered mask can be any of a variety of materials including a photoresist.

An example of an adhered mask process is shown in FIGS. 4A-4I, illustrating various stages in the formation of a single layer of a multi-layer fabrication process. During the fabrication process shown, a second material (e.g. a second metal) is deposited on a first material (e.g. a first metal), and in openings in the first material (patterned by the adhered mask) to form portions of what will become the deposited layer. In FIG. 4A, a side view of a substrate 82 is shown, onto which a patternable photoresist 84 is cast as shown in FIG. 4B. In FIG. 4C, a pattern of resist is shown that results from the curing, exposing, and developing of the resist. The patterning of the photoresist 84 results in openings or apertures 92(a)-92(c) extending from a surface 86 of the photoresist through the thickness of the photoresist to a deposition surface 88 of the substrate 82. In FIG. 4D, a first material 94 (e.g. a metal such as nickel) is shown as having been electroplated into the openings 92(a)-92(c). In FIG. 4E, the photoresist has been removed (i.e. chemically stripped) from the substrate to expose regions of the substrate 82 which are not covered with the first material 94. In FIG. 4F, a second material 96 (e.g. a metal such as silver or copper) is shown as having been blanket electroplated over the entire exposed portions of the substrate 82 (which is conductive) and over the first material 94 (which is also conductive). FIG. 4G depicts the completed first layer 97 of the structure which has resulted from the planarization of the first material 94 and second material 96 down to a height that exposes the first material 94 and sets a thickness for the first layer 97. In FIG. 4H is shown the result of repeating the process steps shown in FIGS. 4B-4G several times to form a multi-layer structure 98, where each layer consists of two materials set in varying patterns. For most applications, one of these materials is removed as shown in FIG. 4I to yield a desired 3-D structure 99 (e.g. a component or a device).

A method for forming microstructures using photoresist and electrochemical fabrication techniques is taught in U.S. Pat. No. 5,190,637 to Henry Guckel, entitled "Formation of Microstructures by Multiple Level Deep X-ray Lithography with Sacrificial Metal layers ('637 patent). This patent teaches the formation of metal structure wherein, a first layer of a primary metal is electroplated onto an exposed plating base to fill a void in a photoresist, the photoresist is then removed and a secondary metal is electroplated over the first layer and over the plating base. The exposed surface of the secondary metal is then machined down to a height which exposes the first metal to produce a flat uniform surface extending across the both the primary and secondary metals. Formation of a second layer may then begin by applying a photoresist layer over the first layer and then repeating the process used to produce the first layer. The process is then repeated until the entire structure is formed and the secondary metal is removed by etching. The photoresist is formed over the plating base or previous layer by casting and the voids in the photoresist are formed by exposure of the photoresist through a patterned mask via X-rays or UV radiation.

For the deposition of the material of the first layer 708 onto the deposition surface 706, as shown in FIG. 7C, any of the above described masks and masking techniques can be employed. That is, selective deposition of the first layer 708 can be performed by a variety ways including INSTANT MASK™, mask-on-anode (MOA) (e.g. conformable contact masking, contact masking and proximity masking), anodeless instant mask (AIM), anodeless conformable contact (ACC) mask, and adhered mask processes. Likewise, methods detailed in the disclosures (e.g. the '630 patent and the '637 patent) incorporated by reference herein, may be used.

The use of a mask to deposit the first layer 708 limits the minimum obtainable size of any feature or element defined on the layer 708 to the minimum feature size (MFS) of particular the mask used. The specific dimension of the MFS is dependent on the type of mask and masking technique used. The MFS is a direct function of smallest feature which can be defined during the fabrication of the mask itself. As a result the minimum dimensions of the gap 712 defined in the structure 700c is the MFS of the process used.

After application of a mask the material of the first layer 708 is deposited onto the deposition surface 706, by any of a variety of electrodeposition methods including any of the electrochemical fabrication method described here. Then the mask used is removed and, as detailed above, the type of mask removal is dependent on the type of mask used. For preformed masks, the mask is removed by physically separating the mask from its position during deposition and away from the deposition surface. With adhered masks the removal is typically done with a solvent, although etching or planarization may be employed.

Following the deposition of the structural material of the first layer 708, and the mask removal, a sacrificial material can be deposited to fill the first gap 712.

Another step in the process of depositing a first layer having a first gap 820 is the step of depositing a sacrificial material to provide a continuous layer of material. The deposition of the sacrificial material allows later shaping and sizing of the layer by covering any exposed portions of the deposition surface such that a continuous material layer is formed. That is, by filling all exposed areas and gaps with the sacrificial material, methods such as planarization, which need a continuous material to achieve desired results, can be employed. The sacrificial material also functions to provide support to the structure of the first layer during the later planarization process go to prevent undesired deformation of the structure.

Figure 7D:
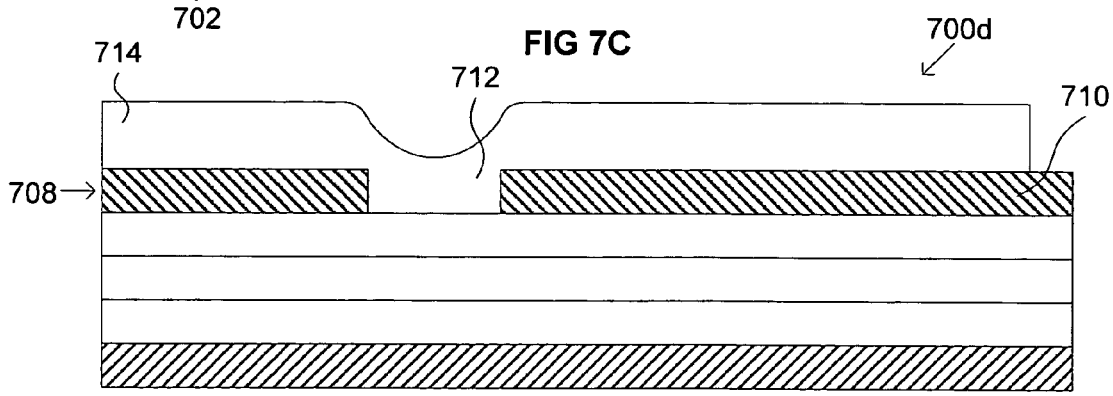

An embodiment of a structure 700d, which is obtainable by operation of the sacrificial material deposition step, is shown in FIG. 7D. As can be seen, the gap 712, the structure 710 have been covered by a sacrificial material 714.

The sacrificial material 714 can be deposited by any of a variety of methods including a blanket electrodeposition. During a blanket deposition the sacrificial material 714 is deposited upon all exposed (conductive) areas of the entire structure 700c. A mask is not typically used since the deposition is not selective. However, in some embodiments, to protect the exposed sides (not shown) of the substrate 702 from undesired material deposition, an insulating structure (not shown) is moved into position about the sides of the substrate 702. Typically, the insulating structure is ring shaped to match a cylinder shaped substrate.

The blanket deposition can be achieved by electroplating from an anode (not shown), composed of the sacrificial material 714, through an appropriate plating solution (not shown), and to the cathode, which here is the structure 700c (or at least the exposed surface thereof).

It should be noted that in alternate embodiments of method the material of the structure 710 can be a sacrificial material instead of a structural material, and likewise the sacrificial material 714 is a structural material.

The next step in the deposition process 820 is the step of forming a deposition surface. During this step the layer is sized and shaped by removing the excess portions of the deposited layer material (e.g. the structural and sacrificial material), to achieve a layer of a desired thickness and surface.

Figure 7E:
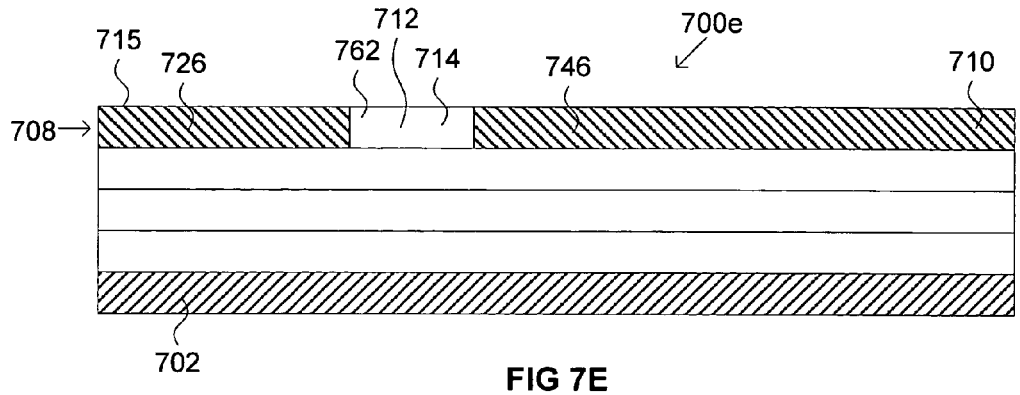

Shown in FIG. 7E is an embodiment of a structure 700e which can be fabricated by this shaping step. The structure 700e includes the layer 708 with the structure 710 and gap 712, sized to a desired thickness. By sizing the layer 708, the first base layer 726 and second base layer 746 of the device 700a (as shown in FIG. 7A) are formed. The layer 708 also includes a deposition surface 715 for the later deposition of the second layer 716. The surface 715 is sufficiently smooth to allow deposition of the second layer 716.

The process of sizing and shaping the deposited material to achieve the structure 700e can be achieved by any of a variety of methods well known in the art including, etching (wet or dry), milling, lapping and the like. One such method is planarizing by a lapping operation. During lapping, material is removed by moving an abrasive element over, or relative to, the surface of the structure 700d (shown in FIG. 5D), until a desired thickness of the layer and smoothness of the surface is achieved.

Another process of the method 800 is depositing a second layer having a second gap onto the first layer to form a layered structure, wherein the second layer has a second gap overlapping the first gap to define a third gap 830. This process functions to define a gap or opening set at the intersection of the first and second layers which is capable of being sized less than the gaps set in either layer. Because the size (e.g. width) of the third gap is solely dependent on the positioning of the first and second gaps, it is not limited by any feature size limitations typically inherent in the manufacture of a layer of material. As noted herein, such a limitation is the MFS, which the third gap can be sized less than.

The deposition process 830 can be performed in a variety of ways. In one performance of the process 830 the second layer is deposited by the selective deposition steps of applying a mask, depositing the material and removing the mask Any of a variety of described masks and masking techniques (e.g. INSTANT MASK™, MOA, AIM, ACC, methods detailed in the '630 patent and '637 patent disclosures), can be employed. Deposition of the material can be performed by any of a variety of electrodeposition methods described herein. The mask is removed by a process appropriate to the type of mask used. Since this embodiment of the process lacks a forming (sizing and shaping) step, the thickness of the layer set when the material is deposited. Also, the upper surface (e.g. later deposition surface) of the second layer is formed by the electrodeposition and not by a planarization or other forming process.

Figure 7F:
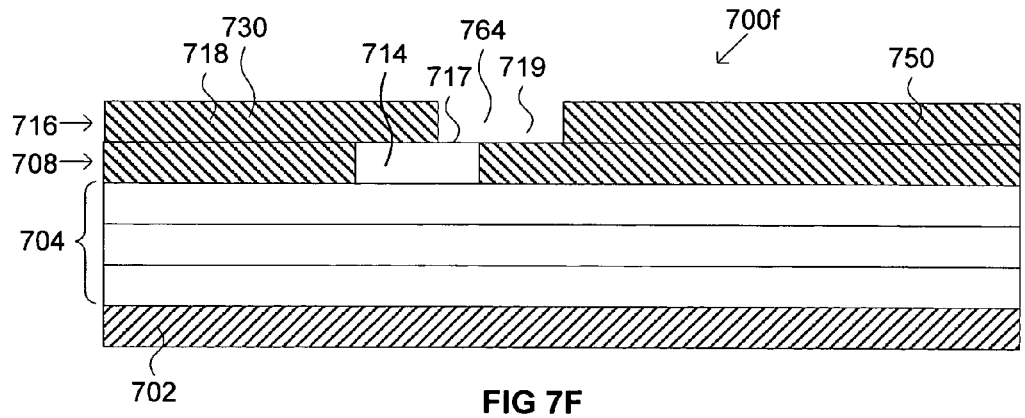

An embodiment of a structure 700f that is obtainable by an embodiment of the deposition process 830 using only steps of selective deposition to form a second layer 716 is shown in FIG. 7F. As shown, the second layer 716 includes a second structure 718 defining a second gap 719. The second gap 719 is positioned to overlap the first gap 714 to define a third gap 717. With the second layer 716 sized to the desired thickness of the final structure, the second structure 718 includes the top layer 730 and the top layer 750, separated by the sub-gap 764.

The deposition process 830 can include, in addition to the selective deposition step, the steps of depositing sacrificial material and forming the second layer. These steps are similar to those detailed herein as part of the deposition process 820 (above). Namely, the sacrificial material is deposited to fill the gap 719, by blanket deposition or other methods and then the structure is formed by sizing and shaping through any of a variety of methods including planarization.

The next process in the fabrication method 800 is releasing the releasing the layered structure 840. During this process the structures defined during the deposition of layers are released from the built up structure by removing the sacrificial material. The sacrificial material can be removed by any of a variety of methods including using an etching process. Useable etching processes include applying a chemical etchant which is sufficiently reactive with the sacrificial material to dissolve it. However, to maintain the desired structures during the etch, the etchant used should be substantially non-reactive with the structural material, or at least limited in its reaction to the structural material to prevent, or properly limit, etching of the structural material.

FIG. 7A shows an embodiment of a structure 700a which can be obtained after performing the releasing process 840. This is achieved by removing the sacrificial material from the structure 700f (as shown in FIG. 7F). The material removed includes the layers 704 and the sacrificial material 714 in the gap 712. Depending on the embodiment of the process 830, any sacrificial material deposited in gap 719 is also removed.

In an alternate embodiment, the method 800 can further include a process of moving the first structure or the second structure towards the other structure, or moving the first and second structures towards each other to reduce the spacing between the structures. This additional process is applicable to embodiments where the device is an actuator or other moving structure. This process can be achieved by steps involving the application of a charge between the structures to create a force there between.

Actuator Embodiments

Shown in FIG. 9 is an embodiment of the invention which can have a movable structure and which is capable of functioning as an actuator. The device 900 has a first structure 920 and a second structure 940 separated by a gap 960. Depending on the embodiment, one or both of the structures is capable of moving and/or being actuated. In some embodiments, one structure is set in a fixed position, while the other structure is movable. The device 900 has a series of layers having gaps that are offset from each other in a staggered arrangement to define a set of recessed and extended regions. This provides an advantage of increased performance by allowing the extended portions of the layers to be positioned closer to each other than is possible with aligned gaps.

The device 900 can be a portion of an actuator such as a vertical comb actuator. The structures 920 and 940 can be electrodes. The first structure 920 may move in a vertical direction X1 and/or the second structure 940 may move in a vertical direction X2. One of the structures 920 or 940 may be fixed in position by being mounted to any of a variety of structures (not shown). With one or both movable structures 920 and 940, movement can be achieved by applying a force between the structures. One means of generating such a force is by applying a voltage differential between the structures.

The first structure 920 includes a series of layers 922. The layers 922 include first recessed layers 926 and first extended layers 930. The recessed layers 926 are positioned back from the rest of the structure and the extended layers 930 are positioned out towards the second structure 940. The recessed layers 926 have ends 928 and the extended layers 930 have ends 932.

Likewise, the second structure 940 includes a series of layers 942. The layers 942 include second extended layers 946 and second recessed layers 950. The extended layers 946 are positioned out towards the first structure 920 and the recessed layers 950 are positioned back from the rest of the structure. The recessed layers 950 have ends 952 and the extended layers 946 have ends 948.

In the position of the device 900 as shown in FIG. 9, the gap 960 includes a first sub-gap 962 and a second sub-gap 964. The first sub-gap 962 and the second sub-gap 964 overlap to form a third sub-gap 966. The first sub-gap 962 is positioned between the ends 928 and 948, and the second sub-gap 964 between the ends 932 and 952. The widths of the sub-gaps 962 and 964 are a distance A9, which is some embodiments is the MFS. In alternate embodiments to that shown in FIG. 9, the specific horizontal positioning of the sub-gaps can vary along each aligned layer (e.g. positioned in part on either of the two structures). However, the minimum width of the sub-gaps, regardless of their specific positioning is the MFS.

Between the ends 932 of the first extended layers 930 and the ends 948 of the second extended layers 946, the separation is a distance B9. This is the width of the third gap 966. The distance B9 is set by the about of overlap between the first sub-gap 962 and the second sub-gap 964. As such, the length of the distance B9 is independent of the widths A9 of the sub-gaps 962 and 964 and therefore of any limitation in the size of the sub-gaps, including the MFS. As a result, the separation B9 between the first structure 920 and the second structure 940 is capable of being a distance which is less than the MFS.

As the positions of the first structure 920 and the second structure 940 move relative to one another, the size and shape of the gap 960 will change, and the sub-gaps 962 and 964 will no longer be defined in the gap 960 as shown in FIG. 9. As the structures move the extended layers 930 and 946 will align to provide a narrow sub-gap (with a width of B9) there between. However, at the same time the recessed layers 926 and 950 will align to form an extended sub-gap. While the alignment of the extended layers 930 will tend to improve performance by positioning bringing the first structure 920 and second structure 940 closer, the extended gaps will tend reduce performance by spacing portions of the structures further apart.

The device 900 can be fabricated by any of a variety of methods including those set forth in the fabrication method 800 described herein. In fabricating the device 900 the processes of providing a deposition structure 810, depositing a first layer with a first gap 820, depositing a second layer with a second gap overlapping the first gap to define a third gap, forming a layered structure 830 and releasing the layered structure 840 are generally performed as described, except the processes of depositing a first layer 820 and depositing a second layer 840 are repeated to form the device 900 with the series of layers 922.

The exact number of layers that are deposited to form the device 900 can vary depending on the needs of the specific requirements of the application of the device 900. Also, the number and order of the first and second layers can be modified as required.

To facilitate the deposition of additional layers over the initial second layer, the depositing process 840 can include the steps of depositing a sacrificial material to fill the second gap and the forming of the second layer to provide a continuous and sufficiently smooth deposition surface.

Offset Actuator Apparatus Embodiments

To avoid or lessen the effect of the alignment of recessed layers forming extended sub-gaps, the structures can fabricated to be offset in the alignment of the layers. During fabrication, a layer on one structure which is not commonly aligned with a layer on the opposing structure, is not limited to being separated by a gap which is at least MFS wide. This is because with the layer offset, there is no corresponding structure on the opposite structure. This allows positioning of the end of the layer closer to the opposing structure than is possible with commonly aligned layers which required a minimum MFS separation. After fabrication the offset structures can be actuated into a position where the offset layers are commonly aligned.

Figure 10:
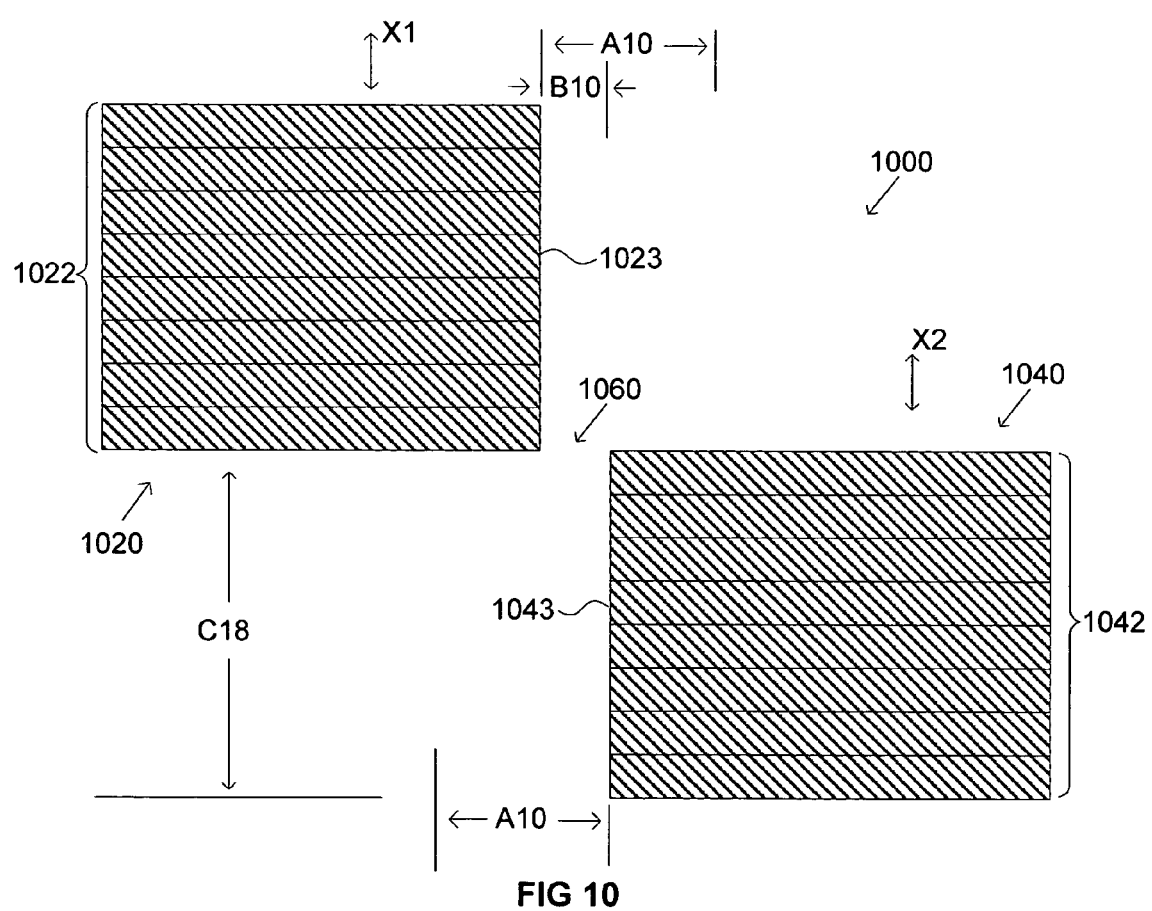
FIG. 10 schematically depicts a side view of a layered structure in accordance with at least one embodiment of the invention.
Figure 11:
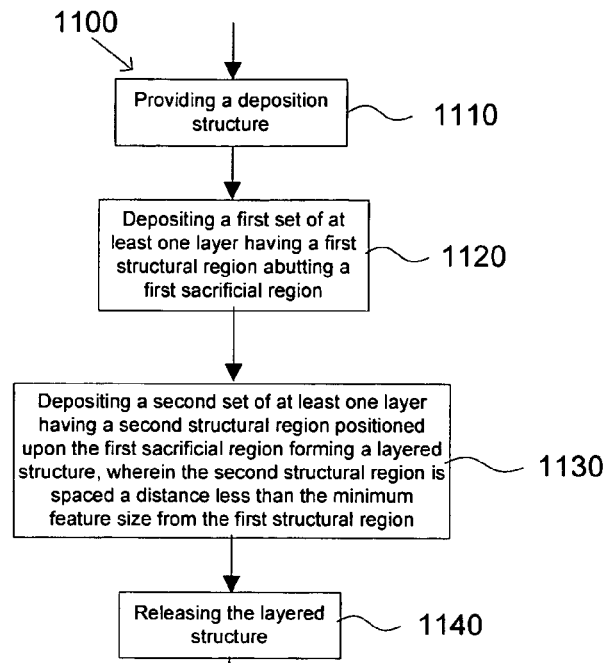
FIG. 11 provides a flowchart of a method of least one embodiment of the invention.

An embodiment of the apparatus having offset layers is set forth in FIG. 10. Here, device 1000 includes a first structure 1020 and a second structure 1040 which are vertically offset from each other, such that none of the layers are commonly horizontally aligned. The amount of the vertical offset is a distance C10, which in this embodiment is equal to the vertical height of the structures. As detailed herein, this vertical offset allows for significantly closer horizontal positioning of the two structures as compared to devices with horizontally aligned layers.

Because there are no horizontally aligned layers common to both structures, the layers are not limited in horizontal positioning by the MFS. As such, this embodiment provides the benefit that the structures can be fabricated to have a horizontal separation of significantly less than the MFS, thus providing an increase to the performance of the device 1000. However, because of the vertical offset C10, to move the structures 1020 and 1040 into a position where the layers are commonly aligned (horizontally), requires a significant force to be applied. This requires an associated high voltage differential to be applied to the structure. The use of high voltages can result in shorting, burn-outs, charge accumulation, and/or the need to over size components to accommodate the charge.

The first structure 1020 includes a set of layers 1022 having aligned ends 1023. The second structure 1040 has a set of layers 1042 with aligned ends 1043. The ends 1023 and the ends 1043 are separated by a lateral distance B10, which is capable of being less than the distance A10. The distance A10 being at least the MFS. A gap 1060 is positioned between the first and second structures 1020 and 1040. As the structures 1020 and 1040 move vertically towards each other, the gap 1060 will change in its vertical size but will keep the width of the distance B10.

The device 1000 can be any of a variety of apparatuses including an actuator or more specifically a vertical comb actuator. The first structure 1020 and second structure 1040 can each be an electrode, which depending on the embodiment, may be either movable (as shown) or fixed in position. Movement of the structures can be obtained by generating a force between the structures. The direction of potential vertical movement of the structures is shown in FIG. 10 by the arrows X1 and X2. The fixing of position of either one of the structures can be achieved by mounted it to any of a variety of structures (not shown), including substrates, other structures, or the like.

Offset Actuator Fabrication Method Embodiments

A device (e.g. an actuator) which has structures positioned in offset layers generally can be fabricated by depositing a first set of layers having a first structural region and a first sacrificial region and then depositing a second set of layers having a second structural region, positioned over the first sacrificial region. The second set of layers may also include a second sacrificial region which is placed over the first structural region, which abuts the second structural region and that connects with the first sacrificial region. This defines a gap between the first and second structural regions, which can be sized less than the MFS.

The fabrication of the device 1000 can be achieved by a variety of methods including in at least one embodiment a method for fabricating a Three-dimensional structure having a minimum feature size 1100, which includes the processes of providing a deposition structure 1110, depositing a first set of at least one layer having a first structural region abutting a first sacrificial region 1120, depositing a second set of at least one layer having a second structural region positioned upon the first sacrificial region forming a layered structure, wherein the second structural region is spaced a distance less than the minimum feature size from the first structural region 1130, and releasing the layered structure 1140.

The processes of providing a deposition structure 1110 is similar to the deposition process 810 detailed above. That is, the deposition structure can be either a substrate, a separate structure, or a sacrificial element. Use of a sacrificial element provides the advantage of later removal during the releasing process, which can define a space for movement of structures of the device. The deposition structure can be formed to include a sufficiently smooth deposition surface for the deposition of the first set of layers. The deposition structure and surface can be formed by known methods, and be of know materials. To aid in the later electrodeposition over the deposition structure, the structure can be conductive or have a conductive seed layer placed on it.

The process of depositing a first set of at least one layer having a first structural region abutting a first sacrificial region 1120, can use steps similar to those set forth in the process of depositing a first layer 820 described herein. For example, the process can include repeated applications of the steps of selectively depositing a structural material on a deposition surface, depositing a sacrificial material to provide a continuous layer, and forming the layer to provide a deposition surface. As these steps are repeated, the set of layers with the first structural and sacrificial regions can be formed. One embodiment of a first structural region that can be obtained by operation of this process is the second structure 1040 (with the sacrificial region removed as shown after the release process 840).

The selective deposition of the structural material the be done by the described masks and masking techniques (e.g. INSTANT MASK™, MOA, AIM, ACC, methods detailed in the '630 patent and '637 patent disclosures), detailed above. Any of a variety of electrodeposition methods including the electrochemical fabrication methods can be employed to apply the structural material. An advantage of this method is that since both the resulting structures are not fabricated in any common layers, their separation (horizontal) is not limited by the MFS. As a result the gap between the structures can be having a width less than the MFS.

After the structural material is selectively deposited on a layer, the sacrificial material can be deposited to form a continuous layer. The sacrificial material can be deposited by any of a variety of methods including a blanket electrodeposition. The sacrificial material deposition facilitates the forming (shaping and sizing) of the layer by methods such as planarization to be employed. The forming of the layer can provide a deposition surface for the next layer.

Another process of the method 1100 is depositing a second set of at least one layer having a second structural region positioned upon the first sacrificial region forming a layered structure, wherein the second structural region is spaced a distance less than the minimum feature size from the first structural region 1130. This process can use steps similar to those described in both the process of depositing a first set of layers 1120 and the process of depositing a first layer 820 described herein. The deposition process 1130 can include repeated applications of the steps of selectively depositing a structural material on a deposition surface, depositing a sacrificial material to provide a continuous layer, and forming the layer to provide a deposition surface. Repeating the deposition of layers will build the second set of layers with structural and sacrificial regions. The second structural region is positioned over the sacrificial region of the first set of layers and the sacrificial region of the second set of layers is set over the first structural region. That is, the first sacrificial region and the second sacrificial region are positioned to overlap each other to define a gap between the structures. One embodiment of a second structural region that can be obtained by operation of this process is the first structure 1020 (with the sacrificial region removed as shown after the release process 840).

The selective deposition of the structural material the be done by the described masks and masking techniques (e.g. INSTANT MASK™, MOA, AIM, ACC, methods detailed in the '630 patent and '637 patent disclosures), detailed above. Any of a variety of electrodeposition methods including the electrochemical fabrication methods can be employed to apply the structural material. An advantage of this method is that since both the resulting structures are not fabricated in any common layers the gap between the structures is not limited by the MFS. Therefore, the structures can be separated by a distance less than the MFS.

After the structural material is selectively deposited on a layer, the sacrificial material can be deposited to form a continuous layer. The sacrificial material can be deposited by any of a variety of methods including a blanket electrodeposition. The sacrificial material deposition facilitates the forming (shaping and sizing) of the layer by methods such as planarization to be employed. The forming of the layer can provide a deposition surface for the next layer.

The process of releasing the layered structure 1140 is similar to the releasing process 840 as set forth above. During this process the sacrificial material is removed to release the structure constructed during the deposition. As described above, the sacrificial material can be removed by any of a variety of methods including applying a chemical etchant.

The exact number of layers that are deposited to form the device can vary depending on the needs of the specific requirements of the application of the device. Also, the order of the first and second structural regions can be reversed as required.

In an alternate embodiment, the method 1100 can further include a process of moving the first or the second structural region towards the other structural region, or moving the first and second structural regions towards each other to reduce or eliminate the offset between the structures.

Reduced Offset Actuator Embodiments

Figure 12:
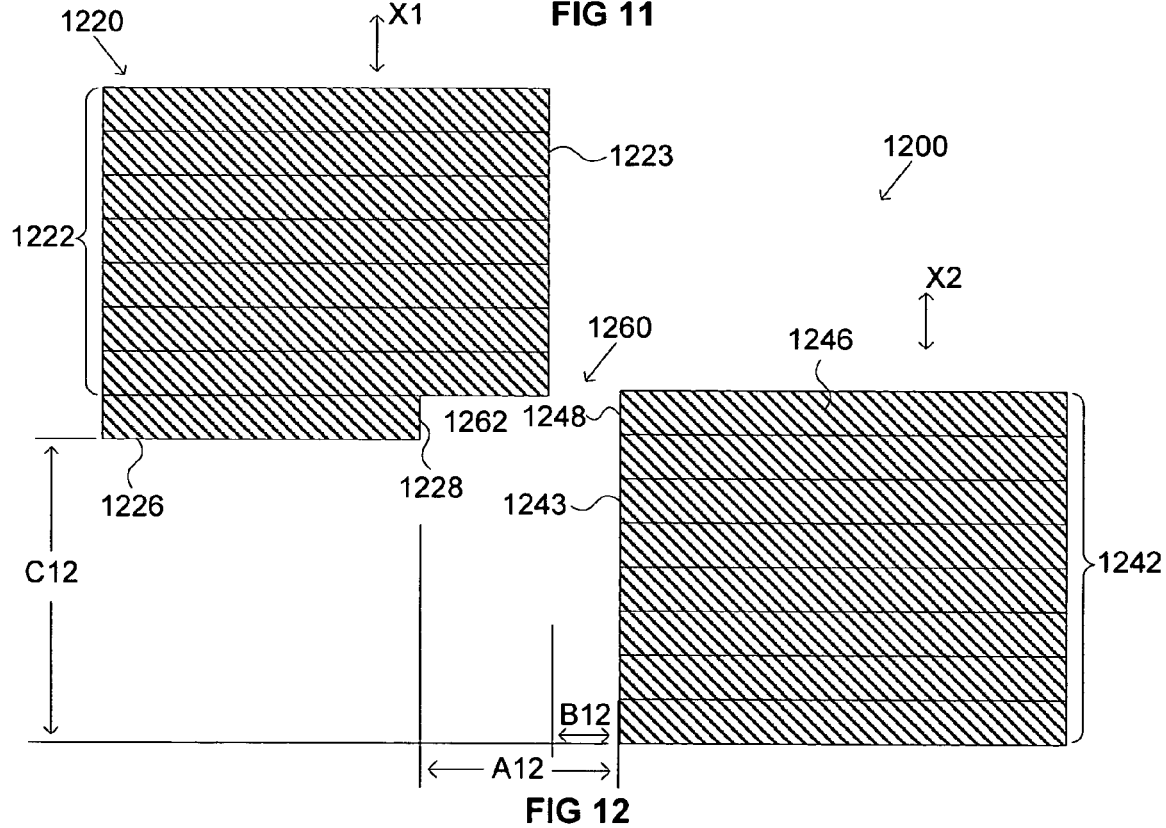
FIG. 12 schematically depicts a side view of a layered structure in accordance with at least one embodiment of the invention.

One way to achieve an increase in the performance of the apparatus of the invention is to reduce or minimize not only the gap separating the structures (e.g. horizontal offset), but also any vertical offset between the structures. Reducing the vertical offset can provide an improvement of the initial performance (movement from the initial position) of the device. An embodiment of the apparatus of the Applicants' invention that reduces the vertical offset relative to the actuator 1000 (as shown in FIG. 10), is a device 1200 as shown in FIG. 12. The device 1200 is similar to the device 1000, as it has two vertically shifted (offset) movable structures separated by a gap capable of being sized smaller than the MFS. However, unlike the device 1000, the device 1200 has at least one layer commonly aligned layer with layer portions separated by a gap at least as wide as the MFS.

As FIG. 12 shows, the device 1200 includes a first structure 1220 and a second structure 1240 separated by a gap 1260. The first structure 1220 and the second structure 1240 are offset vertically from each other in a manner where only one layer in each structure is horizontally aligned with a layer in the opposite structure. As detailed herein, this common layer allows for a reduced vertical offset between the first structure 1220 and the second structure 1240.

The device 1200 can be a variety of different apparatuses such an actuator, including a vertical comb actuator. With the device as an actuator, the first structure 1220 and second structure 1240 can be fixed and/or movable electrodes. By applying a voltage differential between the structures, a force can be generated there between, resulting in movement of one or both of the structures.

The direction in which the structures in the embodiment of FIG. 12 are capable of moving are shown by the arrows X1 and X2. In other embodiments one of the structures can be fixed in position. This can be achieved by mounting the structure to any of a variety of structures (not shown), including substrates, structural elements, or the like. The size of the gap 1260 will vary as the structure(s) move.

The first structure 1220 includes a series of layers 1222 with vertically aligned ends 1223. In addition to the layers 1222 is a recessed or base layer 1226, with an end 1228 set back from the ends 1223. The second structure 1240 includes a series of layers 1242 with vertically aligned ends 1243. The layers 1242 include an extended or cap layer 1246, with an end 1248 which is aligned with the ends 1243. The horizontal distance between the ends 1223 and the ends 1243 is a distance B12, and the distance of the end 1228 from the end 1248 is a distance A12. As further detailed herein, the distance A12 can be the MFS of the device 1200 and the distance B12 can be less than the MFS.

The device 1200 differs from the device 1000 (as shown in FIG. 10), as the first and second structures of the device 1200 are vertically shifted by one less layer, than the device 1000. As shown in FIG. 12, the device 1200 has one layer in each structure which are horizontally aligned (e.g. in a common layer). Specifically, the recess layer 1226 is aligned with the extended layer 1246. By aligning the recessed layer 1226 with the extended layer 1246, the amount of the vertical offset C12 between the structures is reduced compared with that of the device 1000.

In embodiments where the separation distance B12 is less than the MFS, then the layers of each structure which are horizontally aligned must be separated by a gap at least as wide as the MFS. As shown in FIG. 12, a sub-gap 1262 is positioned between the end 1228 and the end 1248. The width of the gap 1248 is the distance A12, which is at least the distance of the MFS, but in some embodiments is equal to the MFS.

Therefore, while having one layer of each structure aligned does reduced the overall vertical offset C12 between the structures, the horizontal sub-gap 1262 resulting from the effect of the MFS, increases the horizontal distance between the structures at the most adjacent layers, namely aligned layers 1226 and 1246. By reducing the vertical offset C12 between the first structure 1220 and the second structure 1240 (relative to C10 of device 1000), the actuator 1200 is capable of increased overall performance.

As the first structure 1220 and the second structure 1240 move such that they are positioned closer to one another (i.e. from positions shown in FIG. 12, first structure 1220 moving downward in the X1 direction and/or the second structure 1240 upward in the X2 direction), the size of the gap 1260 will reduce. The distance separating the first structure 1220 and the second structure 1240 will be the distance B12, which as noted, can be well less than the MFS. By having a gap less than the MFS, the performance of the device 1200 is increased by lowering the voltage required to achieve a desired force between the structures, and/or by generating a greater force for a specific voltage applied between the structures.

An alternative to the embodiment shown in FIG. 12 has the sub-gap 1262 positioned on the second structure 1240 and not the first structure 1220, as shown. In this embodiment the end 1228 is positioned such that it is aligned with the ends 1223, and the end 1248 is recessed back (e.g. to the right of) from the aligned ends 1243, such that the distance between the ends 1228 and 1248 is still at least the MFS. In another embodiment the 1262 has portions positioned over both the first structure 1220 and the second structure 1240, such that both the ends 1228 and 1248 are recessed back from the ends 1223 and 1243, respectfully.

It should be clear to one skilled in the art that the device 1200 and its alternate embodiments can be formed by embodiments of the fabrication methods set forth herein.

Figure 13:
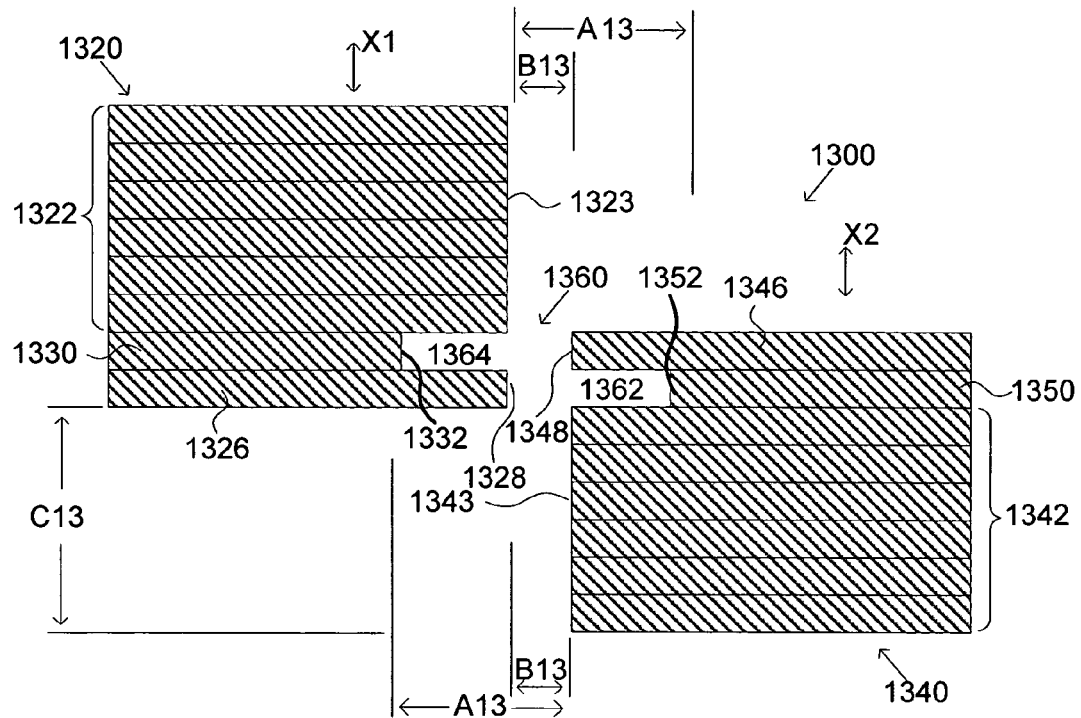
FIG. 13 schematically depicts a side view of a layered structure in accordance with at least one embodiment of the invention.

As shown in FIG. 13, the vertical offset can be further reduced by utilizing additional commonly aligned layers between the structures. In the embodiment shown in FIG. 13 a device 1300 has a first structure 1320 and a second structure 1340, which are separated by a gap 1360. As can be seen, the vertical offset between the first structure 1320 and the second structure 1340 has been further reduced (compared to that of the embodiments of FIGS. 10 and 12) as two layers of the structures are commonly horizontally aligned. The minimum separation between the extended portions the two structures remains at a distance which is capable of being significantly less than the MFS.

The device 1300 can be an actuator, such as a vertical comb actuator. Also, the first structure 1320 and second structure 1340 can be fixed and/or movable electrodes (as shown). By applying a voltage differential between the structures, a force can be generated between them, resulting in movement of one or both of the structures.

The direction in which the structures in the embodiment of FIG. 13 are capable of moving are shown by the arrows X1 and X2. In other embodiments, one of the structures can be fixed in position. This can be achieved by mounting the structure to any of a variety of structures (not shown), including substrates, structural elements, or the like. The size and shape of the gap 1360 will vary as the structure(s) move.

The first structure 1320 includes a series of layers 1322 with vertically aligned ends 1323. The structure 1320 also includes a extended or base layer 1326 and a recessed layer 1330. The extended layer 1326 has an end 1328 aligned with the ends 1323 and the recessed layer includes an end 1332 set back from the ends 1323.

The second electrode 1340 includes a series of layers 1342 with vertically aligned ends 1343. A extended or cap layer 1348 and a recessed layer 1350 are positioned over the series 1342. The extended layer 1346 has an end 1348, which is aligned with the ends 1343. The recessed layer 1350 has an end 1352 positioned back from the ends 1343.

The horizontal distance between the ends 1323 and 1328 of the first structure 1320, and the ends 1343 and 1348 of the second electrode 1340 is a distance B13. The distance between the ends 1328 and 1352 as well as between the ends 1332 and 1348, of the two commonly aligned layers, is the distance A13. As further detailed herein the minimum of the distance A13 is the MFS of the device 1300.

The device 1300 differs from the device 1200 (as shown in FIG. 12), as the first and second structures of the device 1300 are vertically shifted by another layer less, than that of the device 1200. As shown in FIG. 13, the device 1300 has two layers in each structure which are horizontally aligned (e.g. fabricated in a common layer). Specifically, the extended layer 1326 is aligned with the recessed layer 1350 and the recessed layer 1330 is aligned with the extended layer 1346.

By aligning two layers in each structure in the device 1300, the amount of the vertical offset C13 between the structures is reduced compared with that of the actuator 1200. In embodiments of the invention where the separation distance B13 is less than the MFS, then the layers of each structure which are horizontally aligned, must be separated by a gap at least as wide as the MFS. This gap can be positioned at or in between the first structure 1320 and/or the second structure 1340.

In the position of the device 1300 as shown, the gap 1360 includes a first sub-gap 1362 and a second sub-gap 1634. The first sub-gap 1362 is positioned between the ends 1328 and 1352, while the second sub-gap 1364 is set between the ends 1332 and 1348. The widths of the sub-gaps 1362 and 1364 are the distances A13, which is at least the MFS, and in some embodiments is equal to the MFS.

By further reducing the vertical offset between the first and second structures, in this embodiment the initial performance of the device 1300 can be increased as compared to the embodiments of FIGS. 10 and 12. As the first structure 1320 and the second structure 1340 move such that they are positioned closer to one another (i.e. first structure 1320 downward and/or the second structure 1340 upward), the overall size of the gap 1360 will reduce.

By reducing the vertical offset C13 and by having the gap 1360 with dimensions less than the MFS, the performance of the actuator 1300 is increased by lowering the voltage required to achieve a desired force between the structures, and/or by generating a greater force for a specific voltage applied between the structures.

An alternate to the embodiment shown in FIG. 13 has the sub-gaps 1362 and 1364 positioned over the opposite structures from their positions as shown. In another embodiment, the gaps 1362 and 1364 have portions positioned over both the first structure 1320 and the second structure 1340, such that the ends 1328 and 1332 are positioned back from the aligned ends 1323, and the ends 1348 and 1352 are positioned back from the aligned ends 1343.

It should be clear to one skilled in the art that the device 1300 and its alternate embodiments can be formed by embodiments of the fabrication methods set forth herein.

Figure 14:
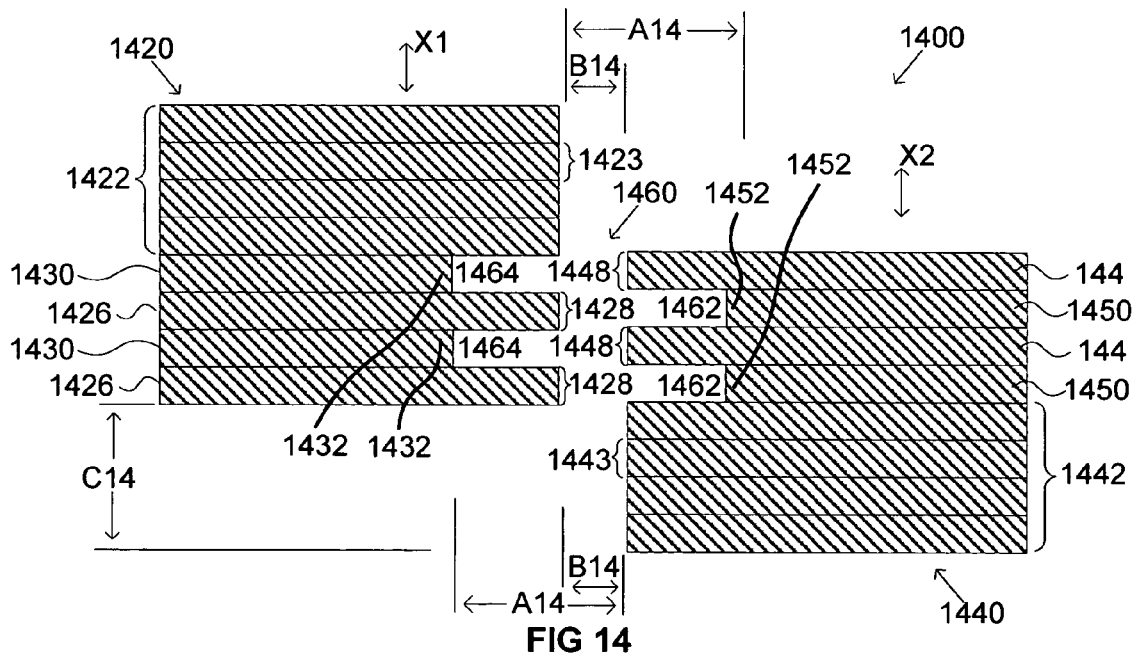
FIG. 14 schematically depicts a side view of a layered structure in accordance with at least one embodiment of the invention.

Another embodiment of the Applicant's invention has additional horizontally aligned layers to further reduce the vertical offset between the structures of the device. As shown in FIG. 14, the device 1400 includes a first structure 1420 and a second structure 1440. The structures have four layers commonly aligned layers so that the vertical offset is reduced. Separating the structures is a gap 1460, which at has minimum separation between the structures being a distance capable of being significantly less than the MFS.

The device 1400 can be employed in a variety of applications, in at least one embodiment, the device is an actuator, or more specifically a vertical comb actuator. The first structure 1420 and the second structure 1440 can be fixed and/or movable electrodes. As shown, the first structure 1420 can move in the X1 direction and/or the second structure 1440 can move in the X2 direction. In other embodiments one of the structures can be fixed in position by mounting the structure to any of a variety of structures (not shown). Movement of either or both structures can be achieved by applying a voltage differential between the electrodes.

The first structure 1420 includes a series of aligned layers 1422, extended layers 1426, and recessed layers 1430. Each layer of the series of aligned layers 1422 include an end 1423, which are aligned with one another. The extended layers 1426 have ends 1428 which are aligned with the ends 1423. The recessed layers 1430 have ends 1432, which are recessed back from the ends 1423 and 1428. Likewise, the second structure 1440 includes a series of aligned layers 1442, extended layers 1446, and recessed layers 1450. Each layer of the series of aligned layers 1442 include an end 1443, which are aligned with one another. The extended layers 1446 have ends 1448 which are aligned with the ends 1443. The recessed layers 1450 have ends 1452, which are recessed back from the ends 1443 and 1448.

In the position of the device 1400 as shown, the gap 1460 includes first sub-gaps 1462 and second sub-gaps 1464. The first sub-gaps 1462 are positioned between the ends 1428 and 1452 and the second sub-gaps 1464 between the ends 1432 and 1448. The widths of the sub-gaps 1462 and 1464 are a distance A14, which is at least the MFS and in some embodiments is equal to the MFS.

In alternate embodiments to that shown in FIG. 14, the specific horizontal positioning of the sub-gaps can vary along each aligned layer (e.g. positioned in part on either of the two structures). In other alternates, the positions of the ends of each layer in the device 1400 can vary and are not necessarily aligned as shown.

Clearly as the positions of the first structure 1420 and the second structure 1440 move relative to one another, the size and shape of the gap 1460 will change, and the sub-gaps 1462 and 1464 will no longer be defined in the gap 1460 as shown in FIG. 14. The gap 1460 provides a minimum separation between the first and second structures of the distance B14. The distance B14 can be less than the MFS of the device 1400. While the in other embodiments the ends of the layers of the device 1400 can vary in position such that they are not aligned, as shown, aligning the ends 1432 and 1428 and the ends 1443 and 1448, provides certain benefits. One such benefit is that the distance B14 can be minimized as the common vertical alignment will avoid needing to set a certain separation just to allow clearance of the ends extending the farthest out towards the opposite structure. Another benefit is that the maximum amount of structure can be place at the minimum distance of separation without contact between the structures, to get the greatest amount of performance of the device 1400.

The first structure 1420 and the second structure 1440 are vertically offset from each other by a distance C14. As noted, this offset positions the structures such that four layers of one structure are horizontally aligned with the four layers of the other electrode. The embodiment of the invention shown in FIG. 14 has a reduced vertical offset compared to that of other embodiments of the invention (as shown in FIGS. 10, 12 and 13). With the vertical offset further reduced, the initial performance of the device 1400 can be greater relative to these other embodiments.

It should be clear to one skilled in the art that the device 1400 and its alternate embodiments can be formed by embodiments of the fabrication methods set forth herein.

Figure 15:
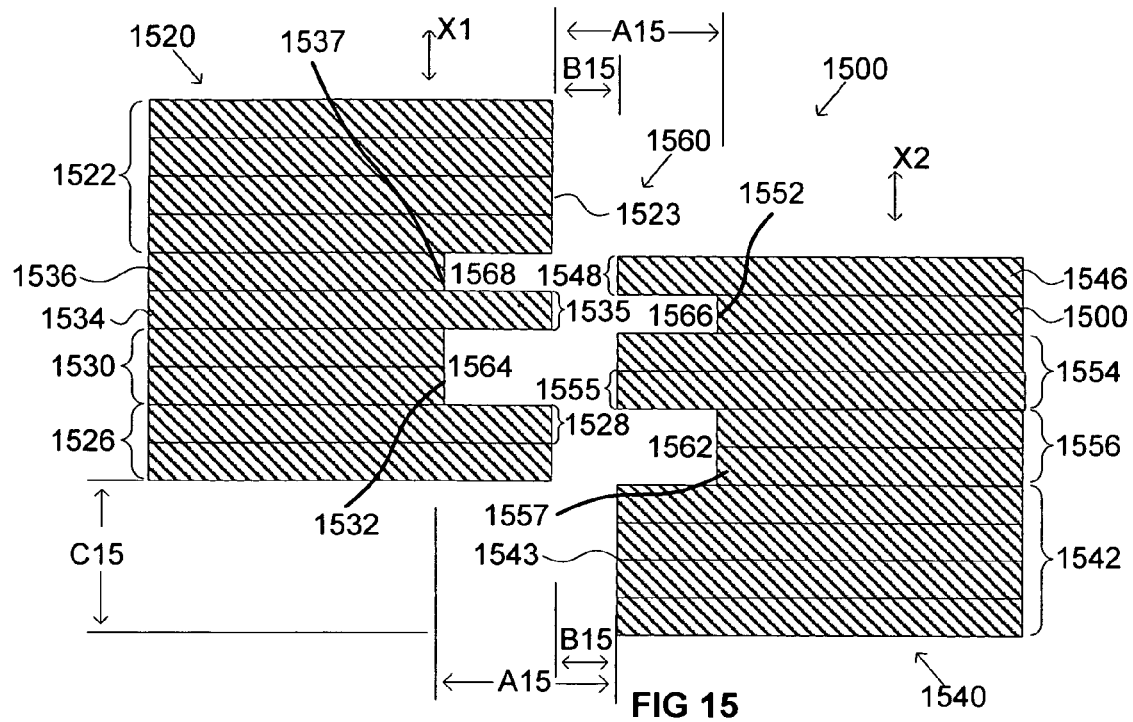
FIG. 15 schematically depicts a side view of a layered structure in accordance with at least one embodiment of the invention.

Some embodiments of the invention also include the embodiment shown in FIG. 15. While this embodiment has a reduced vertical offset achieved by having a greater number of layers that are horizontally aligned, as detailed herein, it is also capable of improved operational performance from the particular arrangement of its layers. The structures have six layers commonly aligned layers so to reduce the vertical offset. The device 1500 includes a first structure 1520 and a second structure 1540, separated by a gap 1560. The gap 1560 has a minimum separation between the structures of a distance which is capable of being significantly less than the MFS.

In at least one embodiment, the device 1500 is an actuator, and in other is a vertical comb actuator. The first structure 1520 and second structure 1540 can be fixed and/or movable electrodes. As shown, the first structure 1520 can move vertically in the X1 direction and/or the second structure 1540 can move vertically in the X2 direction. In other embodiments, one of the structures can be fixed in position by mounting the structure to any of a variety of structures (not shown). With one or both movable electrodes, movement can be achieved by applying a force through a voltage differential between the electrodes.

As shown in FIG. 15, the first structure 1520 includes a series of layers 1522, a pair of extended layers 1526, a pair of recessed layers 1530, a extended layer 1534 and a recessed layer 1536. Each layer of the series of aligned layers 1522 include an end 1523. The ends 1523 are vertical aligned with one another. The pair of extended layers 1526 have ends 1528, which are aligned with each other and with the ends 1523. The pair of recessed layers 1530 have ends 1532 which are positioned back from the ends 1523 and 1528. The extended layer 1534 has an end 1535 that is also aligned with the ends 1523 and 1528 and an end 1537 of the recessed layer 1536 is aligned with the ends 1532.

The second structure 1540 includes a series of layers 1542, a extended layer 1546, a recessed layer 1550, a pair of extended layers 1554, and a pair of recessed layers 1556. Each layer of the series of aligned layers 1542 includes an end 1543. The ends 1543 are vertical aligned with one another. The extended layer 1546 has an end 1548 that is also aligned with the ends 1543 and the recessed layer 1550 has an end 1552. The pair of extended layers 1554 have ends 1555, which are aligned with each other and with the ends 1543 and 1548. The pair of recessed layers 1556 have aligned ends 1557 which are positioned back from the ends 1543, 1555 and 1548, and aligned with end 1552.

In the position of the device 1500 as shown in FIG. 15, the gap 1560 includes a first sub-gap 1562, a second sub-gap 1564, a third sub-gap 1566 and a fourth sub-gap 1568. The first sub-gap 1562 is positioned between the ends 1528 and the ends 1557, the second sub-gap 1564 between the ends 1532 and 1555, the third sub-gap 1566 between the ends 1535 and 1552, and the fourth sub-gap 1568 between the ends 1537 and 1548. The first sub-gap 1562 and second sub-gap 1564 both have a thickness (vertical height) of two material layers, while the third sub-gap 1566 and the fourth sub-gap 1568 are only one layer thick. The lengths (horizontal width) of the sub-gaps 1562, 1564, 1566 and 1568 are the distance A15, which is at least the MFS and in some embodiments is equal to the MFS.

In alternate embodiments to that shown in FIG. 15, the specific horizontal positioning of the sub-gaps can vary along each aligned layer or layers (e.g. positioned in part on either of the two structures). However, due to construction limitations, the minimum width of the sub-gaps, regardless of their specific positioning is the MFS. While the in other embodiments the ends of the layers of the device 1500 can vary in position such that they are not aligned, as shown, aligning the ends of the extended layers allows the distance B15 to be minimized as the common vertical alignment will avoid needing to set a certain separation to allow physical clearance of the structures. Also, the maximum amount of structure can be place at the minimum distance of separation.

As the positions of the first structure 1520 and the second structure 1540 move relative to one another, the size and shape of the gap 1560 will change, and the sub-gaps will no longer be defined as shown.

In its initial position, as shown in FIG. 15, the device 1500 has the first structure 1520 and the second structure 1540 with a vertical offset of the distance C15. In this offset position the electrodes have six material layers on each electrode that are horizontally aligned with six material layers on the other electrode. The embodiment of the invention shown in FIG. 15 has a reduced vertical offset compared to that of other embodiments of the invention (as described herein). With the vertical offset further reduced, the initial performance of the device 1500 can be increased as compared to the other embodiments.

This embodiment of the invention is also capable of providing improved performance as a result of the specific arrangement of the layers and the sub-gaps separating them. This is due to the fact that as the first structure 1520 and the second structure 1540 move towards each other, fewer of the recessed layers (e.g. layers 1530, 1536, 1550 and 1556) tend to align with each other to create extended sub-gaps. Extended sub-gaps reduce performance (e.g. less force produced for a given voltage applied) by significantly increasing the distance between the ends of the recessed layers.

For example, as the first structure 1520 and the second structure 1540 are moved a distance one layer closer to each other from the initial position shown in FIG. 15, only two extended sub-gaps are formed. In this position, of the ten layers of each structure 1520 and 1540, only two of the recessed layers 1536 with 1550 and lower 1530 with upper 1556, align to form extended sub-gaps. However, three of these layers of each structure, lower layer 1526 with upper layer 1542, 1534 with upper 1554, and 1546 with lower 1522, are positioned the minimum distance B15 apart from other layers. As the structures continue to move towards each other, the number of extended sub-gaps generated will be one or two at the most.

The device 1500 and its alternate embodiments can be formed by embodiments of the fabrication methods set forth herein.

Figure 16:
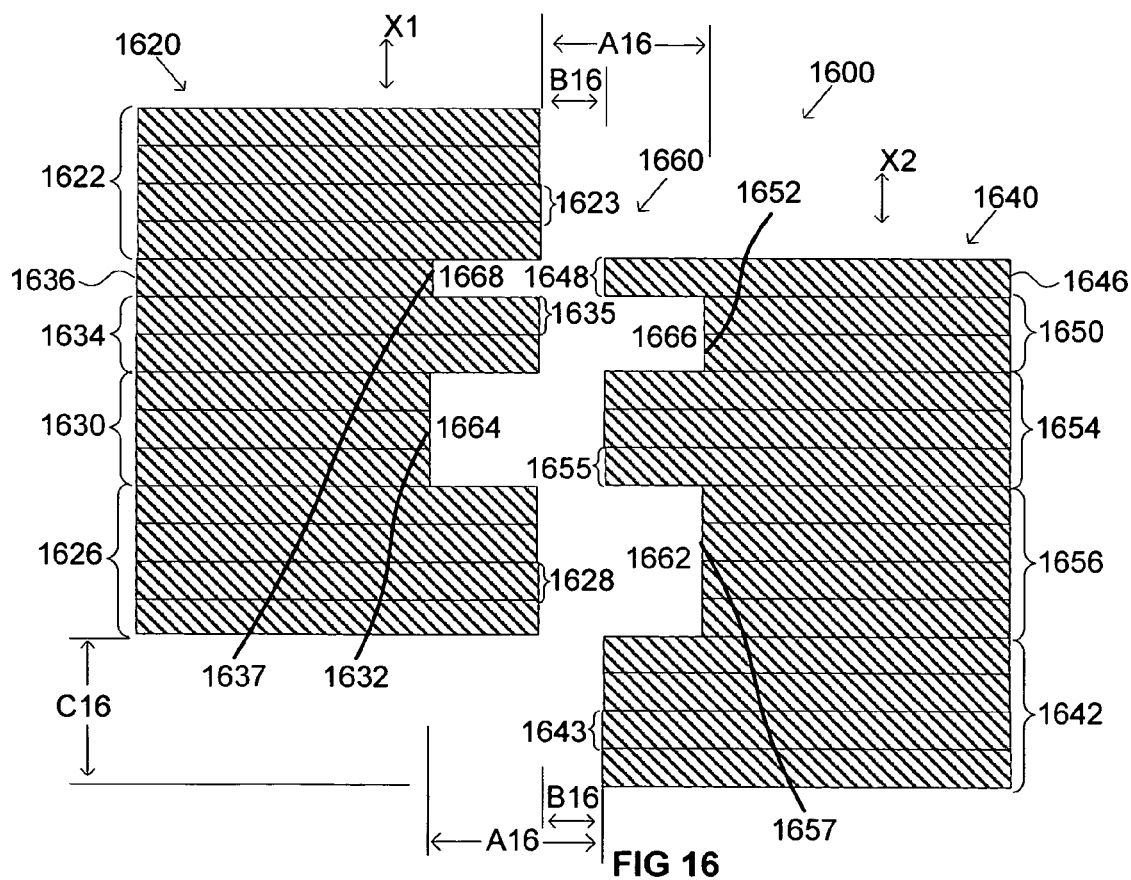
FIG. 16 schematically depicts a side view of a layered structure in accordance with at least one embodiment of the invention.

The next embodiment of the invention is shown in FIG. 16, wherein the device 1600 includes a first structure 1620 and a second structure 1640, separated by a gap 1660. The gap 1660 provides a minimum separation between the structures of a distance which is capable of being significantly less than the MFS.

This embodiment is able to provide improved operational performance by reducing the vertical offset between the structures and by the arrangement of the aligned layers. A reduced vertical offset of the structures is achieved by having a greater number of layers that are aligned horizontally. That is, by constructing with a greater portion of the structures in common aligned layers, the vertical offset of this embodiment can be reduced. Of course, using common layers tends to increase the horizontal offset because of the minimum spacing required by the MFS. The effect of the MFS spacing can be reduced by the arrangement of the layers in the structure. Specifically, with the movement of the structures 1620 and 1640 towards one another, the arrangement of the layers can reduce the effect of the MFS and increase the performance of the device 1600.

In at least one embodiment, the device 1600 is an actuator or a vertical comb actuator. The first structure 1620 and second structure 1640 can be fixed and/or movable electrodes. As shown, the first structure 1620 can move vertically in the X1 direction and/or the second structure 1640 can move vertically in the X2 direction. In other embodiments, one of the structures can be fixed in position by mounting the structure to any of a variety of structures (not shown). With one or both movable electrodes, movement can be achieved by applying a force through a voltage differential between the electrodes.

As shown in FIG. 16, the first structure 1620 includes a series of layers 1622, a set of four of extended layers 1626, a set of three recessed layers 1630, a pair of extended layers 1634 and a recessed layer 1636. Each layer of the series of aligned layers 1622 includes an end 1623. The ends 1623 are vertical aligned with one another. The set of extended layers 1626 have ends 1628, which are aligned with each other and with the ends 1623. The set of recessed layers 1630 have ends 1632 which are positioned back from the ends 1623 and 1628. The pair of extended layers 1634 have ends 1635 that are also aligned with the ends 1623 and 1628. The recessed layer 1636 is aligned with the ends 1632.

Similarly, the second structure 1640 includes a series of layers 1642, a extended layer 1646, a pair of recessed layers 1650, a set of three extended layers 1654, and a set of four recessed layers 1656. Each layer of the series of aligned layers 1642 includes an end 1643. The ends 1643 are vertical aligned with one another. The extended layer 1646 has an end 1648 that is also aligned with the ends 1643 and the recessed layers 1650 have ends 1652. The set of extended layers 1654 have ends 1655, which are aligned with each other and with the ends 1643 and 1648. The set of recessed layers 1656 have aligned ends 1657 which are positioned back from the ends 1643, 1655 and 1648, and are aligned with ends 1652.

In the position of the device 1600 as shown in FIG. 16, the gap 1660 includes a first sub-gap 1662, a second sub-gap 1664, a third sub-gap 1666 and a fourth sub-gap 1668. The first sub-gap 1662 is positioned between the ends 1628 and the ends 1657, the second sub-gap 1664 between the ends 1632 and 1655, the third sub-gap 1666 between the ends 1635 and 1652, and the fourth sub-gap 1668 between the ends 1637 and 1648. The first sub-gap 1662 has a thickness of four layers, the second sub-gap 1664 of three layers, the third sub-gap 1666 of two layers and the fourth sub-gap 1668 is only one layer thick. The lengths (horizontal width) of the sub-gaps 1662, 1664.1666 and 1668, are the distance A16, which is at least the MFS, and in some embodiments is equal to the MFS.

In alternate embodiments to that shown in FIG. 16, the specific horizontal positioning of the sub-gaps can vary along each aligned layer or layers (e.g. positioned in part on either of the two structures). However, due to construction limitations, the minimum width of the sub-gaps, regardless of their specific positioning is the MFS.

As the positions of the first structure 1620 and the second structure 1640 move relative to one another, the size and shape of the gap 1660 will change, and the sub-gaps will no longer be defined as shown.

In its initial position, as shown in FIG. 16, the device 1600 has the first structure 1620 and the second structure 1640 with a vertical offset of the distance C16. In this offset position the electrodes have ten material layers on each electrode that are horizontally aligned with ten material layers on the other electrode. The embodiment of the invention shown in FIG. 16 has a reduced vertical offset compared to that of other embodiments of the invention (as described herein). With the vertical offset further reduced, the initial performance of the device 1600 can be increased as compared to the other embodiments.

This embodiment of the invention is also capable of providing improved performance as a result of the specific arrangement of the layers and the sub-gaps separating them.

This is due to the fact that as the first structure 1620 and the second structure 1640 move towards each other, only a limited number of the recessed layers (e.g. layers 1630, 1636, 1650 and 1656) tend to align with each other to create extended sub-gaps. Extended sub-gaps reduce performance (e.g. less force produced for a given voltage applied) by significantly increasing the distance between the ends of the recessed layers.

As the first structure 1620 and the second structure 1640 move towards each other from their initial positions shown in FIG. 16, a maximum of three extended gaps are formed. However, up to eleven layers are positioned at or less than the MFS apart, with some a distance A16 apart and some a closer distance B16 apart.

Alternate embodiments to those set forth herein include varying the configuration of the layering of the device. Namely, the number of horizontally aligned layers between the two structures can vary such that there are more or less layers than detailed herein. Also, the particular arrangement of the layers (flush and/or recessed) and the positioning of the sub-gaps (over one or both of the structures), can be any of a wide variety. As noted herein, while some embodiments do not align the layers, or otherwise position the layers as shown, aligning the layers allows increased performance by positioning more of the structures closer together.

The device 1600 and its alternate embodiments can be formed by embodiments of the fabrication methods set forth herein.

Figure 17:
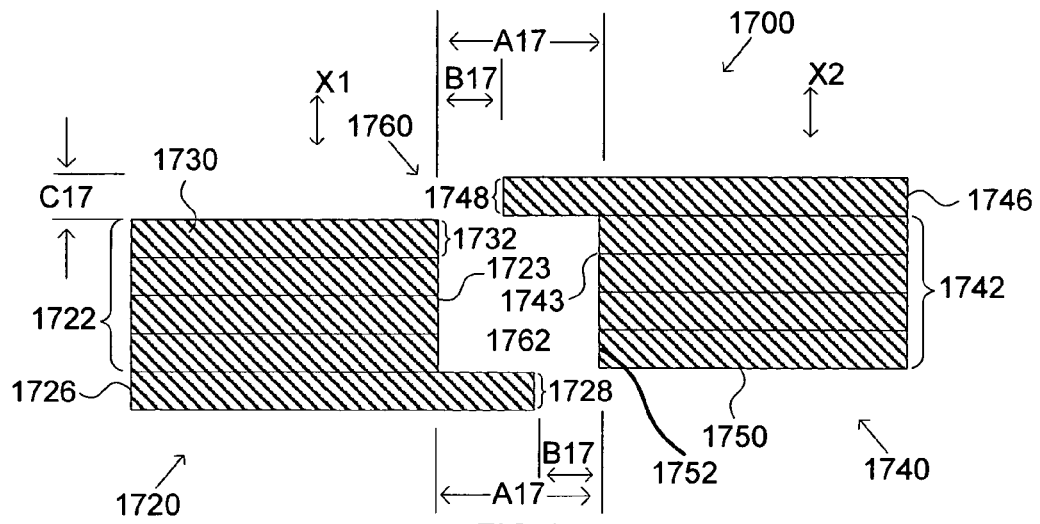
FIG. 17 schematically depicts a side view of a layered structure in accordance with at least one embodiment of the invention.

To further reduce the vertical offset, the structures can be arranged to have an even greater amount of the layers commonly aligned. An embodiment of a device that has a minimum offset or layer shift (e.g. a single layer) is shown in FIG. 17. A device 1700 includes a first structure 1720, a second structure 1740 and a gap 1760 separating the two.

As can be seen, in this embodiment the layering of the two structures is not completely aligned. The layering has been shifted or displaced by a layer in each structure, so that the top layer of one structure and the bottom of the other structure do not have a corresponding layer in the other structure. As detailed herein, this arrangement of layers allows the positioning of the structures at distances less than the minimum feature size (MFS), providing increasing performance of the device.

While the device 1700 can be any of a variety of apparatuses and the structures 1720 and 1740 can be a number of different components of those apparatuses. In certain embodiments of the Applicants' invention the device 1700 is an actuator and the structures 1720 and 1740 are movable first and second electrodes, respectfully. In specific embodiments, the device 1700 is a vertical comb actuator (VCA), the first structure 1720 is a fixed electrode and the second structure 1740 is a movable electrode.

Depending on the embodiment, the second structure 1740 can be capable of moving in the direction X2 (e.g. vertically relative to the planar structure of the device 1700), as a force is applied between the structures 1720 and 1740. One method of creating such a force can be by applying an electrical differential between the structures 1720 and 1740, which in such cases are at least partially electrically conductive. The gap 1760 separating the structures will vary in size as the second structure 1740 moves relative to the first. With the structures positioned as shown in FIG. 17, the gap 1760 includes sub-gaps 1762 which are positioned between ends of the commonly aligned layers of the structures.

The distance between the ends of the aligned layers, or the width of the sub-gaps 1762, is a distance A17. While length of the distance A17 can vary depending on the embodiment, the minimum length is the MFS of the fabrication process used. The second structure 1740 is constructed so that its layers are shifted or displaced upward by one layer compared to the layering of the first structure 1720. This allows certain layers of the first structure 1720 and the second structure 1740 to be positioned only a distance B17 from the opposing structure. As can be seen, the distance B17 is sufficiently less than the distance A17, and as such can be well less than the MFS. With the structures 1720 and 1740 capable of being positioned closer to one another than the MFS, the overall performance of the device 1700 can be increased as compared to the operation of prior devices.

Depending on the embodiment, the first structure 1720 can be configured to remain stationary and can be attached to any of a variety of structures (not shown), including a substrate or another structural element. The first structure 1720 includes a series of recessed layers 1722 and an extended or base layer 1726. The layers 1722 are positioned upon the extended layer 1726 and each layer includes an end 1723. In this embodiment, the ends 1723 are substantially aligned with each other, although as described herein, other alignments are possible. The layers 1722 include a cap layer 1730 with an end 1732.

The extended layer 1726 extends outward from the rest of the first structure 1720 and terminates in an end 1728. The extension of the base layer 1726 allows the positioning of the end 1728 the distance B17 to the second structure 1740. Likewise, the end 1732 of the cap layer 1730 is also positioned a distance B17 from the second structure 1740.

In the embodiment shown in FIG. 17, the second structure 1740 is configured to move relative to the first (fixed) structure 1720. The second structure 1740 includes a series of recessed layers 1742 and an extended or cap layer 1746. The layers 1742 are positioned upon each other and under the extended layer 1746. Each layer of the series 1742 includes an end 1743, which is positioned opposite to the ends 1723 and separated there between with the sub-gaps 1762.

As noted, the size of the space 1762 is limited by the constraints, namely by the MFS, of the particular method of fabrication. During the fabrication of the layers 1722 and 1742, as each layer of material is deposited, a sub-gap 1762 is constructed along the layer in order to separate and define the structures 1720 and 1740. While the positioning of the sub-gaps 1762 can vary in each layer (e.g. a stepped arrangement), the width of the sub-gaps 1762 can be no less than the MFS.

In FIG. 17 it can be seen that at some points, the distance between the first structure 1720 and the second structure 1740, can be less than the MFS. This is achieved by configuring the device 1700 so that certain layers do not have a corresponding layer positioned across from them on the opposite structure. That is, so that some layers are aligned opposite to a blank layer or region on the other structure. In this manner without opposing structure to define a MFS limited space between the two structures, the particular layer can be extended so that it is positioned within the MFS to the next adjacent layer in the opposite structure. This results in the layering of the two structures being offset or shifted by a distance C17, which in the embodiment shown, is one layer thick.

In the device 1700, the extended layer 1726 and the extended layer 1746 lack a corresponding layer on the opposite structure, and they each extend towards the opposite structure to a distance B17. That is, the extended layer 1726 extends out from the first structure 1720 to a distance B17 from the end 1752 of the layer 1750. Likewise, the extended layer 1746 extends outward from the second structure 1740 until it is within the distance B17 of the end 1732 of the layer 1730. It should be noted, that while in the embodiment shown, the extended layer 1726 and the extended layer 1746 each extend to the same distance B17 from the opposite structure, that the structures can be fabricated such that the two separation distances are not the same.

The device 1700 and its alternate embodiments can be formed by embodiments of the fabrication methods set forth herein.

Staggered Structure Actuator Embodiments

Figure 18:
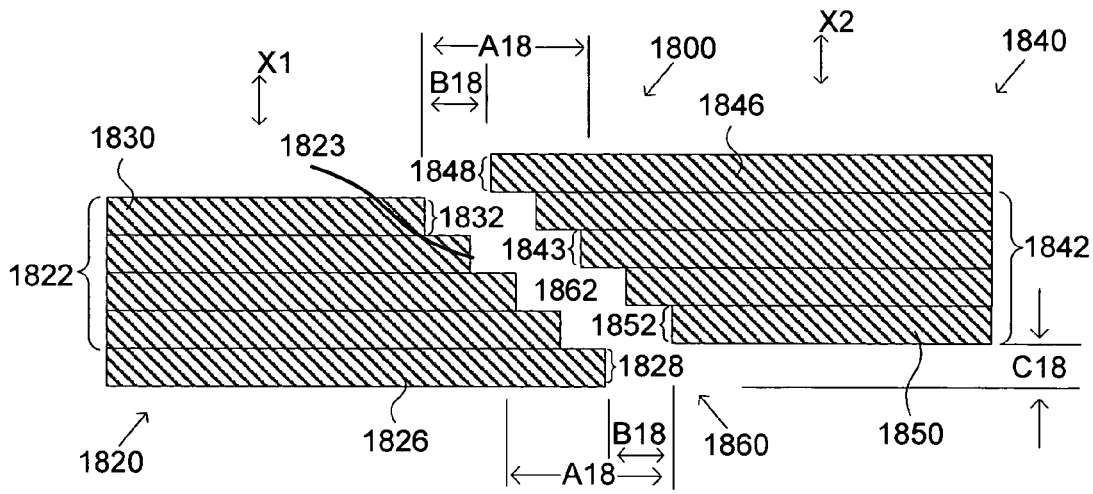
FIG. 18 schematically depicts a side view of a layered structure in accordance with at least one embodiment of the invention.

While the embodiment of the device 1700 does reduce the vertical offset, due to the number of commonly aligned layers a significant horizontal offset is formed by the sub-gaps being limited to a minimum width of the MFS. To further reduce the overall offset between the structures, another embodiment of the invention staggers the positioning of the layers (and the sub-gaps). As shown in FIG. 18, in this embodiment the layers of each structure have been positioned to form a stepped arrangement. As with the previous embodiment, the spacing between aligned layers continues to be restricted by the MFS; however the base and cap layers can be positioned within the MFS. In this embodiment, the layers of each electrode have been positioned to end in a coordinated stepped arrangement, allowing the mean distance between the two electrodes to be further reduced.

A device 1800 includes a first structure 1820 separated by a gap 1860 from a second structure 1840. The device 1800 can be any of a variety of apparatuses including an actuator or more specifically a vertical comb actuator. The first structure 1820 can be an electrode which in some embodiments is fixed in position. Likewise, the second structure 1840 can be an electrode which in certain arrangements is movable. The movement of the second structure 1840 in the embodiment shown is capable of moving in direction X2 upon application of a force between the structures. In embodiments with the first structure being movable, the structure can move in a direction X1, as shown. As the second structure 1840 moves, the size and shape of the gap 1860 will vary. As shown, the gap 1860 includes sub-gaps 1862, set between the ends of the commonly aligned layers of the structures.

The first structure 1820 can be configured to remain stationary by being mounted to (i.e. built upon) any of a variety of structures (not shown), including substrates, other layered structures, etc. The first structure 1820 includes a series of layers 1822, an extended or base layer 1826, and a recessed or cap layer 1830. The series of layers 1822 are positioned upon the base layer 1826 and then progressively on each other in a stepped configuration. The layers 1822 include ends 1823, which also stepped.

The second structure 1840 includes a series of layers 1842, an extended or cap layer 1846, and a recessed or base layer 1850. The layers 1842 are positioned upon each other in a stepped overhanging configuration depending from the extended layer 1846. Each layer of the layers 1842 includes an end 1843, which is positioned opposing one of the ends 1823. The ends 1823 and 1843 are separated by a sub-gap 1862 having a length A18. Because each sub-gap 1862 is set between portions of aligned (i.e. commonly constructed) layers, the minimum length of the sub-gaps 1862 is the MFS of the device 1800.

Like with the device 1700 (as shown in FIG. 17), the extended layers 1826 and 1846 each extend to a distance that is less than the MFS from the opposite structure. Specifically, the extended layer 1826 extends outward from the rest of the first structure 1820 towards the second structure 1840. This results in an end 1828 of the base layer 1826 being a distance B18 from the second structure 1840. Likewise, the extended layer 1846 extends outward from the remaining portion of the second structure 1840 until it is within a distance B18 of an end 1832 of the recessed layer 1830 of the first structure 1820. This is possible as the extended layers 1826 and 1846 each lack a corresponding layer positioned across from them on the opposite electrode (which is shifted by one layer). In this manner without a layer positioned on the opposing electrode to define a MFS limited space there between, the particular layer can be extended so that it is positioned a distance within the MFS to other layers of the opposing structure. This results in the layering of the two structures being offset or shifted by a distance C18, which in the embodiment shown, is one layer thick.

However, a distinct difference between the embodiments of the device 1700 and the device 1800 is that with the device 1800, the layers of the structures 1820 and 1840 are positioned in a generally staggered arrangement, as shown in FIG. 18. By staggering the layers in a stepped manner, the overall or mean distance between the structures can be further reduced. This distance reduction allows an additional increase in the performance of the device 1800.

The device 1800 and its alternate embodiments can be formed by embodiments of the fabrication methods set forth herein.

Figure 19:
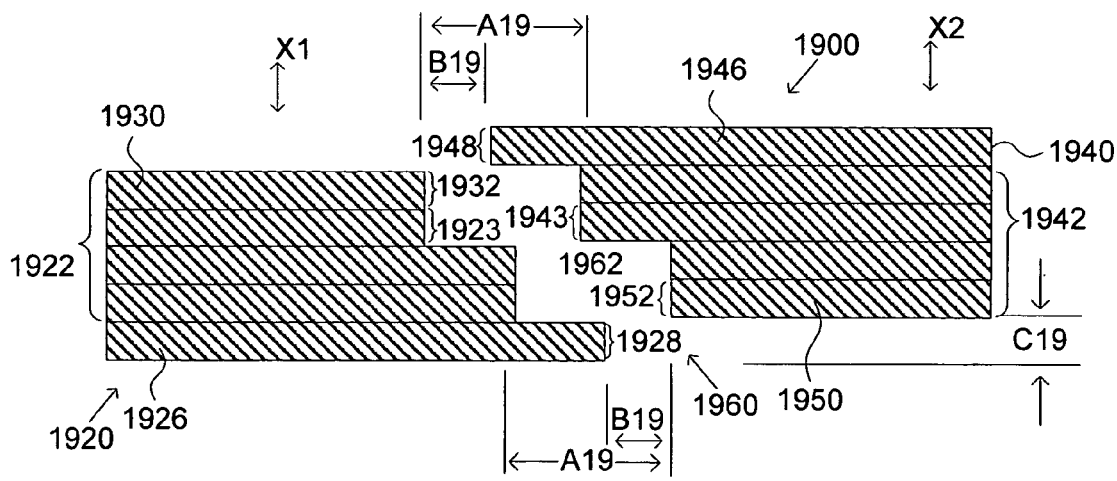
FIG. 19 schematically depicts a side view of a layered structure in accordance with at least one embodiment of the invention.

FIG. 19 sets forth an additional embodiment, which, like the embodiment of FIG. 18, the layers of structures have been set in a stepped arrangement. By utilizing a stepped configuration, the overall separation of the structures can be reduced to increase performance of the device. Similar to other embodiments, the spacing between the aligned layers continues to be restricted by the MFS, but by offsetting the layering, the extended layers of the first and second structures are capable of being positioned within the MFS of the opposite structure.

A device 1900 includes a first structure 1920, a second structure 1940 and a gap 1960 separating them. The device 1900 can be any of a variety of apparatuses including an actuator or a vertical comb actuator. The first structure 1920 can be an electrode which may be fixed in position by being mounted to any of a variety of structures (not shown), including substrates, other structures, etc, or movable. With the first structure being movable, it can move in a direction X1. The second structure 1940 can be an electrode which may be movable in the X2 direction or can be fixed with the first structure 1920 being movable. Movement of the structures varies the overall size of the gap 1960. The gap 1960 includes sub-gaps 1962, positioned between the ends of the commonly aligned layers of the structures.

The first structure 1920 includes a series of layers 1922 with ends 1923, an extended or base layer 1926 with an end 1928, and a recessed or cap layer 1930 with an end 1932. The series of layers 1922 are positioned upon the extended layer 1926 and then progressively upon each other in a double-layer stepped configuration. The second structure 1940 includes a series of layers 1942 with ends 1943, an extended or cap layer 1946 with an end 1948, and a recessed or base layer 1950 with an end 1952. The layers 1942 are positioned upon each other in a double-layer stepped overhanging configuration, which depends from the extended layer 1946. Each end 1943, is positioned opposing an end 1923. Between each aligned set of ends 1923 and 1943 is a sub-gap 1962. Each sub-gap 1962 has a length A19, which itself has a minimum length of the MFS of the device 1900.

The extended layers 1926 and 1946 each extend to a distance that can be less than the MFS from the opposite electrode. Specifically, the end 1928 is a distance B19 from the second structure 1940 and the end 1948 is set a distance B19 to the first structure 1920. This is possible as the extended layers 1926 and 1946 each lack a corresponding layer positioned across from them on the opposite electrode to define a MFS limited space between the electrodes. This results in the layering of the two structures being offset or shifted by a distance C19, which in the embodiment shown, is one layer thick.

It should be clear to one skilled in the art that the device 1900 and its alternate embodiments can be formed by embodiments of the fabrication methods set forth herein.

In other embodiments of the invention more than one configuration of the layers of the structures is used. This allows the layers of the structures to be arranged to meet the specific requirements of the use which the embodiment is employed. The configurations of layers used can match or be similar to that set forth herein, namely, aligned layer ends and the stepped layering. It should be clear to one skilled in the art that any combination of the layer configurations set forth herein can be combined to form an embodiment of the invention.

Regional Patterned Actuator Embodiments

Figure 20:
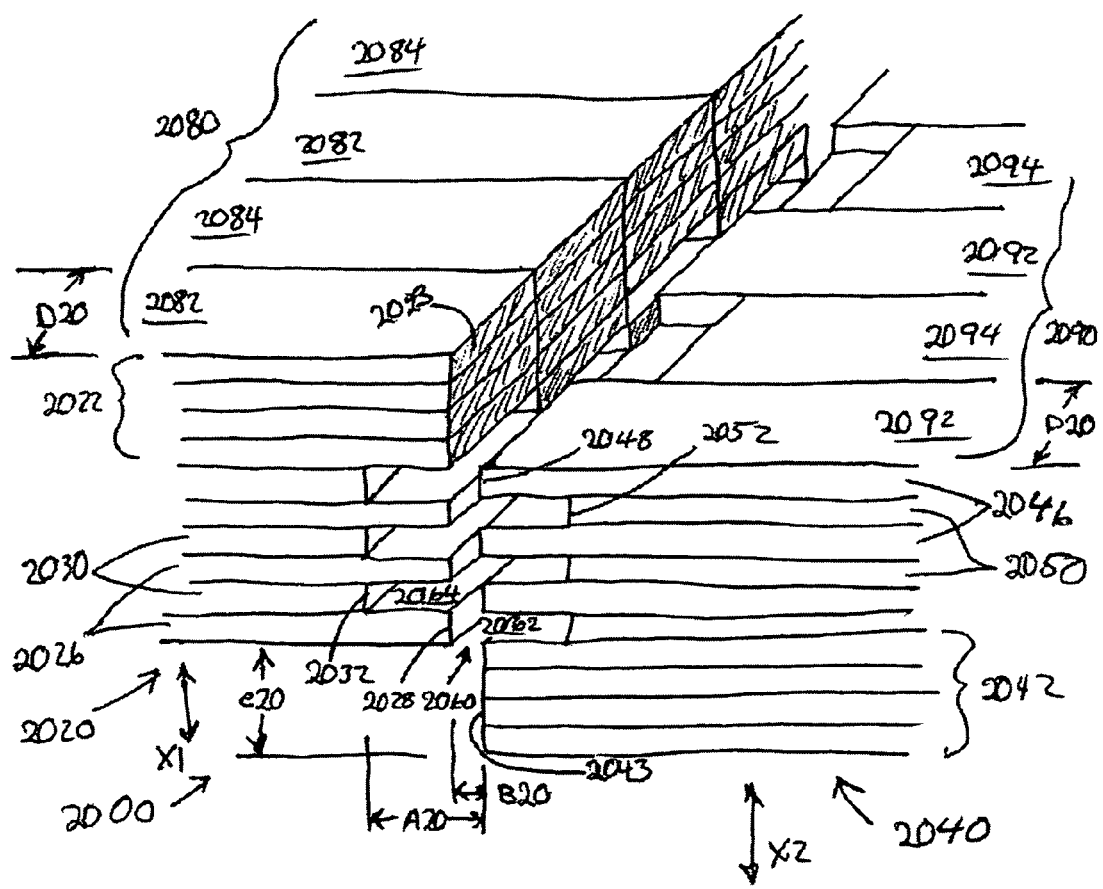
FIG. 20 schematically depicts a perspective view of a layered structure in accordance with at least one embodiment of the invention.

In other embodiments of the invention, the configuration of the layers varies not only vertically and horizontally as has been shown, but also along a depth of the device. FIG. 20 shows one example of an embodiment of a device 2000 that is configured with the layers varying along the device's depth. As can be seen, the pattern of the extended and recessed sections of the layers alternate vertically and across the depth of both the first structure 2020 and the second structure 2040.

The first structure 2020 and the second structure 2040 are separated by a gap 2060. With the device 2000 being an actuator, or more specifically a vertical comb actuator, the first structure 2020 can be an electrode which may be capable of moving in the direction X1, while the second structure 2040 an electrode which may be capable of moving in the direction X2.

The device 2000 can be employed in a variety of applications, in at least one embodiment, the device is an actuator, or more specifically a vertical comb actuator. The first structure 2020 and the second structure 2040 can be fixed and/or movable electrodes. As shown, the first structure 2020 can move in the X1 direction and/or the second structure 2040 can move in the X2 direction. In other embodiments one of the structures can be fixed in position by mounting the structure to any of a variety of structures (not shown). Movement of either or both structures can be achieved by applying a voltage differential between the electrodes.

The first structure 2020 includes a series of aligned layers 2022, extended layers 2026, and recessed layers 2030. Each layer of the series of aligned layers 2022 include an end 2023, which are vertically aligned with one another. The extended layers 2026 have ends 2028 which are aligned with the ends 2023. The recessed layers 2030 have ends 2032, which are recessed back from the ends 2023 and 2028. Along its depth, the first structure 2020 has a series of sections 2080 which include a first or base section 2082 and a second or shifted section 2084. As can be seen below the series of layers 2022 the first section 2082 and the second section 2084 alternate in extended and recessed portions along the depth of the first structure 2020. The width of the sections 2080 is the distance D20. Depending on the embodiment, due to fabrication limitations, the minimum size of the width D20 is the MFS.

The second structure 2040 includes a series of aligned layers 2042, extended layers 2046, and recessed layers 2050. Each layer of the series of aligned layers 2042 include an end 2043, which are vertically aligned with one another. The extended layers 2046 have ends 2048 which are aligned with the ends 2043. The recessed layers 2050 have ends 2052, which are recessed back from the ends 2043 and 2048. The second structure 2040 has a series of sections 2090 which include a first or base section 2092 and a second or shifted section 2094. Above the series of layers 2042, the first section 2092 and the second section 2094 alternate in extended and recessed portions along the depth of the second structure 2040. The width of the sections 2090 is the distance D20, which has a minimum size of the MFS.

In the position of the device 2000 as shown, the gap 2060 includes first sub-gaps 2062 and second sub-gaps 2064. The first sub-gaps 2062 are positioned between the ends 2028 and 2052 and the second sub-gaps 2064 between the ends 2032 and 2048. The widths of the sub-gaps 2062 and 2064 are a distance A20, which is at least the MFS and in some embodiments is equal to the MFS.

With the vertical and depth-wise alternating pattern of extended and recessed layers in the device 2000, an effective surface on each structure is defined from the pattern of extended layers. As shown in FIG. 20, an effective surface of the first electrode 2020 is defined by the ends 2023 and 2028 of the extended layers 2022 and 2026. Likewise, the second structure 2040 has a second effective surface (not shown) defined by the ends 2043 and 2048 of the extended layers 2042 and 2046. The effective surfaces are positioned a distance B20 apart, which is capable of being substantially less than the MFS.

In alternate embodiments of the invention, different patterns of extended and recessed layers, from those shown in FIG. 20, are used in the sections 2080 and 2090. For example, the pattern of layers set forth in any of the embodiments of the invention shown in FIGS. 12-16 (devices 1200, 1300, 1400, 1500 and 1600). Each section can have a different pattern as desired. Further, as shown in FIG. 20, the patterns may be shifted by one or more layers. By varying the pattern of the layering in different sections along the depth of the device, the device is capable of providing improved performance by minimizing the number of extended sub-gaps and maximizing the number of shortened sub-gaps over the movement of the structures relative to one another. In other alternate embodiments, the specific horizontal positioning of the sub-gaps can vary along each aligned layer (e.g. positioned in part on either of the two structures). In other alternates, the positions of the ends of each layer in the device 2000 can vary and are not necessarily aligned as shown. While the in other embodiments the ends of the layers of the device 2000 can vary in position such that they are not aligned, as shown, aligning the ends 2032 and 2028 and the ends 2043 and 2048, provides the benefit of closer structure positioning.

The device 2000 and its alternate embodiments can be formed by embodiments of the fabrication methods set forth herein.

Horizontal Comb Actuator Embodiments

Figure 21A:
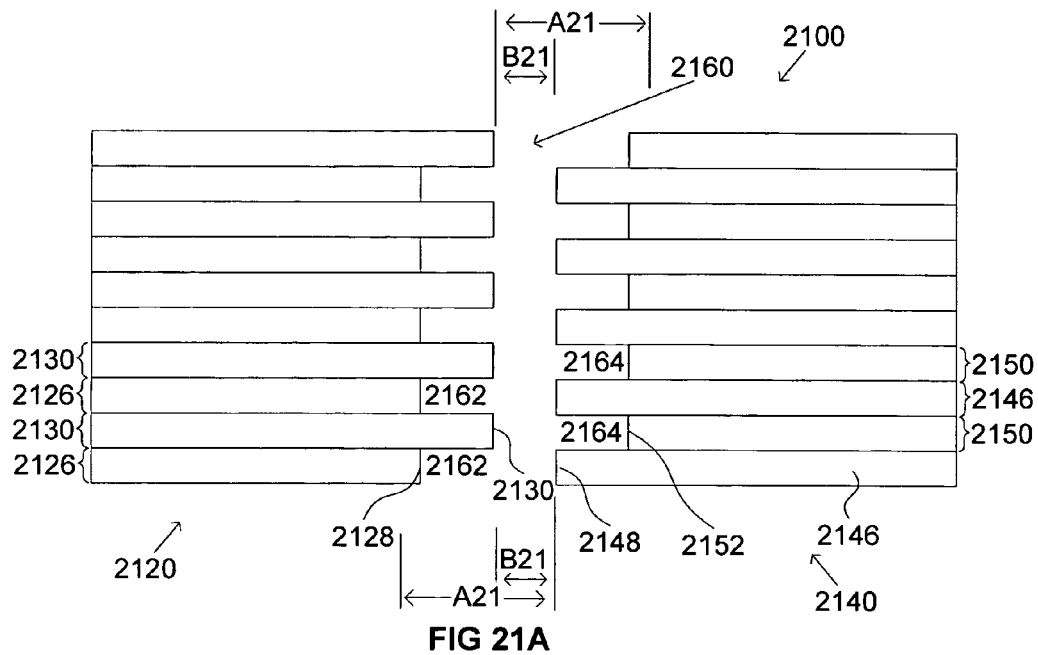
FIG. 21A schematically depicts a side view of FIG. 20 and FIG. 21B schematically depicts a top view of FIG. 20 in accordance with at least one embodiment of the invention.
Figure 21B:
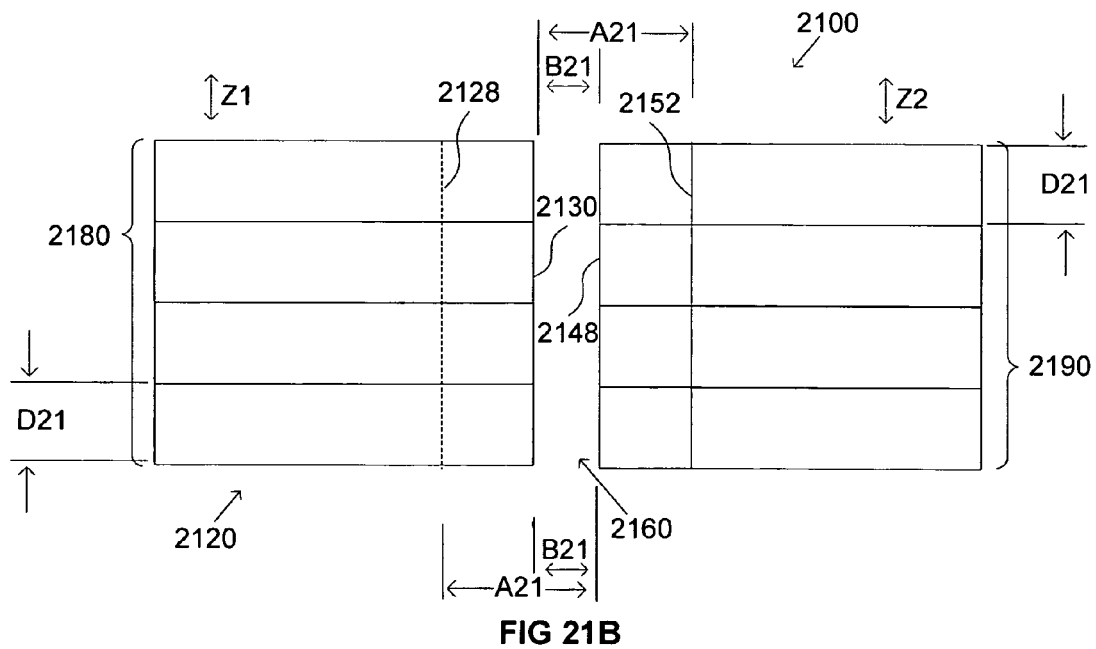

Some embodiments of the invention can also be embodied in a horizontal comb actuator (HCA) for movement or actuation of other structures in a generally horizontal direction. Shown in FIGS. 21A and 21B is another embodiment of the invention, wherein a device 2100 includes a first structure 2120 and a second structure 2140 separated by a gap 2160. FIG. 21A showing a side view and FIG. 21B a top view of the device 2100.

The first structure 2120 includes a set of layers having alternating recessed layers 2126 and extended or flush layers 2130. The recessed layers have ends 2128 positioned aligned with each other and the extended layers 2130 have aligned ends 2132. Similarly, the second structure 2140 includes a set of layers having alternating extended or flush layers 2146 and recessed layers 2150. The extended layers 2146 have aligned ends 2148 and the recessed layers 2150 have aligned ends 2152. Because of the staggered positioning of the layers the extended ends 2130 and 2148 are positioned a distance B21 apart. Since the extended ends 2130 and 2148 are not in the same layers, the distance B21 is capable of being significantly less than the MFS.

The gap 2160 includes first sub-gaps 2162 and second sub-gaps 2164 which alternate along the gap 2160. The first sub-gaps 2162 are positioned between the recessed ends 2130 and the extended ends 2148. The second sub-gaps 2164 are positioned between the extended ends 2130 and the recessed ends 2152. While the sub-gaps 2162 and 2164 can vary in their width, a distance A21, the width is limited to a minimum of the MFS of the device 2100.

The device 2100 can be employed in a variety of applications, in at least one embodiment, the device is an actuator, or more specifically a horizontal comb actuator. The first structure 2120 and the second structure 2140 can be fixed and/or movable electrodes. Depending on the embodiment, either the first structure 2120 and/or the second structure 2140 are capable of moving in a horizontal direction. As shown in FIG. 21B, the first structure 2120 can move in a direction Z1 and/or the second structure 2140 can move in a direction Z2. Either of the structures 2120 and 2140 can be fixed in place by being mounted to a substrate, another structure, or the like.

Each structure can include sections of varying arrangement along its depth. For example, in the embodiment shown, the first structure 2120 includes a set of sections 2180 and the second structure 2140 a set of sections 2190. Each section of the sets 2180 and 2190 can vary size, being shown with widths of a distance D21, which has a minimum dimension, equal to the MFS. These sections can each have a different pattern of the arrangement of the vertical layering (e.g. extended and recessed layers) as desired. By varying the pattern of the layering in different sections along the depth of the device, the device is capable of providing improved performance by minimizing the number of extended sub-gaps and maximizing the number of shortened sub-gaps over the movement of the structures relative to one another.

In other alternate embodiments, the specific horizontal positioning of the sub-gaps can vary along each aligned layer (e.g. positioned in part on either of the two structures). In other alternates, the positions of the ends of each layer in the device 2100 can vary and are not necessarily aligned as shown. While in other embodiments the ends of the layers of the device 2100 can vary in position such that they are not aligned, as shown, aligning the ends 2132 and 2128 and the ends 2143 and 2148 provides the benefit of closer structure positioning.

The vertical pattern of the layers in the first and second structures 2120 and 2140 as well as the horizontal pattern across the sections 2280 and 2290 along the depth, can be any of a variety of arrangements. For instance, the same or similar patterns as those used for the layering in the offset vertical comb actuators described herein (e.g. devices 900, 1000, 1200, 1300, 1400, 1500, 1600, 1700, 1800 and 1900), can be applied to obtain similar improvements in performance.

The device 2100 and its alternate embodiments can be formed by embodiments of the fabrication methods set forth herein.

In other embodiments of the horizontal comb actuator, the actuator is not only patterned in extended (flush) and recessed portions vertically, but is also patterned along its depth. This horizontal patterning allows for selective arrangement of the extended and recessed portions to achieve improved performance by minimizing extended sub-gaps and maximizing shortened sub-gaps during the horizontal movement of the structures relative to one another (as with layer patterning in the vertical comb actuators, further described herein). The horizontal patterning used can be any of a variety of different arrangements depending on the specific requirements of the particular use. In fact, by horizontally offsetting the two structures, regions of all extended sections of each structure can be formed to further facilitate operation of the device.

Figure 22:
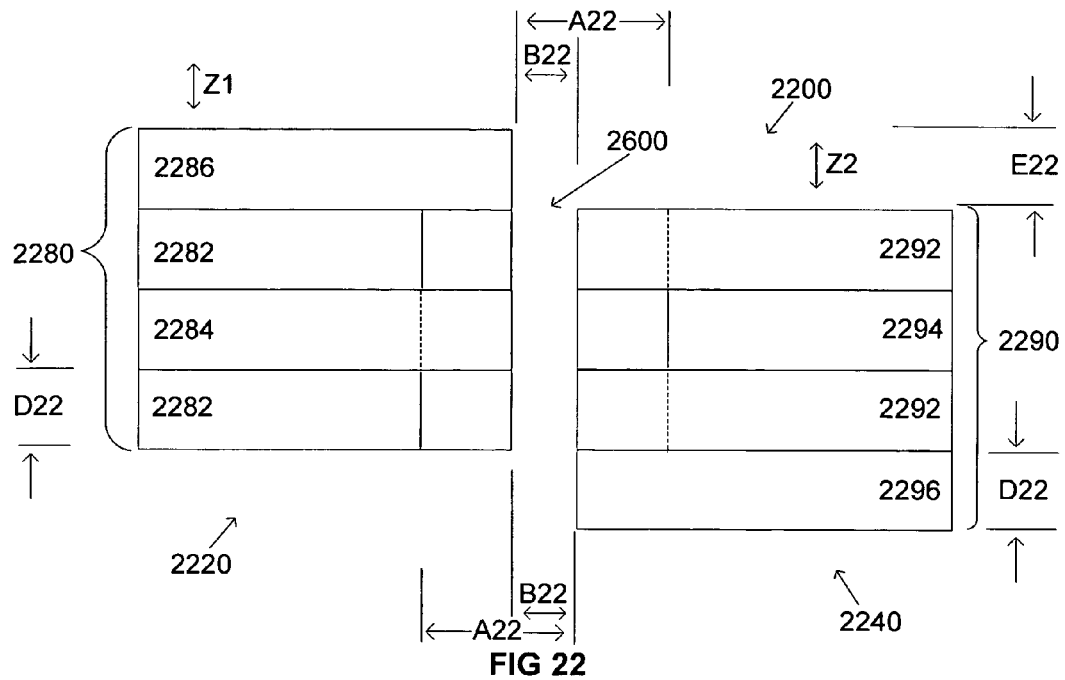
FIG. 22 schematically depicts a top view of a layered structure in accordance with at least one embodiment of the invention.

FIG. 22 shows an example of an embodiment of a horizontal actuator with depth-wise patterning. FIG. 22 showing a top view of the actuator with structures having depth-wise section patterning. The device 2200 includes a first structure 2220, a second structure 2240 and a gap 2260 separating them. As can be seen in FIG. 22, depending on the specific embodiment, the first structure 2220 may capable of moving in the direction of Z1 and/or the second structure 2240 may be capable of moving in a direction Z2. Also, either one of the two structures may be fixed in place.

The device 2200 can be used in a variety of applications, in at least one embodiment the device is an actuator, or more specifically a horizontal comb actuator. The first structure 2220 and the second structure 2240 can be fixed and/or movable electrodes.

Like with the vertical actuators described herein, the first structure 2220 and the second structure 2240 are fabricated with a series of layers stacked vertically. The layers can be patterned to have series of extended and recessed layers. Separating the aligned layers between the electrodes is a series of sub-gaps, which have a width of the distance A22 (from a recessed end to a flush end). While the width of the sub-gaps can vary, they are limited to a minimum size of the MFS. However, the minimum separation between the electrodes (an extended end on one structure to an extended end on the other), is a distance B22.

The structures 2220 and 2240 can be fabricated in the position shown; such that they have a horizontal offset a distance E22 as shown. While the about of offset can vary, here the offset E22 is equal to a section of a series of sections 2280 and a series of sections 2290.

Along the depth of the first structure 2220 the series of sections 2280 includes first sections 2282 and second sections 2284. The width of the sections 2280 is a distance D22, which has a minimum length of the MFS. Depending on the particular embodiment, the pattern of the layering of each section can vary. In the embodiment shown, the first and second structures have opposite patterns. The section 2280 also includes an offset section 2286 which made is entirely of extended layers. This is achievable due to a lack of any opposing structure being positioned across from the section 2286, due to the horizontal offset of the structures.

Similarly, the series of sections 2290 includes first sections 2292, second sections 2294 and an offset section 2296, which is entirely of extended layers. The width of the sections 2290 can vary, shown here as the distance D1, which has a minimum width of the MFS of the device 2200.

A benefit provided by the horizontal offset is that as the structures move towards each other, the sections 2286 and 2296, which are completely of extended end layers, the overall separation of the structures will decrease. That is, instead of moving towards sections having a pattern of recessed and extended layers (to allow MFS sized sub-gaps due to opposing structure), the sections move towards sections with all extended layer formable from the lack of opposing structure. This results in an overall increase in the performance of the device.

Depending on the embodiment, the pattern of the sections 2280 and 2290 along the depth of the first structure 2220 and the second structure 2240 can be any of a variety of arrangements. For instance, the same or similar patterns as those used for the layering in the offset vertical comb actuators described herein (e.g. devices 900, 1000, 1200, 1300, 1400, 1500, 1600, 1700, 1800 and 1900), can be applied in the offset horizontal comb actuators to achieve similar improvements in performance.

It should be clear to one skilled in the art that the device 2200 and its alternate embodiments can be formed by embodiments of the fabrication methods set forth herein.

Capacitance Type Actuator Embodiments

Figure 23:
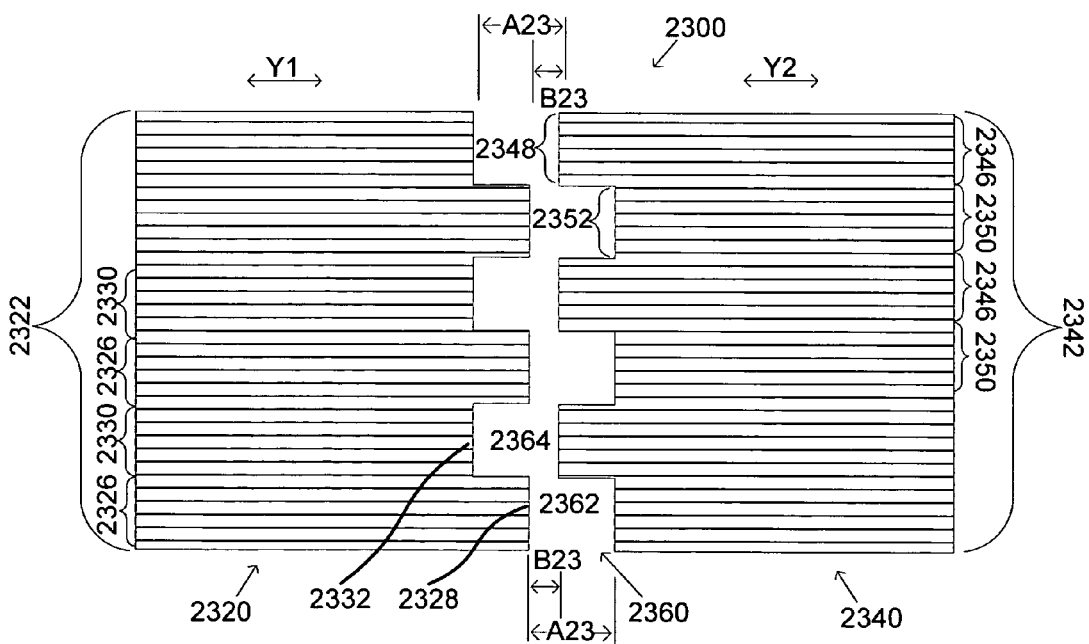
FIG. 23 schematically depicts a side view of a layered structure in accordance with at least one embodiment of the invention.

Some embodiments of applicants' invention provide a capacitance type actuator (CTA). In a capacitance actuator, unlike the vertical and depth-wise movements of the VCA and the HCA respectfully, where the structures move relative to each other while maintaining a substantially constant separation, the two structures of a CTA move directly towards each other as a result of a force generated by a capacitance charge placed on the structures. An embodiment of a capacitance actuator is shown in FIG. 23.

A device 2300 includes a first structure 2320, a second structure 2340 and a gap 2360 separating the structures. Depending on the embodiment, either the first structure 2320 and/or the second structure 2340 can move horizontally towards and away from each other. The first structure 2320 may be capable of moving in a direction Y1 and/or the second electrode may be able to move in a direction Y2.

The device 2300 can be used in a variety of applications, in at least one embodiment, the device 2300 is an actuator, or more specifically a capacitance type actuator. The first structure 2320 and the second structure 2340 can be fixed and/or movable electrodes.

The first structure 2320 includes a series of layers 2322. The layers 2322 are formed into sets of extended layers 2326 with ends 2328 and a set of recessed layers 2330 with ends 2332. Likewise, the second structure 2340 includes a series of layers 2342. The layers 2342 are formed into sets of extended layers 2346 with ends 2348 and a set of recessed layers 2350 with ends 2352. Set between the extended sets 2326 and the recessed sets 2350 are sub-gaps 2362 and between the extended portions 2346 and the recessed portions 2330 are sub-gaps 2364.

To facilitate movement of one or both of the structures and minimize the separations there between, the extended layers and the recessed layers of both structures are substantially aligned with one other. That is, the recessed areas are capable of receiving the extended areas. To avoid contact or interference between the two structures, the sets of recessed layers 2330 and 2350 can be made larger than the sets of the extended layers 2326 and 2346. As shown, in this embodiment the sets of recessed layers are two layers wider than the sets of extended layers.

At an initial position (as shown), the distance from an set of extended layers on one structure to a corresponding set of recessed layers on the opposite structure is a distance A23, which is limited to a minimum length of the MFS. The distance between sets of extended layers of both structures is a distance B23, which depending on the specific embodiment, can be substantially less than the MFS.

The number of layers 2322 and 2342 used to form the structures can vary depending on the embodiment. While in the embodiment shown in FIG. 23, each extended and recessed set of layers is made of several of layers, less or more layers can be used. However, use of several layers for each set allows the recessed layers sets to be formed larger than the extended layer sets that they receive.

The device 2300 and its alternate embodiments can be formed by embodiments of the fabrication methods set forth herein.

Serrated Actuator Embodiments

Other embodiments of the invention include an actuator having serrated edges on the structures. The serrated edges are positioned opposing each other to form a zigzagged shaped gap between the structures. The serrated edge structures can be used in a variety of actuators including vertical comb actuators, horizontal comb actuators and capacitance type actuators. Depending on the particular embodiment, by employing serrated edges on the structures, the actuator is capable of having a reduced overall offset, and therefore, increased performance.

Figure 24:
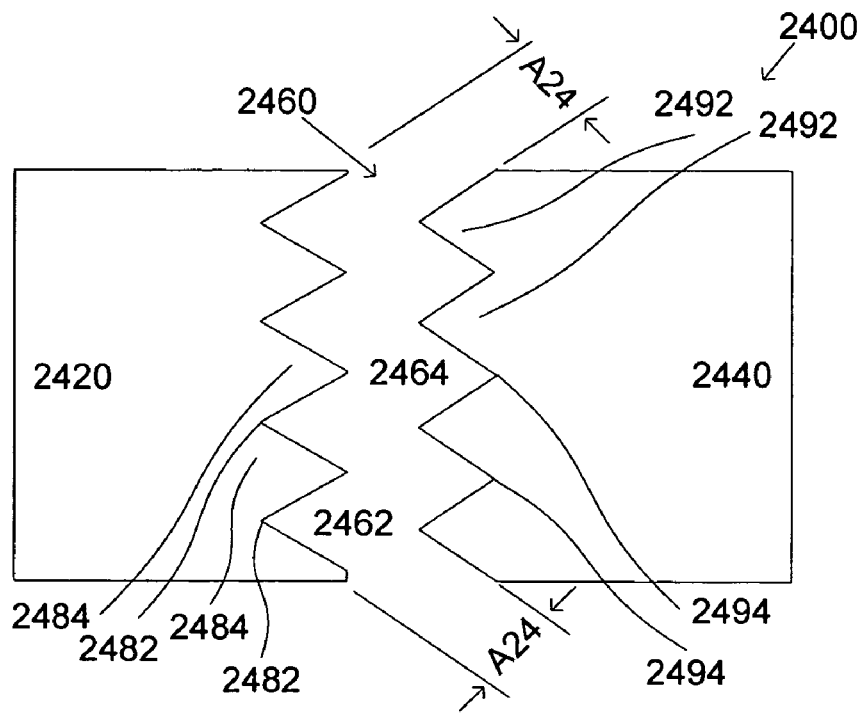
FIG. 24 schematically depicts a top view of a layered structure in accordance with at least one embodiment of the invention.

One embodiment of a device having serrated edges is set forth in the top view of FIG. 24, wherein a device 2400 includes a first structure 2420, a second structure 2440, and separating them, a zigzag shaped gap 2460. The first structure 2420 includes recessed regions 2482 and extended regions 2484. The second structure 2440 includes extended regions 2492 and recessed regions 2494. The recessed regions 2482 being laterally aligned with the extended regions 2492 and the extended regions 2484 aligned with the recessed regions 2494.

The device 2400 can be used in a variety of applications, in at least one embodiment, the device 2400 is an actuator, such as a VCA, HCA or a CTA. The first structure 2420 and the second structure 2440 can be fixed and/or movable electrodes.

As shown, the gap 2460 has a width of a distance A24. While the size of the gap 2460 can vary, due to the inherent manufacturing limitations, the minimum width of a sub-gap is the MFS of the device 2400. In its initial position, the gap 2460 has a series of sub-gaps including first sub-gaps 2462 positioned between the recessed regions 2482 and the extended regions 2492 and the second sub-gaps 2464 between the extended regions 2484 and the recessed regions 2494.

While the embodiment shown in FIG. 24 has the extended regions aligned with the recessed regions, in other embodiments the device can have the extended regions on one structure aligned with extended regions on the other structure, and recessed regions aligned with other recessed regions. This can be achieved by either further widening the gap between the electrodes to allow the separation between the extended regions to be no less than the MFS or by moving the electrodes in a depth-wise direction (within the plane shown) from an initial position, such as that shown in FIG. 24.

To further reduce the separation between the structures, an embodiment of the invention utilizes staggered horizontally aligned layers with serrated edges. Even though the separation on each layer is at least the MFS, the extended portions of each electrode can be positioned to have a separation significantly less than the MFS. This provides for an increase in the performance of the actuator, as compared to that of an actuator having non-staggered layering.

Figure 25A:
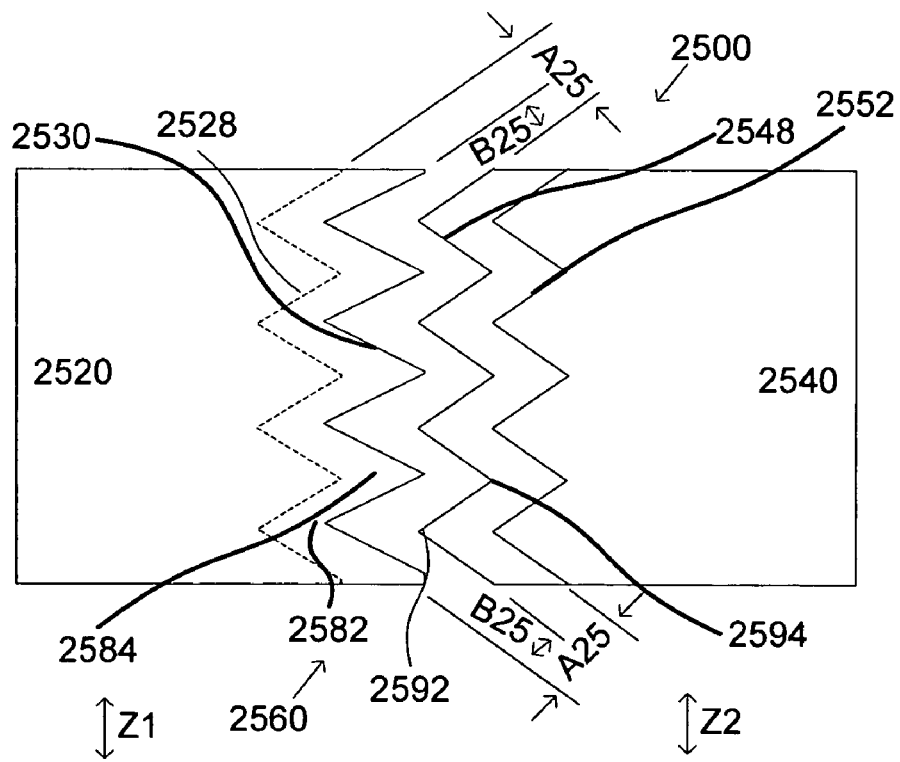
FIG. 25A schematically depicts a top view of a layered structure and FIG. 25*b* schematically depicts a side view of the layered structure in accordance with at least one embodiment of the invention.
Figure 25B:
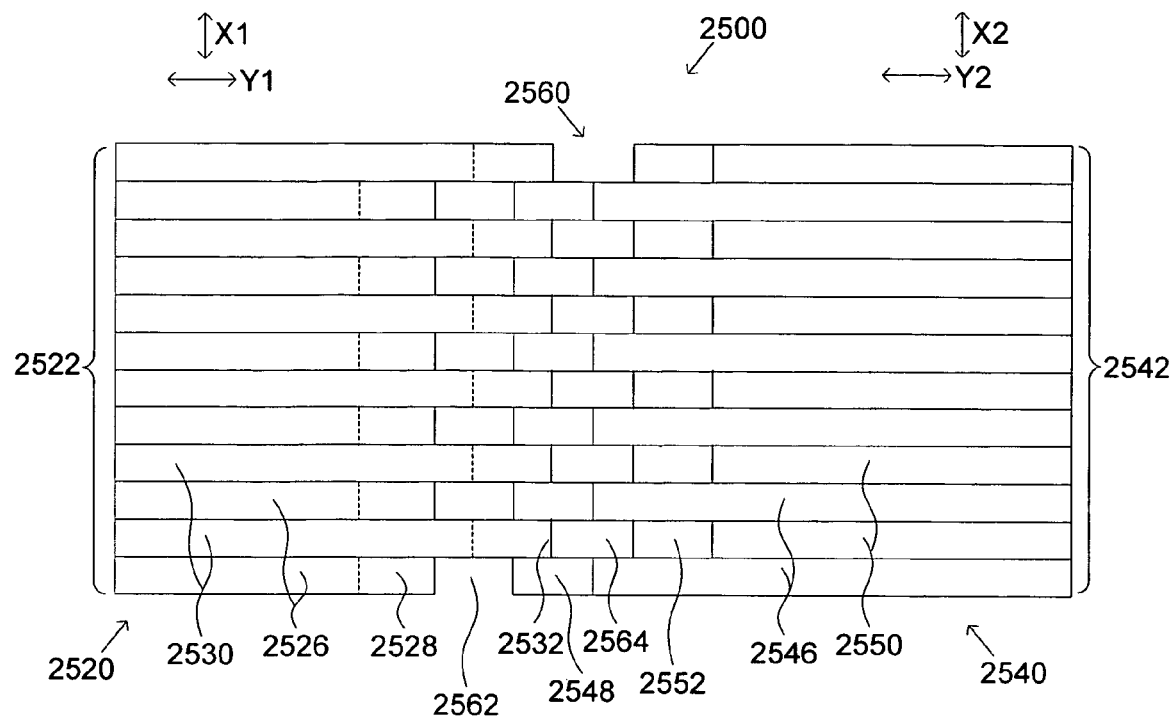

FIGS. 25A and 25B show an embodiment of the Applicants' invention, wherein a device 2500 has structures with staggered layers and serrated edges, such that the structures are capable of being separated by a distance that is less than the MFS. A first structure 2520 is separated by a gap 2560 from a second structure 2540. Depending on the embodiment, the first structure 2520 and/or the second electrode 2540 can be capable of moving in variety of directions, including vertical (X1 and/or X2), and horizontal (Y1 and/or Y2), as shown (the structures may also move in the depth-wise direction, Z1 and/or Z2, provided sufficient clearance exists). Also, either structure 2520 or 2540 may be stationary.

The device 2500 can be used in a variety of applications, in at least one embodiment the device 2500 is an actuator, including a VCA, HCA or a CTA. The first structure 2520 and the second structure 2540 can be fixed and/or movable electrodes.

The first structure 2520 and the second structure 2540 have aligned layers which are separated by staggered gaps and that have ends which are serrated in a depth-wise direction (Z direction). The first structure 2520 has a set of layers 2522 which alternate between recessed layers 2526 with ends 2528 and extended layers 2530 with ends 2532. Likewise, the second structure 2540 includes a series of layers 2542 with extended layers 2546 having ends 2548 and recessed layers 2550 with ends 2552. Along the depth of the device 2500, the extended layers 2530 have extended regions 2584 and recessed regions 2582, and the extended layers 2546 have extended regions 2592 and recessed regions 2594.

The gap 2560 is not only in a zigzag configuration along the depth of the device 2500, but also in a staggered arrangement along the vertical direction (X direction). Along each layer of the device 2500, the gap 2560 includes sub-gaps 2562, positioned between the ends 2528 and 2548, and sub-gaps 2564, positioned between the ends 2532 and 2552. As shown, the width of each sub-gap is a distance A25 which, depending on the embodiment can vary, but is limited to a minimum of the MFS. In contrast, the distance between the extended layers 2530 and the extended layers 2546 is a distance B25, which is capable of being a distance less than the MFS.

Alternate embodiments include using vertical and horizontal offsets of the first and second structures in their initial construction positions, with the structures being able to be moved to non-offset positions with less overall separation between the structures. Further, the patterning of the layering can be arranged so to facilitate moving the structures from an initial offset position to a more aligned position.

The devices 2400 and 2500 and their alternate embodiments can be formed by embodiments of the fabrication methods set forth herein.

Filter Apparatus Embodiments

In other embodiments of the invention the apparatuses and methods employ staggered or varied layer patterning to define elements or features which are capable of being sized less than the MFS. By utilizing material layers with different patterns of openings, or gaps, which are placed over each other, a separate pattern of openings, or gaps, which are defined at the intersection of the layers, can be formed. That is, one or more openings in adjacent layers can be positioned to overlap, such that one or more smaller sized opening(s) are obtained at the overlap. Because the size of the defined openings are dependent only on the amount of overlap between the openings, and not the size of the particular openings in the layers, the openings may have dimensions which are less than the manufacturing limits of the openings in the patterned layers. As detailed herein, examples include deposition of abutting or closely spaced layers, having differing patterns of openings, which together define a composite pattern of holes sized smaller than the MFS. Applications of these embodiments can include the fabrication of precise micro-filters/screens and/or nozzles.

Figure 26A:
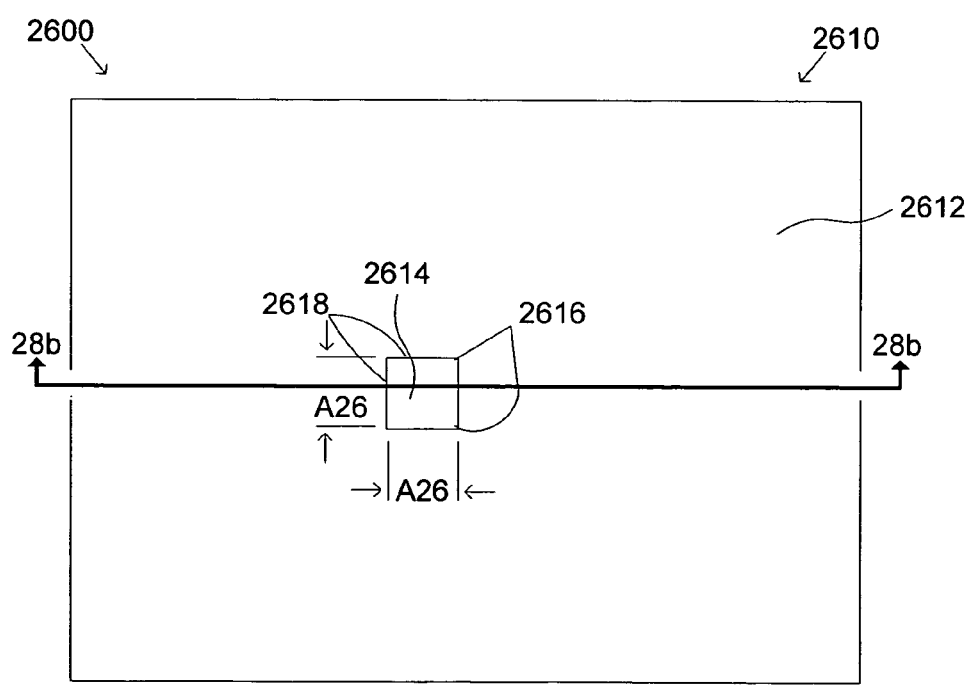
FIGS. 26A and 26B schematically depict top views of a layered structure in accordance with at least one embodiment of the invention.
Figure 26B:
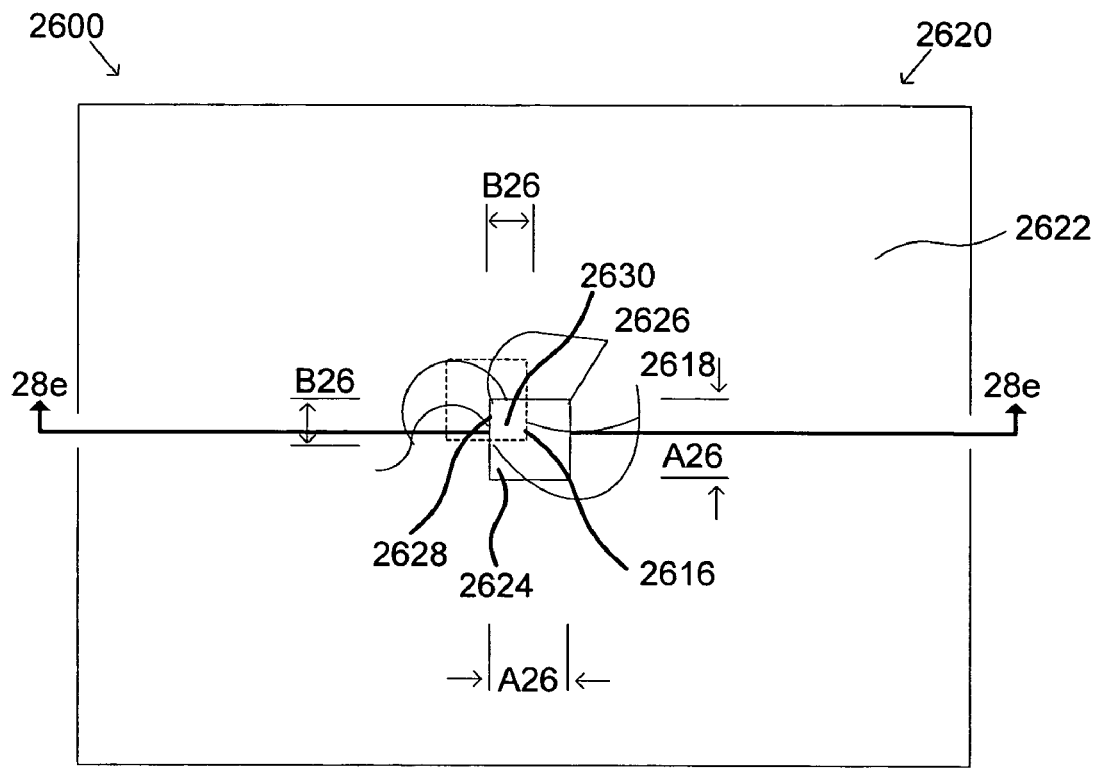
Figure 27:
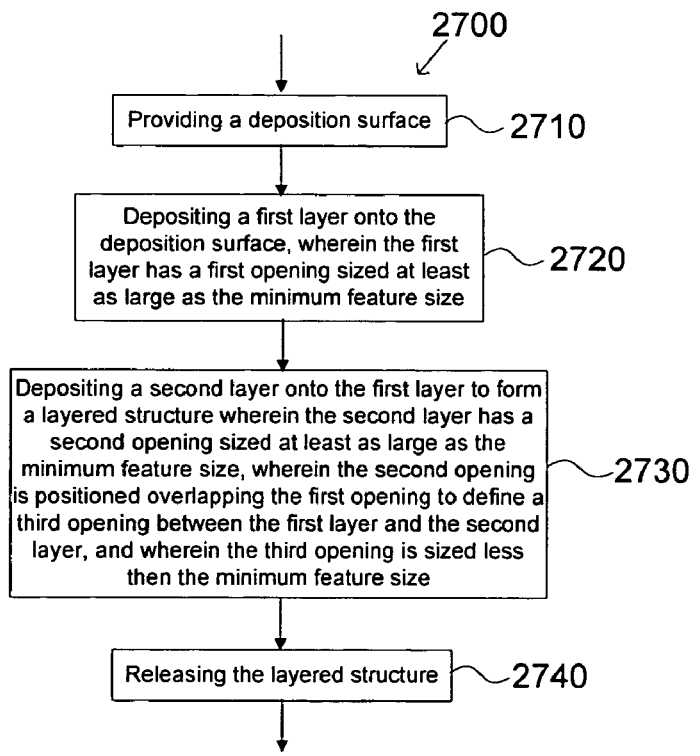
FIG. 27 provides a flowchart a method of least one embodiment of the invention.

As shown in FIGS. 26-28, one embodiment of the invention is an apparatus and fabrication method of a layered device having elements or features defined at the intersection of the layers. More specifically, the embodiments include a multi-layered structure that has one or more openings or gaps defined in adjacent layers, which are positioned to overlap to define other opening(s) or gap(s) between the layers at the overlap.

FIG. 26A shows a first layer 2610 of a device 2600 that includes a frame 2612 which defines a first opening or gap 2614 therein. The first opening 2614 passes through the first layer 2610, which, depending on the particular application, is capable of allowing the flow of a fluid, gas, particles or the like through the first layer 2610. The opening 2614 is defined with corners 2616 and walls 2618 about it. The specific size and shape of the opening 2614 can vary. The inherent limitations of the fabrication of the layer 2610 limits the minimum size of any dimension of the opening 2614 to the MFS of the device 2600. The shape of the opening 2614 can be any of a variety of geometric shapes including squares and rectangles. In the particular embodiment shown, the opening 2614 is square with the dimensions of a width A26 and a width A26.

The second layer 2620 has a frame 2622 that defines an opening or gap 2624, as shown in FIG. 26B. The opening 2624 passes through the second layer 2620, which is capable of allowing the flow of a fluid, gas, particles or the like. The opening 2624 is defined with corners 2626 and walls 2628. The specific size and shape of the opening 2624 can vary, but as with the opening 2614 the opening 2624 is also limited to minimum dimensions of the MFS of the device 2600. The shape of the opening 1624 can be a variety of different geometric shapes (square, rectangular, etc.). Here the opening 2624 is square with the dimensions of a width A26 and a width A26.

The first opening 2614 and the second opening 2624 together define a smaller third opening or gap 2630. The overlapping of the openings 2614 and 2624 provide the defined opening 2630 at the interface of the two layers. The defined opening 2630 includes a corner 2616 and walls 2618 of the opening 2614, and a corner 2626 and walls 2628 from the opening 2624. With the size of the defined opening 2630 being dependent only upon the portion of overlap between the openings 2614 and 2624, the size of the opening 2630 is independent of the limitation in minimum feature size inherent with the openings 2614 and 2624.

As a result, the opening 2630 is not specifically limited in minimum size to the MFS of the device 2600, as is otherwise the situation with any feature constructed with in a single material layer. As shown in the embodiment of FIG. 26B, the defined opening 2630 is square with the dimensions of a width B26 and a width B26. That is, the width B26 is capable of being made with less than the MFS. Other shapes (e.g. rectangles, triangles, etc.) and dimensions of the defined opening 2630 are possible in other embodiments of the invention.

The device 2600 can be used in a variety of applications, in at least one embodiment, the device 2600 is on its own or part of a screen, which can be employed for operations such as filtering or the like.

Filter Fabrication Method Embodiments

Some embodiments of Applicants' invention provide methods of fabricating patterned layered structures to define elements capable of being sized less than the MFS, such as the device 2600. Generally, the fabrication methods include depositing a first layer with a first element (e.g. an opening, pore, space, and gap), depositing a second layer with a second element positioned so to define a third element at an intersection of, or in between, the first layer and the second layer.

As shown in FIG. 27, one embodiment of a method for fabricating a filter having a minimum feature size 2700 includes the processes of providing a deposition surface 2710, depositing a first layer onto the deposition surface, wherein the first layer has a first opening sized at least as large as the minimum feature size 2720, depositing a second layer onto the first layer to form a layered structure, wherein the second layer has a second opening sized at least as large as the minimum feature size, wherein the second opening is positioned overlapping the first opening to define a third opening between the first layer and the second layer, and wherein the third opening is sized less than the minimum feature size 2730 and releasing the layered structure 2740.

As will be detailed herein, the structures obtainable by operation of the method 2700 can be of a variety of different embodiments, examples of which are shown in FIGS. 26A-26B and 28A-26E.

Figure 28A:
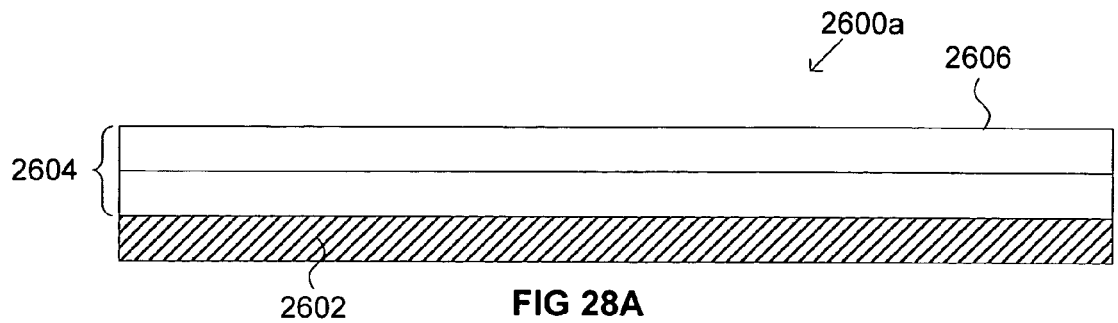
FIGS. 28A-28E schematically depict side views of various stages of fabrication of a layered structure in accordance with at least one embodiment of the invention.

During the process of providing a deposition surface 2710, as shown in FIG. 27, a suitable surface for the later deposition of the first layer is obtained. The deposition surface can be located on any of several different types of structures including, a substrate and a layered or formed structural or sacrificial element. In certain embodiments wherein a fluid or gas is to flow through the openings in the device, a sacrificial material can be used for the deposition surface to provide for a later pathway of the fluid or gas flow, such as shown in FIG. 28A. In such embodiments the process 2710 can include the steps of providing a substrate, depositing at least one layer of sacrificial material upon the substrate, and forming a deposition surface on the sacrificial material.

The element on which the deposition surface is provided can be of any of a variety of suitable materials formable to have a surface smooth enough to allow for layer deposition. Such suitable materials can include silicon, glass, plastic, or a metal (e.g. nickel, copper, silver, gold, etc.). The deposition of materials can be done by any of a variety of processes well known in the art. Likewise, the surface provided can be formed through any of a variety of methods well known in the art including etching (wet or dry), milling, lapping, molding, extrusion and the like.

In some embodiments, the process of providing a surface can also include applying a seed layer on the structure in order to facilitate later layer deposition. For instance, if the material of the structure used is not sufficiently conductive (e.g. plastic or glass) to allow electrodeposition techniques to be employed for layer deposition, then a seed layer of conductive material can be used.

One embodiment of a structure obtainable by operation of the process of providing a deposition surface 2710 is shown in FIG. 28A. A structure 2600a includes a substrate 2602, layers of sacrificial material 2604 and a deposition surface 1606.

Another process of the method 2700 is depositing a first layer onto the deposition surface, wherein the first layer has a first opening sized at least as large as the minimum feature size 2720, as shown in FIG. 27. Depending on the embodiment, the process 2720 may further include the steps of depositing a first layer of material defining the first opening, depositing a sacrificial material to provide a continuous layer, and forming a deposition surface.

Figure 28B:
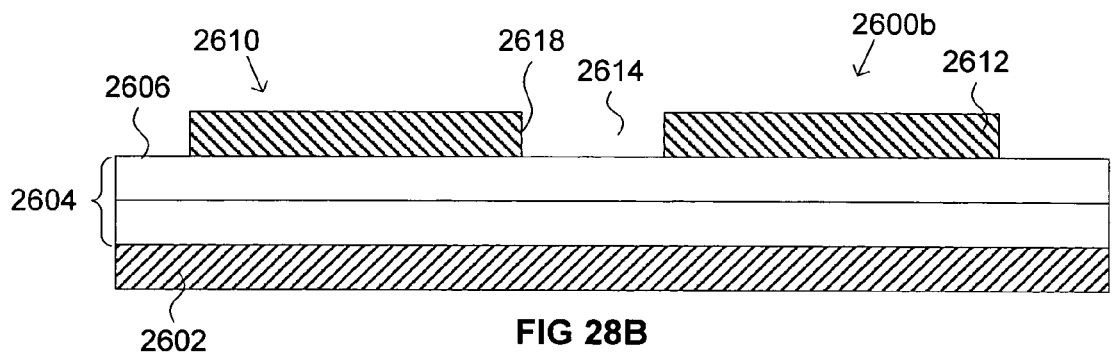

FIGS. 26A and 28B set forth some embodiments of structures formable by the operations of the process 2720. As shown in FIG. 28B, the step of depositing a first layer of material can provide a device 2600b with the first layer 2610 deposited over the deposition surface 2606. The first layer 2610 has the frame 2612 with the first opening 2614 having walls 2618. The material of the first layer 2610 can be deposited to a thickness greater that the final desired thickness of the first layer 2610, as any additional material can be removed during the later step of forming a deposition surface. In this embodiment, the first layer 2610 is a structural material. The specific material used for the structural material can vary (including gold, silver, nickel, copper, and the like), in some embodiments the material is a nickel.

For the selective deposition of the first layer 2610, as shown in FIGS. 26A and 28B, any of the herein described masks and masking techniques (e.g. INSTANT MASK™, MOA, AIM, ACC, methods detailed in the '630 patent and '637 patent disclosures), can be employed. Deposition of the material of the first layer 2610 can be performed by any of a variety of electrodeposition methods including the electrochemical fabrication methods described herein. Then the mask is removed by processes associated with the type of mask used.

The use of a mask to deposit the first layer 2610 limits the minimum obtainable size of any feature or element defined on the layer 2610 to the minimum feature size (MFS) of particular the mask used. The specific dimension of the MFS is dependent on the type of mask and masking technique used. The MFS is a direct function of smallest feature which can be defined during the fabrication of the mask itself. As a result, the minimum dimensions of the opening 2614 defined in the frame 2612 is the MFS of the process used.

Depositing a sacrificial material to provide a continuous layer is another possible step in the process 2720. The deposition of the sacrificial material allows later shaping and sizing of the first layer by covering the opening and areas about the frame 2612, such that a continuous material layer is formed. Such a continuous layer allows methods such as planarization to be employed.

The specific material used as the sacrificial material can be any of a variety of suitable materials (including gold, silver, nickel, copper, and the like), in some embodiments sacrificial material is a silver. The sacrificial material can be deposited by any of a variety of methods including a blanket electrodeposition. The blanket deposition can be achieved by electroplating from an anode (not shown), composed of the sacrificial material, through an appropriate plating solution (not shown), and to the cathode, which here is the frame 2612 (or at least the exposed surface thereof).

It should be noted that in alternate embodiments of method the material of the frame 2612 is a sacrificial material instead of a structural material, and sacrificial regions are of a structural material instead of a sacrificial material.

Next, the step of forming a deposition surface can be performed to complete the process 2720. An embodiment of a structure 2600c obtainable by operation of the sacrificial material deposition step and the deposition surface forming step, includes the structure shown in FIG. 28C. As shown, a sacrificial material has been deposited about the frame 2612 and in the first opening 2614 such that a continuous layer 2613 was formed (as detailed above). A deposition surface 2617 is formed across the structure 2600c to be sufficiently smooth to allow additional material deposition.

Figure 28C:
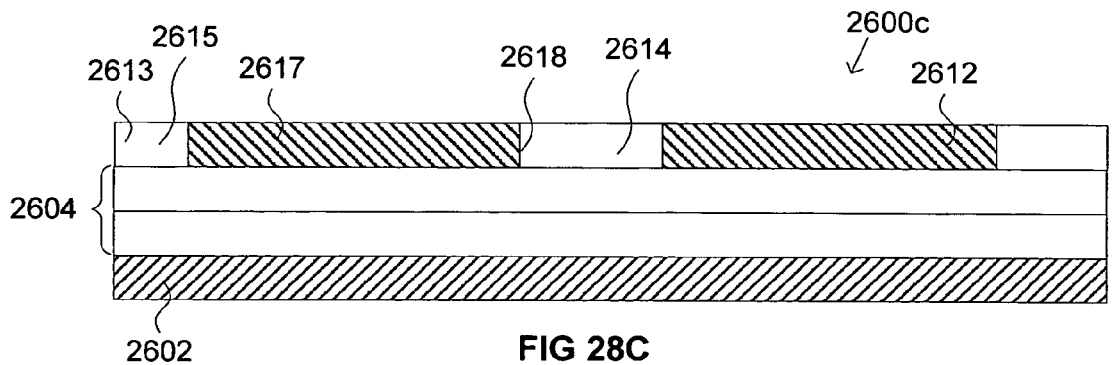

During the deposition surface forming step the continuous layer of material formed by the sacrificial material deposition step, is sized and shaped by removing the excess portions of the deposited layer material (e.g. the first and second material), to achieve a layer 2613 of a desired thickness and surface, as shown in FIG. 28C.

The process of sizing and shaping the deposited material to achieve the layer 2613 can be achieved by any of a variety of methods well known in the art including, etching (wet or dry), milling, lapping and the like. One such method is planarizing by a lapping operation. During lapping, material is removed by moving an abrasive element over, or relative to, the surface of the structure, until a desired thickness of the layer 2613 and smoothness of the surface 2617 is achieved.

Another process in the fabrication method 2700 is depositing a second layer onto the first layer to form a layered structure, wherein the second layer has a second opening sized at least as large as the minimum feature size, wherein the second opening is positioned overlapping the first opening to define a third opening between the first layer and the second layer, and wherein the third opening is sized less than the minimum feature size 2730, as shown in FIG. 27. During this process an opening is constructed in the second layer such that it overlaps with the opening of the first layer so that a smaller opening is defined between the two layers.

The process 2730 can further include the step of depositing a second layer of material with an opening defined therein. Additional optional steps can include depositing a sacrificial material to provide a continuous layer, and forming a deposition surface. Such steps can be employed if a layer thickness less than that initially deposited is desired and if additional layers are to be deposited over the second layer.

Figure 28D:
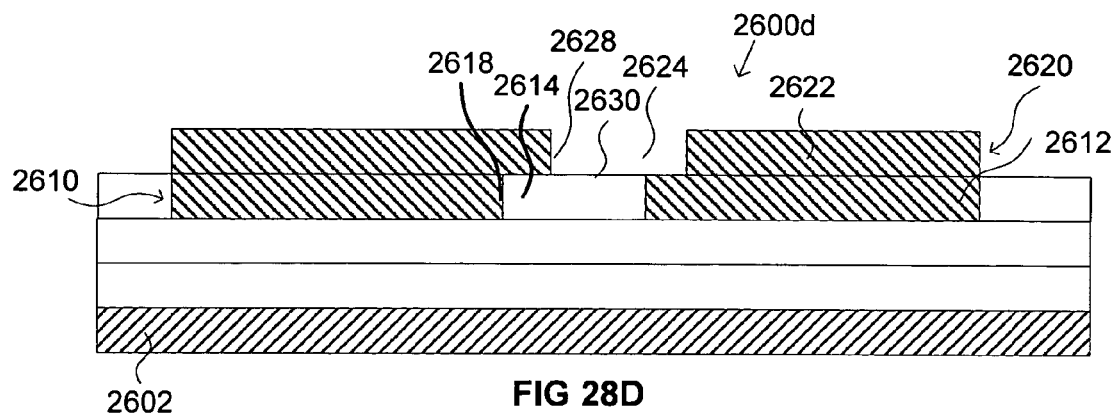

FIGS. 26B and 28D show an embodiment of a device 2600d having a layer 2620 which can be formed by operation of the process 2730. The second layer 2620 has the frame 2622 with the second opening 2624 having walls 2628.

As noted, the material of the second layer 2620 can be deposited to a thickness greater than desired and later sized in a forming step. The specific material used for the frame 2622 can any of a variety (e.g. gold, silver, nickel, copper, and the like), in certain embodiments the material is a nickel.

For the selective deposition of the second layer 2620, any of a variety of described masks and masking techniques (e.g. INSTANT MASK™, MOA, AIM, ACC, methods detailed in the '630 patent and '637 patent disclosures), can be employed. Deposition of the material can be performed by any of a variety of electrodeposition methods described herein. The mask is removed by a process appropriate to the type of mask used.

Like with the deposition of the first layer 2610, during the deposition of the second layer 2620, the use of a mask limits the minimum obtainable size of any feature or element defined on the layer 2620 to the minimum feature size (MFS) of the particular mask used. The specific dimension of the MFS is dependent on the type of mask and masking technique used. The MFS is a direct function of smallest feature which can be defined during the fabrication of the mask itself. As a result the minimum dimensions of the second opening 2624 defined in the structure 2622 is the MFS of the process used.

However, unlike the openings 2614 and 2624, the third opening 2630 (which is defined by these openings) is not limited in its dimensions to the MFS. The dimensions of the opening 2630 are instead determined by the amount of overlap of the openings 2614 and 2624.

Depositing a sacrificial material to provide a continuous layer allows later shaping and sizing of the second layer 2620. This is achieved by filling the opening and areas about the frame 2622 such that a continuous material layer is formed, so that methods such as planarization to be employed to size and shape the layer.

The sacrificial material can be any of a variety of suitable materials (e.g. gold, silver, nickel, copper, and the like), with some embodiments having sacrificial material as a silver. Deposition of the sacrificial material can by any of a variety of methods (e.g. blanket electrodeposition).

The step of forming a deposition surface can be used to size the layer 2620 and smooth the surface for any additional material deposition. This can be achieved by any of a variety of methods well known in the art including, etching (wet or dry), milling, lapping and the like. One method is planarizing by a lapping operation, where material is removed by moving an abrasive element over, or relative to, the surface of the structure to reach the desired thickness and smoothness.

The next process in the fabrication method 2700 is releasing the layered structure 2740. During this process by removing the sacrificial material the structure constructed during the deposition is released. The sacrificial material can be removed by any of a variety of methods including using an etching process. Useable etching processes include applying a chemical etchant which is sufficiently reactive with the sacrificial material to dissolve it. The etchant used should be substantially non-reactive with the structural material to prevent, or properly limit, any etching of the structural material.

Figure 28E:
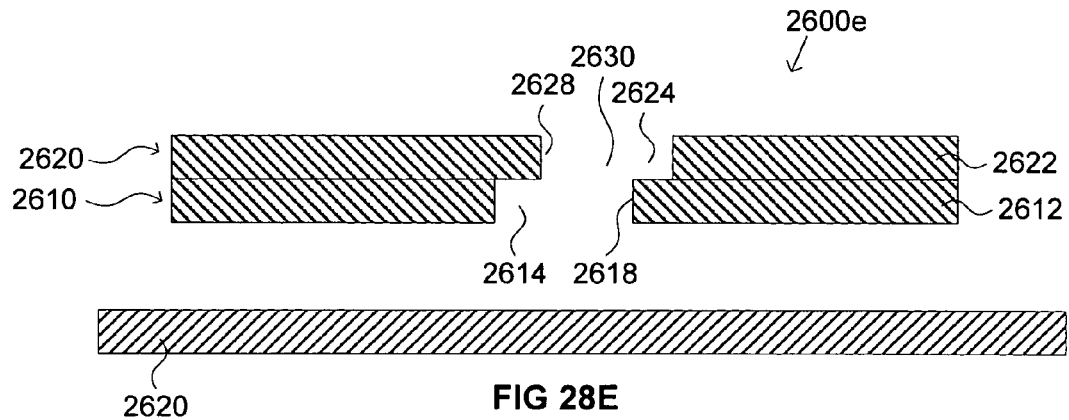

FIG. 28E shows an embodiment of a device 2600e which can be fabricated after performing the process of releasing the structure 2740. The device 2600e includes the third opening 2630 which is defined by a combination of the first opening 2614 of the first layer 2610 and the second opening 2624 of the second layer 2620. The third opening 2630 is defined by the walls 2618 and the walls 2628. With the size of the defined opening 2630 being is dependent only on the portion of overlap between the openings 2614 and 2624, the size of the third opening 2632 is independent of the any limitations in the minimum size of either opening 2614 or opening 2624.

Filter with Array of Pores Apparatus Embodiments

Figure 29A:
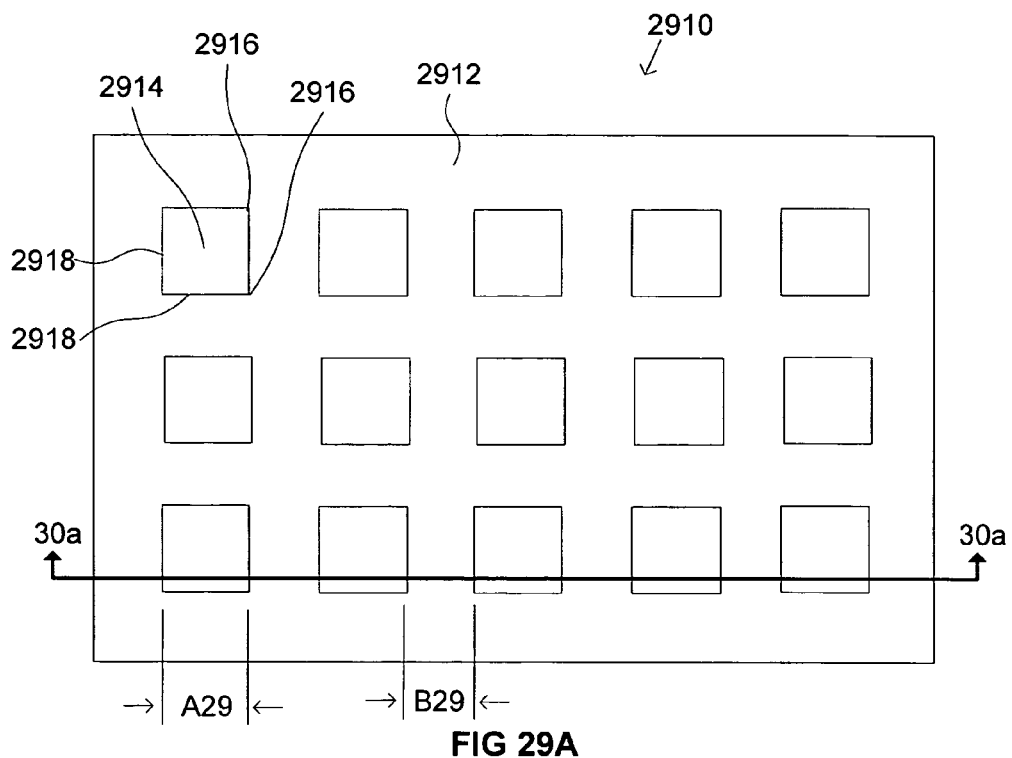
FIG. 29A-29C schematically depict top views of two layers of a layered structure in accordance with at least one embodiment of the invention.
Figure 29B:
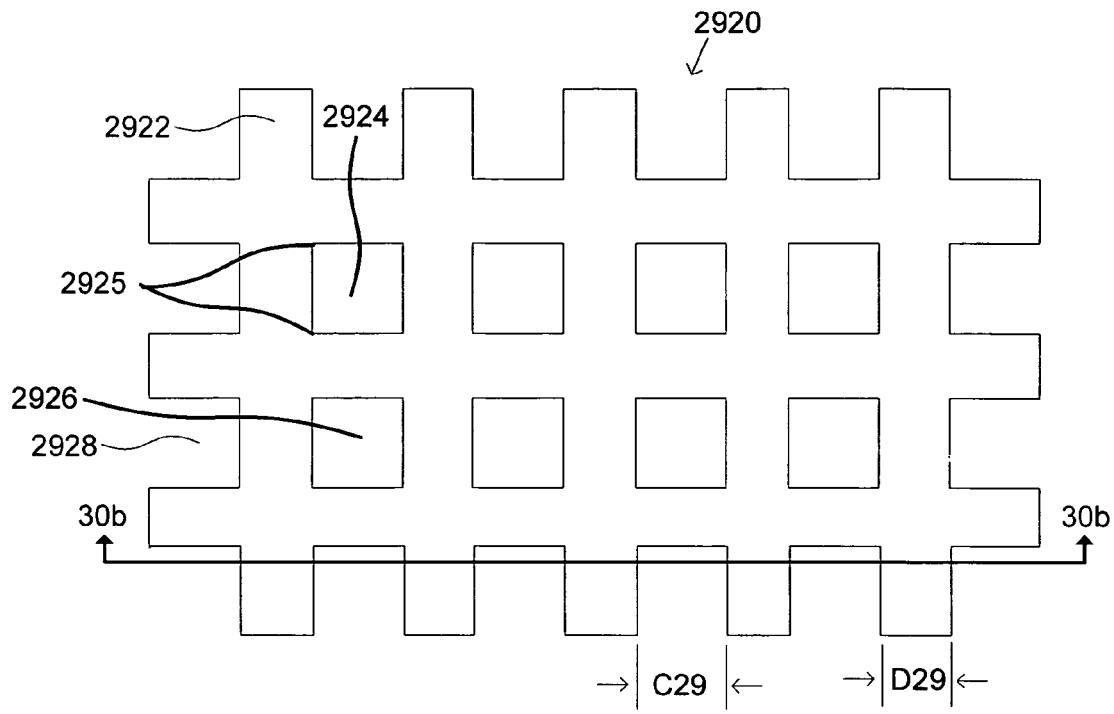
Figure 29C:
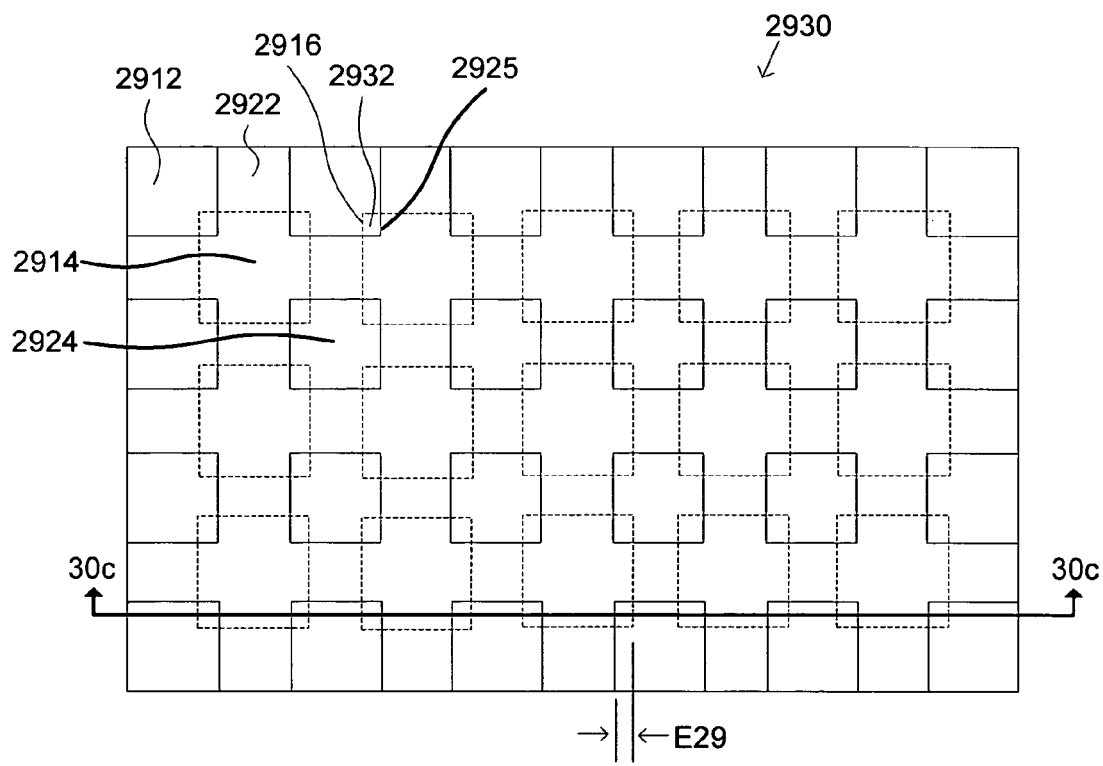
Figure 30A:
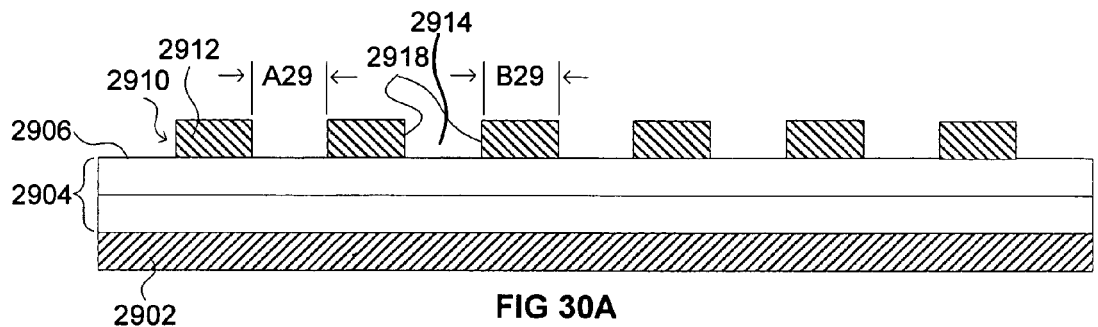
FIGS. 30A-30C schematically depict side views of various stages of fabrication of a layered structure in accordance with at least one embodiment of the invention.
Figure 30B:
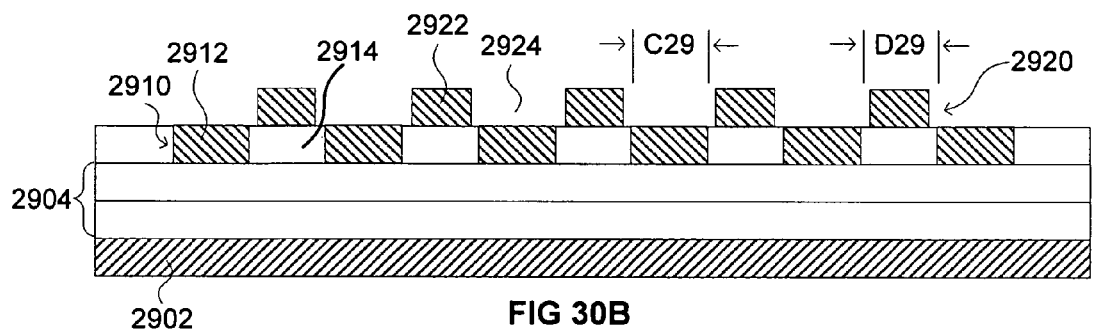
Figure 30C:
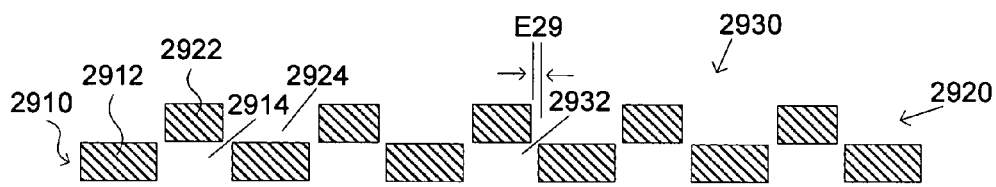

Another embodiment of the invention includes an apparatus and fabrication method for a layered structure which is configured to define elements or features between the layers, is shown in FIG. 29C and the cross-section in FIG. 30C. Specifically, shown is a structure or device which employs staggered or varied layer patterning to define a screen, filter or grid 2930 having a series of defined or third pores, openings or gaps 2832. The screen 2930 is formed from a first patterned layer 2910, as shown in FIG. 29A and the cross-section in FIG. 30A (shown during fabrication, as detailed herein), and a second patterned layer 2920, as set forth in FIG. 29B and the cross-section in FIG. 30B (also shown during fabrication, as detailed herein).

FIGS. 29A and 30A show the first or base patterned layer 2910 with a first or base structural lattice, grid or frame 2912 which is shaped to define a pattern of first or base pores, openings or gaps 2914. The pores 2914 pass through the first layer 2910, which, depending on the particular application, can allow the flow of a fluid, gas or a series of particles through the first layer 2910. The pores 2914 are defined with corners 2916 and sides or walls 2918.

The specific size and shape of each pore 2914 can vary, depending on the desired size, pattern and number of the defined pores 2932 in the screen 2930. The shape of the first pores 2914 can be any of a variety of geometric shapes including squares (as shown in FIG. 29A) and rectangles. In the same manner, the size and shape of the first structural grid 2912 defining the first pores 2914 can vary, not only to define the first pores 2914, but also to space and position them. Because of the inherent limitation of the fabrication of the first layer 2910, the minimum size of any dimension of either the first pores 2914 and/or of the width of the first grid 2912 is the MFS. In the embodiment shown, the first pores 2914 have widths A29 and the first grid 2912 has dimensions of B29. While the specific lengths of the distances A29 and B29 can vary depending on the particular use, they have a minimum length of the MFS.

The second patterned layer 2920 is shown in FIGS. 29B and 30B. The second layer 2920 is patterned in a second structural grid, lattice or frame 2922 that defines a series of second pores, openings or gaps 2924. The second pores 2924 are defined with corners 2925. The second openings 2924 include center pores 2926 and edge pores 2928. The second pores 2924 pass through the second layer 2920, such that the second pores 2924 are capable (depending on the embodiment) of allowing the passage of a fluid, gas, particles or the like.

The particular size and shape of the second grid 2922 is variable to not only define the size and shape of the second pores 2924, but also to space and position them. The shape of the pores 2924 can also be of any of a variety of sizes and shapes. Like with the first grid 2912, the size and an arrangement of the second layer 2920 is limited to a minimum size of the MFS. That is, the width of the second grid 2922 and/or the width of the second pores 2924, must be a least as wide as the MFS. The embodiment shown here has the second pores 2924 with widths C29 and the second grid 2922 with dimensions of D29. While the specific lengths of the distances C29 and C29 can vary, the minimum length of both is the MFS.

FIGS. 29C and 30C show a structure having a pattern of pores defined by a combination of the first layer 2910 and the second layer 2920. Specifically, as shown, the structure 2930 includes the second layer 2920 positioned over the first layer 2910, such that a series of defined pores 2932 are defined between the two layers. In so doing, the defined pores 2932, being a composite of portions of two separate layers, are not specifically limited in its minimum size as is the case with any component or element defined in a single layer. Therefore, the size of the pores 2932 are capable of being sized less than the MFS for the processes used to fabricate the first patterned layer 2910 and the second patterned layer 2920.

The defined pores 2932 are formed at the overlapping of the first pores 2914 of the first layer 2910 and the second pores 2924 of the second layer 2920. The pores 2932 include a corner 2916 from the first layer 2910 and a corner 2925 from the second layer 2920. With the defined pores 2932 being rectangular in shape, two sizes adjacent to the corners 2916 are portions of the pores 2914 and two sides adjacent to the corners 2925 are portions of the pores 2924.

The size of the defined pores s 2932 are dependent only of the difference of the sizes of the second grid 2922 and the first pores 2914, and therefore independent of the MFS limitations of the fabrication of elements in a single layer. With the width of the second grid 2922 being sized less than the corresponding width of the first pores 2914, the pores 2932 are defined at the overlap. The defined pores 2932 therefore can have dimensions less than the MFS. In the embodiment shown in FIGS. 29C and 30C, the widths of the defined pores 2932 is a distance E29, which can vary in size, but is not limited to by the MFS of the layers 2910 and 2920.

While the size of the defined pores 2932 are independent of the MFS limits of the pores of each layer, the positioning and density of the defined pores 2932 are directly related to the MFS. Namely, the defined pores 2932 are each separated by distances which depend on the MFS and as shown cannot be less than the MFS.

These embodiments of the invention provide the ability to form structures such as screens, filters, grids, or the like with pores or openings significantly smaller than the pores formed in a single material layer.

Filter with Array of Pores Fabrication Method Embodiments

Some embodiments of the invention include an embodiment of a method for fabricating an apparatus having a grid or screen of openings capable of being sized less than the MFS. The method of fabrication in general involves initially the deposition of a first layer that has a first array of openings, and then the deposition of a second layer with a second array of openings arranged to define a composite array of openings at the intersection of the first layer and the second layer.

Figure 31:
FIG. 31 provides a flow chart of a method of least one embodiment of the invention.
Figure 31:
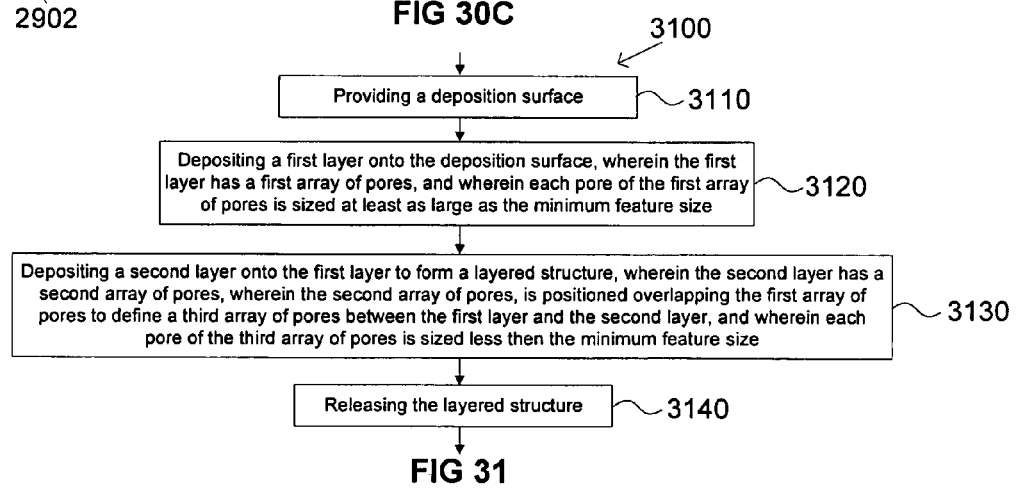

One embodiment of the method is set forth in FIG. 31. As shown, a method for fabricating a filter having a minimum feature size 3100 includes the processes of providing a deposition surface 3110, depositing a first layer onto the deposition surface, wherein the first layer has a first array of pores, and wherein each pore of the first array of pores is sized at least as large as the minimum feature size 3120, depositing a second layer onto the first layer to form a layered structure, wherein the second layer has a second array of pores, wherein each pore of the second array of pores is sized at least as large as the minimum feature size, wherein the second array of pores is positioned overlapping the first array of pores to define a third array of pores between the first layer and the second layer, and wherein each pore of the third array of pores is sized less than the minimum feature size 3130; and releasing the layered structure 3140.

As will be detailed herein, the structures obtainable by operation of the method 3100 can be of a variety of different embodiments, examples of which are shown in FIGS. 29A-29C and 30A-30C as described herein.

The process of providing a deposition surface 3110 is similar to the process 2710 of the method 2700, as described herein (shown in FIG. 27). That is, the structure provided includes a deposition surface which is suitable (e.g. sufficiently smooth) for layer deposition, and the structure it can any of several different types. A sacrificial material can be used as the structure for forming the deposition surface, such that pathway for the flow of the fluid or gas can be created after the releasing process 3140. The deposition surface can be provided on any of a variety of suitable materials, including silicon, glass, plastic, or a metal (e.g. nickel, copper, silver, gold, etc.). The deposition of such materials and forming of the surface, can be done by any of a variety of processes well known in the art. The process of providing a deposition structure 3110 can also include applying a seed layer to facilitate later layer deposition (as detailed herein). One embodiment of a deposition structure is shown in FIG. 30A, wherein a substrate 2902 and a set of sacrificial layers 2904 are a deposition structure with a deposition surface 2906.

Another process of the method 3100 is depositing a first layer onto the deposition surface 3120, as set forth in FIG. 31. This process can further include the steps of depositing a first layer of material with an array of pores or openings, depositing a sacrificial material to provide a continuous layer, and forming a deposition surface.

FIGS. 29A and 30A show an embodiment of a structure formable by the operations of the deposition step of the process 3120. The first layer 2910 has the first grid 2912 defining an array of pores or openings 2914. The material of the first layer 2910 can be deposited to a thickness greater that the desired thickness of the first layer 2910, as any additional material can be removed during the forming step of the process. The specific material used for the first layer 2910 can vary (including gold, silver, nickel, copper, and the like), in some embodiments the material is a nickel.

For the selective deposition of the first layer 2910, as shown in FIGS. 29A and 30A, any of the herein described masks and masking techniques (e.g. INSTANT MASK™, MOA, AIM, ACC, methods detailed in the '630 patent and '637 patent disclosures), can be employed. Deposition of the material of the first layer 2910 can be performed by any of a variety of electrodeposition methods including the electrochemical fabrication methods described herein. Then the mask is removed by any process associated with the type of mask used.

The use of a mask to deposit the first layer 2910 limits the minimum obtainable size of any feature or element on the layer 2910 to the MFS of the mask used. As a result the minimum dimensions which can be achieved with the first grid 2912 and/or the openings 2914 is the MFS.

Another step in the process 3120 is depositing a sacrificial material to provide a continuous layer. A sacrificial material can be deposited about the first grid 2912 and in the pores 2914, to form the continuous layer of material. By creating a continuous layer of material, the deposition of the sacrificial material facilitates later shaping and sizing (e.g. planarization) of the first layer 2910. The sacrificial material can be a variety of materials (including gold, silver, nickel, copper, and the like), in some embodiments it is a silver. The sacrificial material can be deposited by any of a variety of methods including a blanket electrodeposition. In alternate embodiments of the method, the material of the structural regions can be a sacrificial material and the sacrificial regions can be a structural material.

Next, the step of forming a deposition surface can be performed in the process 3120. During the forming step the continuous layer of material formed during the deposition step, is sized and shaped by removing the excess portions of the deposited layer material, to achieve a layer of a desired thickness and surface. The process of sizing and shaping the deposited material can be achieved by any of a variety of methods well known in the art including, etching (wet or dry), milling, lapping and the like. One such method is planarizing by a lapping operation, as detailed herein.

Another process in the fabrication method 3100 is depositing a second layer onto the first layer to form a layered structure 3130, as set forth in FIG. 31. During this process a second array of pores is constructed and positioned in the second layer, such that it there is an overlap with the first array of pores. This overlap defines a composite array of smaller pores at the intersection of the first and second layers. Since the size of the pores in the composite array are dependent only on the amount of overlap and not on the size of features in any one layer, the composite grid can have pores sized less than the MFS of the first and second layers.

The process 3130 can further include the additional steps of depositing a sacrificial material to provide a continuous layer, and forming a deposition surface. Such additional steps can be employed in embodiments where the thickness of the material forming the second layer as initially deposited is thicker than the desired thickness of the second layer, and the second layer must be sized, or if additional layers are to be later deposited over the second layer.

FIGS. 29B and 30B show an embodiment of a second layer 2920 which can be formed by operation of the process 3130. The second layer 2920 has the second grid 2922 with the array of pores 2924, as described herein. The material deposited to form the second grid 2922 can any of a variety (e.g. gold, silver, nickel, copper, and the like), in certain embodiments the material is a nickel.

For the selective deposition of the second layer 2920, any of a variety of described masks and masking techniques (e.g. INSTANT MASK™, MOA, AIM, ACC, methods detailed in the '630 patent and '637 patent disclosures), can be employed. Deposition of the material can be performed by any of a variety of electrodeposition methods described herein. The mask is removed by a process appropriate to the type of mask used.

Like with the deposition of the first layer 2910, during the deposition of the second layer 2920, the use of a mask limits the minimum obtainable size of any feature or element defined on the layer 2920 to the MFS of the mask used. As a result the minimum dimensions of the pores 2924 and the grid 2922 is the MFS.

However, unlike the pores 2914 and 2924, the defined pores 2932 are not limited in its dimensions to the MFS. The dimensions of the defined pores 2932 are instead determined by the overlap of the pores 2914 and 2924.

Depositing a sacrificial material to provide a continuous layer allows later shaping and sizing of the second layer 2920. This is achieved by filling the openings 2924 and areas about the structure 2922, such that a continuous material layer is formed, so that methods such as planarization to be employed to size and shape the layer.

The sacrificial material can be any of a variety of suitable materials (e.g. gold, silver, nickel, copper, and the like), with some embodiments having sacrificial material as a silver. Deposition of the sacrificial material can by any of a variety of methods (e.g. blanket electrodeposition).

The step of forming a deposition surface can be used to size the layer 2920 and smooth the surface for any additional layer material deposition. This can be achieved by any of a variety of methods well known in the art including, etching (wet or dry), milling, lapping and the like. One method is planarizing by a lapping operation, as described herein.

The next process in the fabrication method 3100 is releasing the layered structure 3140. During this process, by removing the sacrificial material within the structure which has been constructed during the operation of the process of the fabrication method, the device is released. Release of the device clears the pores in the device of the sacrificial material for the flow of a fluid, gas, particles, or the like, to pass through the pores.

The sacrificial material can be removed by any of a variety of methods including using an etching process. Useable etching processes include applying a chemical etchant which is sufficiently reactive with the sacrificial material to dissolve it. The etchant used should be substantially non-reactive with the structural material to prevent, or properly limit, any etching of the structural material. FIGS. 29C and 30C show an embodiment of a device 2930 which can be fabricated after performing the process of releasing the structure 3140. The device 2930 includes the grid of defined pores 2932, which are defined by a combination of the first pores 2914 of the first layer 2910 and the second pores 2924 of the second layer 2920.

Filter with Connecting Passage Embodiments

Other embodiments of the apparatus of the invention include devices having at least one passage through them, where the minimum size of the passage is defined by the thickness of a layer of the device. The device includes at least one connecting or spacing layer that, in conjunction with the structure of the surrounding layers, can function as filter pore or opening to restrict passage of particles of a fluid or gas going through the device. That is, the passage can restrict the flow of particles to allow passage of only those sized smaller than the thickness of the connecting layer. As a result, the minimum dimension of the passage is a function of the minimum thickness of the connecting layer and not of the MFS of the layers. With the minimum layer thickness being less than the MFS, this embodiment allows production of passages sized smaller than the MFS.

In some embodiments, the device includes offset or staggered apertures (or openings) in the external layers which are connected to each other by an open section of a connecting layer positioned between the external layers. Still other embodiments include a series or an array of connecting layer passages through the device, to form a screen or grid which can function as a filter.

An advantage provided by these embodiments is that the passage can be configured to have a low probability of clogging or otherwise becoming blocked with particles passing through it. This is achievable by arranging the passage to have a relatively small dimension (e.g. the connecting layer thickness) and a relatively large dimension defining a cross-section to the flow direction. This can also provide the advantage that the particles flowing through the passage that are not equiaxed, will tend to rotate so as to align themselves so that the particles can enter the passage. Another advantage is that with more than one passage, the passages can be arranged to specifically position areas of inflow and/or outflow from the devices. By so arranging the areas inflow and outflow, regions of flow restriction, turbulence or stagnation, at locations upstream or downstream of the device can be reduced or eliminated.

Figure 32A:
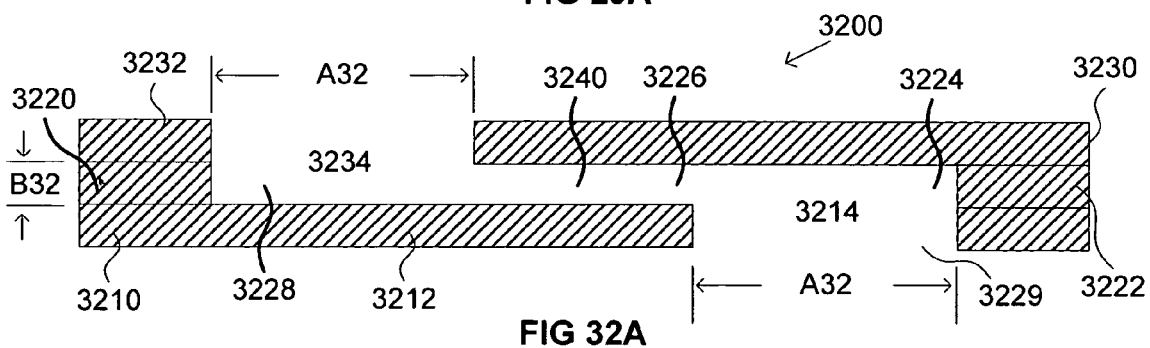
FIG. 32A schematically depicts a side view of a layered structure and FIG. 32*b* schematically depicts a top view of the layered structure in accordance with at least one embodiment of the invention.
Figure 32B:
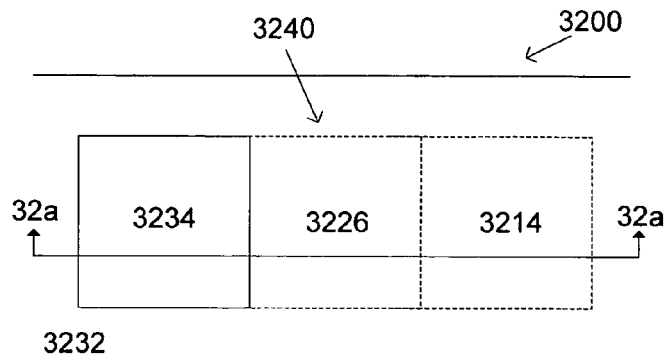

An embodiment of a device with a passage through a connecting or spacing layer is shown in FIGS. 32A and 32B. As shown, a device 3200 includes a first layer 3210, a second layer 3220, a third layer 3230 and a passage 3240 there through.

As shown in FIG. 32A, the first layer 3210 is an external layer and has a frame structure 3212 defining an aperture or opening 3214. Likewise, the third layer 3230 is an external layer and has a frame structure 3232 which defines an aperture or opening 3234. While the size and shape of the openings in the layers can vary, in the embodiment shown, the apertures 3214 and 3234 are square and have widths of distances A32. The apertures 3214 and 3234 are offset or staggered from each other such that they are not positioned over each other. This offset of the apertures allows a connection between the apertures 3214 and 3234 to be defined in the second layer 3220, such that the passage 3240 is restricted to the dimension of the thickness of the second layer 3220.

The second layer 3220 includes a frame structure 3222 which defines a connecting opening 3224 that is positioned to connect the apertures 3214 and 3234. The connecting opening 3224 includes a center section 3226 positioned between the apertures 3214 and 3234 and the frames 3212 and 3234. The passage 3240 includes the section 3226 and the apertures 3214 and 3234. In this embodiment, at a cross-section across the flow direction through the center section 3226, the dimensions are a distance B32 and a distance A32. The distance B32 is equal to the thickness of the second layer 3220 as shown in FIG. 32A. The distance A32 is along a depth-wise direction of the section 3226, as shown in FIG. 32B. The second layer thickness B32 can vary depending on the specific embodiment of the device 3200, for example in some embodiments the thickness is between about 1 µm and about 20 µm.

The flow-wise cross-section (e.g. layer thickness B32 and the depth-wise length A32) of the center section 3226 can be set to match the desired maximum particle size allowed to pass through the passage 3240. This allows the passage to be configured to match the specific restriction or filtration requirements for the particular use of the device 3200. The minimum achievable cross-section for the section 3226 depends on the minimum obtainable dimensions for the depth-wise length A32 and the layer thickness B32. Since the depth-wise thickness A32 is in the plane of the layer 3220, it is limited to a minimum size equal to the MFS of the layer 3220. In some embodiments the MFS is about 40 µm while in other embodiments it may be as low as 10 µm, 5 µm or even less. However, since the thickness B32 is not in the plane of the layer, it is limited to a minimum size by the minimum layer thickness. In some embodiments of the invention the minimum layer thickness is about 2 µm.

In embodiments where the layer thickness B32 is less than the depth-wise length A32, the thickness B32 is the minimum dimension of the passage 3240. With the length A32 substantially greater than the thickness B32, the passage 3240 is capable of providing a low probability of clogging or otherwise becoming blocked with particles passing through it. Also, in this configuration, the particles flowing through the passage 3240 that are not equiaxed, will tend to rotate so as to align themselves so that they can enter the center section 3226.

In alternate embodiments of the device 3200, a series or array of passages 3240 are formed in a device, such that a screen or filter can be formed. This allows the device to have a much greater flow capacity while maintaining a desired restriction of the maximum size of particles capable of passing the through the device.

In another alternate embodiment, a device has a series of passages 3240 which are arranged to position either the inlet and/or the outlet apertures, to control the flow either upstream and/or downstream of the device. Also, one or more of the passages 3240 can be connected together to allow flow to continue to outlets even with one or more inlets are blocked or restricted. In certain embodiments all the passages are connected by a manifold to prevent blockage and clogging and to allow an even distribution of flow to be maintained across the outlets.

Such a manifold or a spacer layer can be employed to allow the earlier layers (upstream layers) in a flow to serve as a pre-filter or a staged filter for the later (downstream) layers. For example, a first layer could be employed with a set of 20 µm pores, spaced from a second layer by a 20 µm spacer layer(s), and where the second layer has a set of 5 µm pores.

Some of the alternate embodiments of the invention have a different arrangement of the passage 3240. In such embodiments the second layer aperture sections 3228 and 3229, shown in FIG. 32A positioned about the center section 3226, have a different size and shape from that shown. Namely, to reduce the potential for blocking or clogging, the aperture section which is adjacent to the inlet (or both apertures, if the flow can reverse), is sized smaller than the adjacent aperture (apertures 3214 or 3234), such that a stepped or funnel-shaped opening is formed at the inlet (and outlet if required). By arranging the inlet in this manner, larger particles can be restrained away from the center section 2226 reducing or eliminating the potential for clogging or blockage.

In still another alternative embodiment, the device includes a first layer and a third layer structures that overlap to define the center portion of the connecting opening of the second layer. These embodiments are similar to the embodiment of FIGS. 32A and 32B except that the second layer does not include structure that defines the connecting opening and the first layer and the third layers lack structure which defines the apertures at the inlet and the outlet. This maximizes the size of the inlet and outlet while retaining the size of the center portion of the second layer. In other embodiments only the inlet or the outlet uses this configuration.

It should be clear to one skilled in the art that the device 3200 and its alternate embodiments can be formed by embodiments of the fabrication methods set forth herein.

Funnel and Nozzle Shaped Passage Embodiments

Another embodiment of the Applicants' invention has an apparatus with a passage formed so that it varies in size (e.g. cross-section) along its length. Among other things, this allows the size of the inlet and outlet to vary from each other. The passage can be formed in a funnel shape, with a decreasing or increasing cross-section between the inlet and outlet.

An advantage to a funnel-shaped passage is that it is capable of reducing clogging or blockage of the passage. This is achieved by restraining larger particles at portions of the passage with larger cross-sections (e.g. near the inlet), preventing the larger particles from reaching the narrower regions of the passage, yet allowing smaller particles to continue through the passage. That is, the funnel-shaped passage functions effectively as a pre-filter or a staged filter.

Figure 33:
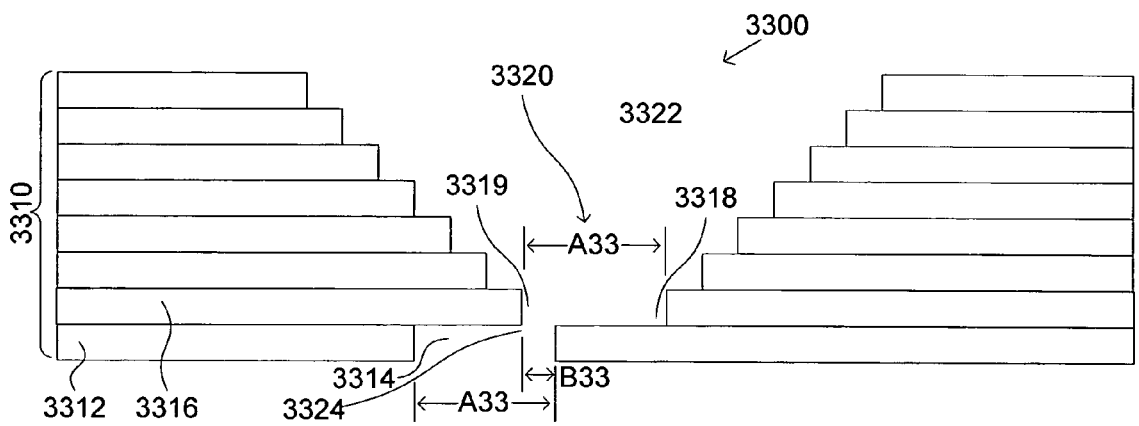
FIG. 33 schematically depicts a side view of a layered structure in accordance with at least one embodiment of the invention.

One embodiment of a funnel-shaped passage is shown in FIG. 33 where a device 3300 includes a series of layers 3310 defining a passage 3320. The layers 3310 include a first or base layer 3312 having a first opening or gap 3314 and a second layer 3316 with a second opening or gap 3318. The openings are staggered to form a defined opening 3319 at the intersection of the layers 3312 and 3316. While the size and shape of each opening can vary, in this embodiment the openings 3314 and 3318 each have a width of a distance A33 and the defined opening 3319 has a width of a distance B33.

The passage 3320 includes an inlet 3322 and an outlet 3324. The inlet 3322 has a greater width (or cross-section) than the outlet 3324. Between the inlet 3322 and the outlet 3324, the layers 3310 are arranged to define ever smaller openings starting at the inlet 3322 going to the outlet 3324, such that a funnel shape is formed. The funnel shape of the passage 3320 functions to restrain larger particles prior to reaching, and potentially clogging, the outlet 3324. At the same time, the funnel shape of the passage 3320 allows sufficiently small particles to continue past any restrained particles and through the passage 3320 to the outlet 3324.

Depending on the embodiment, the outlet 3324 can be formed to have a width B33 that is less than the MFS of the layers. With the openings 3314 and 3318 having a minimum width A33 equal to the MFS, by offsetting or staggering the layers 3312 and 3316, the defined opening 3319 at the intersection of the layers 3312 and 3316, is capable of having a width B33 that is less than the MFS. The smaller the width of the defined opening 3319 (and therefore of the outlet 3324), the greater the degree of filtration achieved by minimizing the size of the particles which may pass through the passage 3320.

It should be noted that a variety of alternate embodiments to that shown in FIG. 33 are possible. The dimensions of the passage 3320 and its features can vary such that the passage 3320 can be specifically shaped and sized according the particular particles encountered in specific uses. For example, more or less layers 3310 can be employed to define the length of the passage 3320 and the width of the openings in the layers can be varied to define the slope of the funnel portion of the passage 3320. Some embodiments include a device having a series or an array of funnel-shaped passages, to form a grid, screen or filter. In other embodiments, the direction of the flow can be reversed so that the flow enters the passage 3320 at the outlet 3324 and exits at the inlet 3322. Changing the flow direction can allow the passage 3320 to function as a nozzle (as further described herein).

The device 3300 and its alternate embodiments can be formed by embodiments of the fabrication methods set forth herein.

Another embodiment of the invention has an apparatus with a passage formed in a nozzle shape, so that it varies in size (e.g. cross-section) along its length from wide to narrow to wide again. This embodiment is similar to the funnel-shaped embodiments (described herein), except that the passage again widens out from its narrowest portion to form a nozzle shape.

An advantage of a nozzle-shaped passage is that it can be used in applications capable of providing specific products. For example, in one application an embodiment of the invention has an array of nozzles for micro-particle generation and encapsulation. This can be done with supercritical $CO_2$, where by flashing the fluid through an appropriate nozzle-shaped passage, instantaneous precipitation is achieved at the nozzle throat. With a fluid having multiple solutes, the solutes co-precipitate, and by controlling concentrations, the process can effectively micro-encapsulate one solute within the other. As further describe herein, such results can also be achieve with a funnel-shaped passage.

Another advantage to a nozzle-shaped passage is that, like the funnel-shaped passage it is capable of reducing clogging or blockage of the passage. This is achieved by restraining larger particles at portions of the passage with larger cross-sections and preventing them from blocking or clogging the narrower regions, while allowing continued flow of smaller particles. Like with the funnel-shaped embodiments, the nozzle-shape passage functions effectively as a pre-filter or a staged filter.

Figure 34:
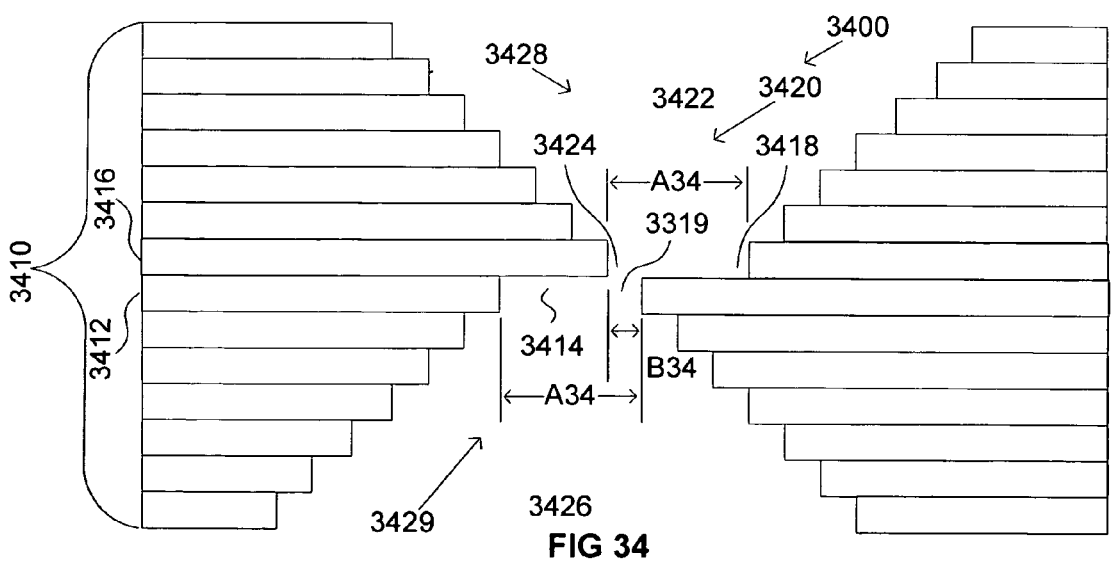
FIG. 34 schematically depicts a side view of a layered structure in accordance with at least one embodiment of the invention.

One embodiment of a nozzle-shaped passage is shown in FIG. 34 where a device 3400 includes a series of layers 3410 defining a passage 3420. The layers 3410 include a first layer 3412 having a first opening or gap 3414 and a second layer 3416 with a second opening or gap 3418. The openings are staggered to form a defined opening 3419 at the intersection of the layers. While the size and shape of the openings can vary, in the embodiment shown the openings 3414 and 3418 have a width of a distance A34 and the defined opening 3419 has a width of a distance B34.

The passage 3420 includes an inlet 3422, a throat 3424 and an outlet 3426. The inlet 3422 and outlet 3426 have greater widths than the throat 3424. Between the inlet 3422 and the throat 3424, the layers 3410 are arranged to define ever smaller openings starting at the inlet 3422 going to the throat 3424, such that an inlet funnel 3428 is formed. The inlet funnel 3328 functions to restrain larger particles prior to their reaching and potentially clogging the throat 3424, while allowing sufficiently small particles to continue through the throat 3424. From the throat 3424 to the outlet 3426, the layers 3410 are arranged to define ever larger openings starting at the throat 3424 going to the outlet 3426, such that an outlet funnel 3329 is formed. Combined, the inlet funnel 3428 and the outlet funnel 3429 shape the passage 3420 to form a nozzle shape.

Depending on the embodiment, the throat 3424 can be formed to have a width B34 that is less than the MFS of the layers. With the openings 3414 and 3418 being a having a minimum width A34 of the MFS, by offsetting or staggering the layers 3412 and 3416, the defined opening 3419 positioned at the intersection of the layers 3412 and 3416, is capable of having a width B34 that is less than the MFS. The smaller the width of the defined opening 3419, and therefore of the throat 3424, the greater the degree of filtration achieved by minimizing the size of the particles which may pass through the passage 3420.

It should be noted that a variety of alternate embodiments to that shown in FIG. 34 are possible. The dimensions of the passage 3420 and its features can vary such that the passage 3420 can be specifically shaped and sized according the particular particles encountered in specific uses. For example, more or less layers 3410 can be employed to define the length of the passage 3420 and the width of the openings in the layers can be varied to define the slope of the nozzle portion of the passage 3420. Some embodiments include a device having a series or an array of nozzle-shaped passages, to form a grid, screen or filter. In other embodiments, the passage 3420 can have just the one funnel-shaped portion to form the nozzle. An example of such a single funnel nozzle is the embodiment of the device 3300 shown in FIG. 33.

The device 3400 and its alternate embodiments can be formed by embodiments of the fabrication methods set forth herein.

The patent applications and patents set forth below are hereby incorporated by reference herein as if set forth in full. The teachings in these incorporated applications can be combined with the teachings of the instant application in many ways: For example, enhanced methods of producing structures may be derived from some combinations of teachings, enhanced structures may be obtainable, enhanced apparatus may be derived, and the like.

| US Pat App No, Filing Date US App Pub No, Pub Date | Inventor, Title |
| --- | --- |
| 10/677,556 - Oct. 1, 2003 | Cohen, "Monolithic Structures Including Alignment and/or Retention Fixtures for Accepting Components" |
| 10/830,262 - Apr. 21, 2004 | Cohen, "Methods of Reducing Interlayer Discontinuities in Electrochemically Fabricated Three-Dimensional Structures" |
| 10/271,574 - Oct. 15, 2002 2003-0127336A - Jul. 10, 2003 | Cohen, "Methods of and Apparatus for Making High Aspect Ratio Microelectromechanical Structures" |
| 10/697,597 - Dec. 20, 2002 | Lockard, "EFAB Methods and Apparatus Including Spray Metal or Powder Coating Processes" |
| 10/677,498 - Oct. 1, 2003 | Cohen, "Multi-cell Masks and Methods and Apparatus for Using Such Masks To Form Three-Dimensional Structures" |
| 10/724,513 - Nov. 26, 2003 | Cohen, "Non-Conformable Masks and Methods and Apparatus for Forming Three-Dimensional Structures" |
| 10/607,931 - Jun. 27, 2003 | Brown, "Miniature RF and Microwave Components and Methods for Fabricating Such Components" |
| 10/841,100 - May 7, 2004 | Cohen, "Electrochemical Fabrication Methods Including Use of Surface Treatments to Reduce Overplating and/or Planarization During Formation of Multi-layer Three-Dimensional Structures" |
| 10/387,958 - Mar. 13, 2003 2003-022168A - Dec. 4, 2003 | Cohen, "Electrochemical Fabrication Method and Application for Producing Three-Dimensional Structures Having Improved Surface Finish" |
| 10/434,494 - May 7, 2003 2004-0000489A - Jan. 1, 2004 | Zhang, "Methods and Apparatus for Monitoring Deposition Quality During Conformable Contact Mask Plating Operations" |
| 10/434,289 - May 7, 2003 20040065555A - Apr. 8, 2004 | Zhang, "Conformable Contact Masking Methods and Apparatus Utilizing In Situ Cathodic Activation of a Substrate" |
| 10/434,294 - May 7, 2003 2004-0065550A - Apr. 8, 2004 | Zhang, "Electrochemical Fabrication Methods With Enhanced Post Deposition Processing Enhanced Post Deposition Processing" |
| 10/434,295 - May 7, 2003 2004-0004001A - Jan. 8, 2004 | Cohen, "Method of and Apparatus for Forming Three-Dimensional Structures Integral With Semiconductor Based Circuitry" |
| 10/434,315 - May 7, 2003 2003-0234179 A - Dec. 25, 2003 | Bang, "Methods of and Apparatus for Molding Structures Using Sacrificial Metal Patterns" |
| 10/434,103 - May 7, 2004 2004-0020782A - Feb. 5, 2004 | Cohen, "Electrochemically Fabricated Hermetically Sealed Microstructures and Methods of and Apparatus for Producing Such Structures" |
| 10/841,006 - May 7, 2004 | Thompson, "Electrochemically Fabricated Structures Having Dielectric or Active Bases and Methods of and Apparatus for Producing Such Structures" |
| 10/434,519 - May 7, 2003 2004-0007470A - Jan. 15, 2004 | Smalley, "Methods of and Apparatus for Electrochemically Fabricating Structures Via Interlaced Layers or Via Selective Etching and Filling of Voids" |
| 10/724,515 - Nov. 26, 2003 | Cohen, "Method for Electrochemically Forming Structures Including Non-Parallel Mating of Contact Masks and Substrates" |

-continued

| US Pat App No, Filing Date US App Pub No, Pub Date | Inventor, Title |
|---|---|
| 10/841,347 - May 7, 2004 | Cohen, "Multi-step Release Method for Electrochemically Fabricated Structures" |
| 60/533,947 - Dec. 31, 2003 | Kumar, "Probe Arrays and Method for Making" |
| 60/534,204 - Dec. 31, 2003 | Cohen, "Method for Fabricating Three-Dimensional Structures Including Surface Treatment of a First Material in Preparation for Deposition of a Second Material" |
| 60/533,975 - Dec. 31, 2003 | Kim, "Microprobe Tips and Methods for Making" |
| 60/533,948 - Dec. 31, 2003 | Cohen, "Electrochemical Fabrication Method for Co-Fabricating Probes and Space Transformers" |
| 60/533,897 - Dec. 31, 2003 | Cohen, "Electrochemical Fabrication Process for Forming Multilayer Multimaterial Microprobe structures" |
| 60/540,511 - Dec. 31, 2003 | Kruglick, "Electrochemically Fabricated Microprobes" |
| 10/772,943 - Dec. 31, 2003 | Kruglick, "Electrochemically Fabricated Microprobes" |
| 60/534,184 - Dec. 31, 2003 | Cohen, "Electrochemical Fabrication Methods Incorporating Dielectric Materials and/or Using Dielectric Substrates" |
| 60/533,932 - Dec. 31, 2003 | Cohen, "Electrochemical Fabrication Methods Using Dielectric Substrates" |
| 60/534,157 - Dec. 31, 2003 | Lockard, "Electrochemical Fabrication Methods Incorporating Dielectric Materials" |
| 60/533,891 - Dec. 31, 2003 | Lockard, "Methods for Electrochemically Fabricating Structures Incorporating Dielectric Sheets and/or Seed layers That Are Partially Removed Via Planarization" |
| 60/533,895 - Dec. 31, 2003 | Lembrikov, "Electrochemical Fabrication Method for Producing Multi-layer Three-Dimensional Structures on a Porous Dielectric" |
| 10/841,272 - May 7, 2004 | Cohen, "Methods and Apparatus for Forming Multi-Layer Structures Using Adhered Masks" |
| 10/840,998 - May 7, 2004 | Zhang, "Electrochemical Fabrication Methods With Enhanced Post Deposition Processing" |
| 10/841,384 - May 7, 2004 | Zhang, "Method of Electrochemically Fabricating Multilayer Structures Having Improved Interlayer Adhesion" |

In some embodiments, two materials may be deposited in association with individual layers but additional materials may be added to the overall structure by using different pairs of materials on different layers. For example, some layers may include copper and a dielectric while other layers may include nickel and copper. After the formation of the structure is completed, the copper may be removed as a sacrificial material which leaves behind a nickel and dielectric structure with hollowed out regions and/or a nickel, dielectric, and copper structure if copper is entrapped by regions of nickel and/or dielectric material.

In some embodiments, mesoscale and microscale multi-layer three-dimensional structures or devices are electrochemically formed wherein one or more dielectric materials are incorporated into the structure with the formation of each layer. Seed layers, and potentially seed layer stacks of multiple materials (e.g. adhesion layer material and seed layer material), are provided during the formation of layers to ensure that a surface is capable of electrochemically receiving deposits of material. On some layers seed layer material is not deposited as a planar layer but is instead deposited over exposed regions of a substrate and over one or more previously deposited patterns of material on the layer. Additional deposition of material occurs over the seed layer material and planarization operations are used to remove seed layer material deposited on previously deposited materials on the layer.

In some embodiments three-dimensional structures are electrochemically fabricated by depositing a first material onto previously deposited material through voids in a patterned mask where the patterned mask is at least temporarily adhered to a substrate or previously formed layer of material and is formed and patterned onto the substrate via a transfer tool patterned to enable transfer of a desired pattern of precursor masking material. In some embodiments the precursor material is transformed into masking material after transfer to the substrate while in other embodiments the precursor is transformed during or before transfer. In some embodiments layers are formed one on top of another to build up multi-layer structures. In some embodiments the mask material acts as a build material while in other embodiments the mask material is replaced each layer by a different material which may, for example, be conductive or dielectric.

In some embodiments three-dimensional structures are electrochemically fabricated by depositing a first material onto previously deposited material through voids in a patterned mask where the patterned mask is at least temporarily adhered to previously deposited material and is formed and patterned directly from material selectively dispensed from a computer controlled dispensing device (e.g. an ink jet nozzle or array or an extrusion device). In some embodiments layers are formed one on top of another to build up multi-layer structures. In some embodiments the mask material acts as a build material while in other embodiments the mask material is replaced each layer by a different material which may, for example, be conductive or dielectric.

It will be understood by those of skill in the art that additional operations may be used in variations of the above presented embodiments. These additional operations may perform cleaning functions (e.g. between the primary operations discussed above), they may perform activation functions and monitoring functions.

In view of the teachings herein, many further embodiments, alternatives in design and uses of the invention will be apparent to those of skill in the art. As such, it is not intended that the invention be limited to the particular illustrative embodiments, alternatives, and uses described above but instead that it be solely limited by the claims presented hereafter.

What is claimed is:

1. A layered three-dimensional structure formed from a process having a minimum feature size associated with the formation of features on each layer, the layered three-dimensional structure comprising:
   a first layer defining a first opening, wherein the first opening is at least as large as the minimum feature size; and
   a second layer positioned adjacent to the first layer, wherein the second layer defines a second opening at least as large as the minimum feature size, wherein the second opening is positioned adjacent the first opening to define a third opening at the junction of the first opening and the second opening, and wherein the third opening has an effective size that is at least in part less than the minimum feature size, and
   wherein portions of the second layer overlying portions of the first layer are adhered to one another and wherein at least a portion of the second opening overlies at least a portion of the first opening,
   wherein the first layer comprises a first portion and a first movable portion positioned on the opposite side of the first opening from the first fixed portion, wherein the second layer comprises a second fixed portion and a second movable portion positioned on the opposite side of the second opening from the second fixed portion, wherein the second fixed portion is adhered to the first fixed portion to form a fixed element, wherein the second movable portion is adhered to the second movable portion to form a movable element, and wherein the movable element is capable of moving relative to the fixed element.

2. The layered three-dimensional structure of claim 1, wherein the first layer comprises a material selected from the group consisting of gold, silver, nickel, and copper.

3. The layered three-dimensional structure of claim 2, wherein the first layer comprises nickel.

4. The layered three-dimensional structure of claim 2, wherein the second layer comprises a material selected from the group consisting of gold, silver, nickel, and copper.

5. The layered three-dimensional structure of claim 3, wherein the second layer comprises nickel.

6. The layered three-dimensional structure of claim 1, wherein the first layer has a thickness between 1 µm and 20 µm, and wherein the second layer has a thickness between 1 µm and 20 µm.

7. The layered three-dimensional structure of claim 6, wherein the first layer is about 2 µm thick, and wherein the second layer is about 2 µm thick.

8. The layered three-dimensional structure of claim 1, wherein the first layer is oriented substantially along a first plane, wherein the second layer is oriented substantially along a second plane, and wherein the first plane is substantially parallel to the second plane.

9. The layered three-dimensional structure of claim 1, wherein the layered three-dimensional structure is an actuator, wherein the fixed element comprises an electrode, and wherein the movable element comprises an electrode.

10. The layered three-dimensional structure of claim 9, wherein the actuator is an actuator selected from the group consisting of a vertical comb actuator, a horizontal comb actuator, and a capacitance type actuator.

11. The layered three-dimensional structure of claim 10, wherein at least a portion of the fixed element is electrically conductive, wherein at least a portion of the movable element is electrically conductive, and wherein the three-dimensional structure is capable of applying an electrical potential difference between the fixed element and the movable element to provide an electrostatic force.

\* \* \* \* \*